(12) United States Patent
Nishiyama et al.

(10) Patent No.: US 10,809,581 B2
(45) Date of Patent: Oct. 20, 2020

(54) ACTIVE MATRIX SUBSTRATE, AND DISPLAY PANEL

(71) Applicant: Sharp Kabushiki Kaisha, Sakai, Osaka (JP)

(72) Inventors: Takayuki Nishiyama, Sakai (JP); Kohhei Tanaka, Sakai (JP); Takeshi Noma, Sakai (JP); Ryo Yonebayashi, Sakai (JP); Yosuke Iwata, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/528,508

(22) PCT Filed: Nov. 20, 2015

(86) PCT No.: PCT/JP2015/082781
§ 371 (c)(1),
(2) Date: May 21, 2017

(87) PCT Pub. No.: WO2016/080541
PCT Pub. Date: May 26, 2016

(65) Prior Publication Data
US 2017/0255049 A1    Sep. 7, 2017

(30) Foreign Application Priority Data
Nov. 21, 2014    (JP) ................. 2014-236844

(51) Int. Cl.
*G02F 1/1345*    (2006.01)
*G09G 3/36*    (2006.01)
(Continued)

(52) U.S. Cl.
CPC ....... *G02F 1/13454* (2013.01); *G09G 3/3611* (2013.01); *G02F 1/1368* (2013.01);
(Continued)

(58) Field of Classification Search
CPC ........ G02F 1/13454; G09G 2310/0278; G09G 2300/0408; G09G 3/3611; G09G 3/3674; G09G 3/3685
See application file for complete search history.

(56) References Cited

U.S. PATENT DOCUMENTS 5,851,440 A * 12/1998 Tanaka ................ G02F 1/13454
257/66
6,014,193 A * 1/2000 Taira .................... G02F 1/13336
345/90

(Continued)

FOREIGN PATENT DOCUMENTS

| CN | 103137617 A | 6/2013 |
|----|-------------|--------|
| JP | H11184406 A | 7/1999 |

(Continued)

*Primary Examiner* — Angela K Davison
(74) *Attorney, Agent, or Firm* — ScienBiziP, P.C.

(57) ABSTRACT

Provided is an active matrix substrate 20a in which either a plurality of source lines (data lines) 15S or a plurality of gate lines 13G, as constituent elements of the active matrix substrate 20a, are vertical lines extending in the longitudinal direction, and the other are horizontal lines. Among a plurality of pixel control elements 16T that are provided in correspondence to a plurality of pixels and are connected with the data line 15S and the gate lines 13G so as to control display of the corresponding pixels, respectively, a part of the pixel control elements 16T connected with one same horizontal line are arranged on one side with respect to the respective vertical lines to which the pixel control elements are connected, the side being different from a side on which the other pixel control elements connected with the same horizontal line are arranged. Among a plurality of switching elements 18 as constituent elements of a gate driver (driving circuit) 11, at least a part of the switching elements 18 are respectively arranged in areas between adjacent ones of the vertical lines, in each of which areas a distance between (Continued)

adjacent ones of the pixel control elements 16T is wider than a distance between other adjacent ones of the pixel control elements 16T.

12 Claims, 43 Drawing Sheets

(51) Int. Cl.
    *G02F 1/1368*     (2006.01)
    *G02F 1/1343*     (2006.01)
    *G02F 1/1362*     (2006.01)

(52) U.S. Cl.
    CPC .. *G02F 1/134309* (2013.01); *G02F 1/136286* (2013.01); *G02F 2001/13629* (2013.01); *G09G 3/3674* (2013.01); *G09G 3/3685* (2013.01); *G09G 2300/0408* (2013.01); *G09G 2310/0278* (2013.01)

(56) References Cited

U.S. PATENT DOCUMENTS

| | | |
|---|---|---|
| 2001/0030719 A1 | 10/2001 | Yamaguchi et al. |
| 2015/0293546 A1 | 10/2015 | Tanaka et al. |

FOREIGN PATENT DOCUMENTS

| | | |
|---|---|---|
| JP | 2008-227057 A | 9/2008 |
| JP | 2012-068405 A | 4/2012 |
| WO | 2014-069529 A1 | 5/2014 |

\* cited by examiner

RELATED ART

RELATED ART

RELATED ART

RELATED ART

RELATED ART

RELATED ART

US 10,809,581 B2

ACTIVE MATRIX SUBSTRATE, AND DISPLAY PANEL

TECHNICAL FIELD

The present invention relates to an active matrix substrate and a display panel.

BACKGROUND ART

An active matrix substrate is known that includes a plurality of data lines, and a plurality of lines that intersect with the data lines and include at least a plurality of gate lines. Patent Document 1 discloses an active matrix substrate in which, among a plurality of switching elements as elements of a driving circuit that is connected to at least a part of the lines and controls potentials of the lines, at least a part of the switching elements are arranged in a display region.

PRIOR ART DOCUMENT

Patent Document

Patent Document 1: WO2014/069529

SUMMARY OF THE INVENTION

Problem to be Solved by the Invention

On the active matrix substrate, a plurality of pixel control elements (pixel-TFTs) are provided in correspondence to a plurality of pixels composing the display region, respectively, and are connected with data lines and gate lines, to control display of the corresponding pixels, respectively. In the active matrix substrate disclosed by Patent Document 1, all of the pixel control elements are arranged on the same side with respect to respective data lines that extend in the longitudinal direction in plan view. The intervals between adjacent ones of the pixel control elements, therefore, are the same. In a case where switching elements are arranged in areas between adjacent ones of the data lines and between adjacent ones of the pixel control elements, large switching elements cannot be arranged in these areas, since these areas are narrow.

It is an object of the present invention to provide an active matrix substrate in which a large switching element can be arranged in a display region.

Means to Solve the Problem

An active matrix substrate in one embodiment of the present invention includes: a plurality of data lines; a plurality of lines that intersect with the data lines, and include at least a plurality of gate lines; a driving circuit that includes a plurality of switching elements, and are connected to at least part of the lines, so as to control potentials of the lines according to a control signal supplied from outside a display region; and a plurality of pixel control elements that are provided in correspondence to a plurality of pixels that compose the display region, and are connected with the data lines and the gate lines, so as to control display of the corresponding pixels, respectively. In the active matrix substrate, either the data lines or the gate lines are a plurality of vertical lines that extend in a longitudinal direction in plan view, and the other are a plurality of horizontal lines that extend in a lateral direction in plan view; among the pixel control elements, a part of the pixel control elements connected with one same horizontal line are arranged on one side with respect to the respective vertical lines to which the pixel control elements are connected, the side being different from a side on which the other pixel control elements connected with the same horizontal line are arranged; and at least a part of the switching elements are respectively arranged in areas between adjacent ones of the vertical lines, in each of which areas a distance between adjacent ones of the pixel control elements is wider than a distance between other adjacent ones of the pixel control elements.

Effect of the Invention

With the present invention, it is possible to arrange, in a display region, large switching elements as a plurality of switching elements that are constituent elements of a driving circuit that controls potentials of a plurality of lines including a plurality of gate lines.

Figure 8A:
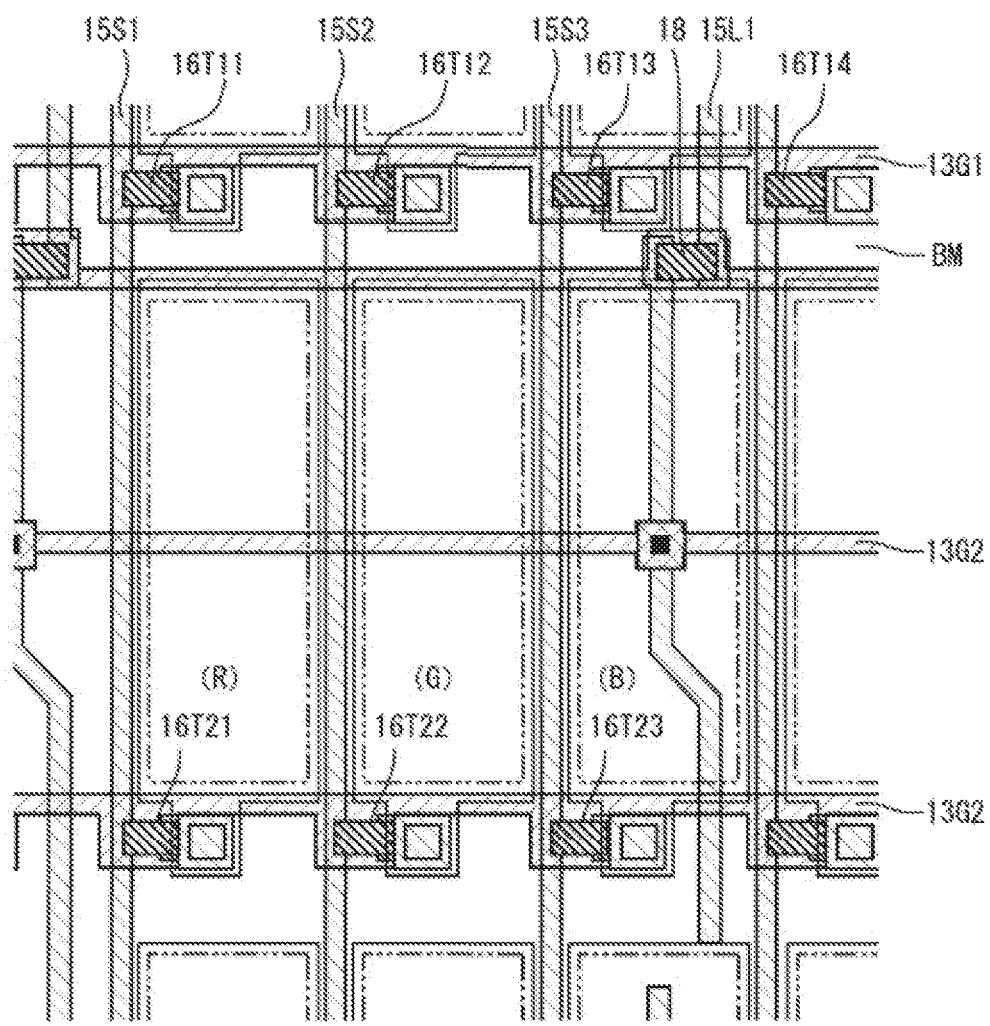
FIG. 8A illustrates a configuration of a conventional active matrix substrate.

4 is arranged in the display region of the conventional active matrix substrate illustrated in FIG. 8A.

Figure 4:
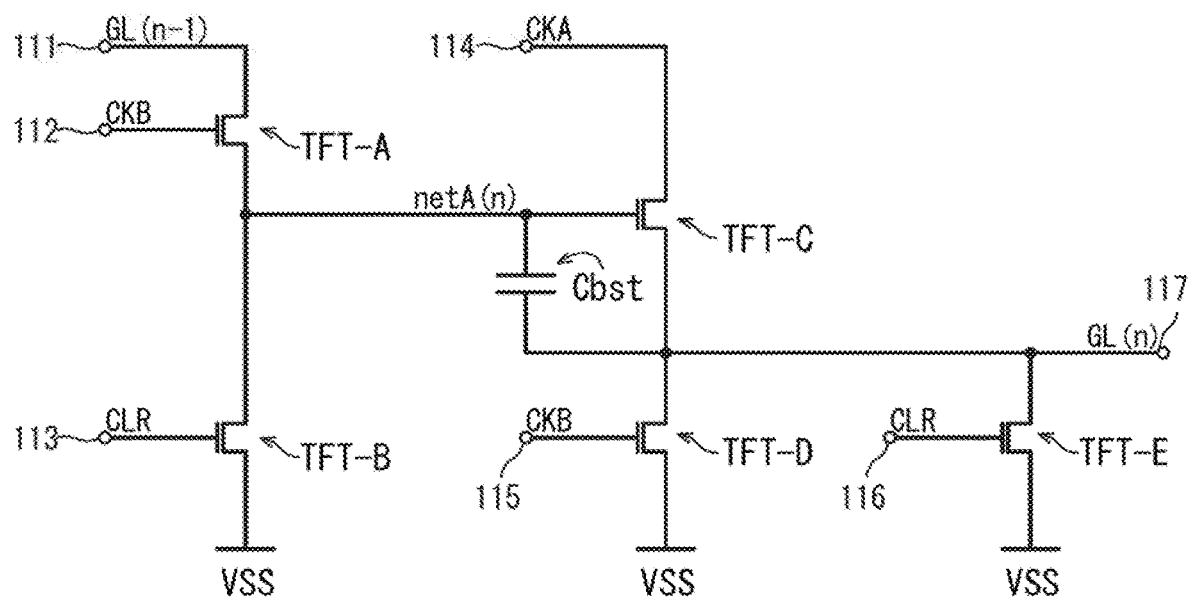
FIG. 4 illustrates an exemplary equivalent circuit of a gate driver for driving a gate line of GL(n).
Figure 11A:
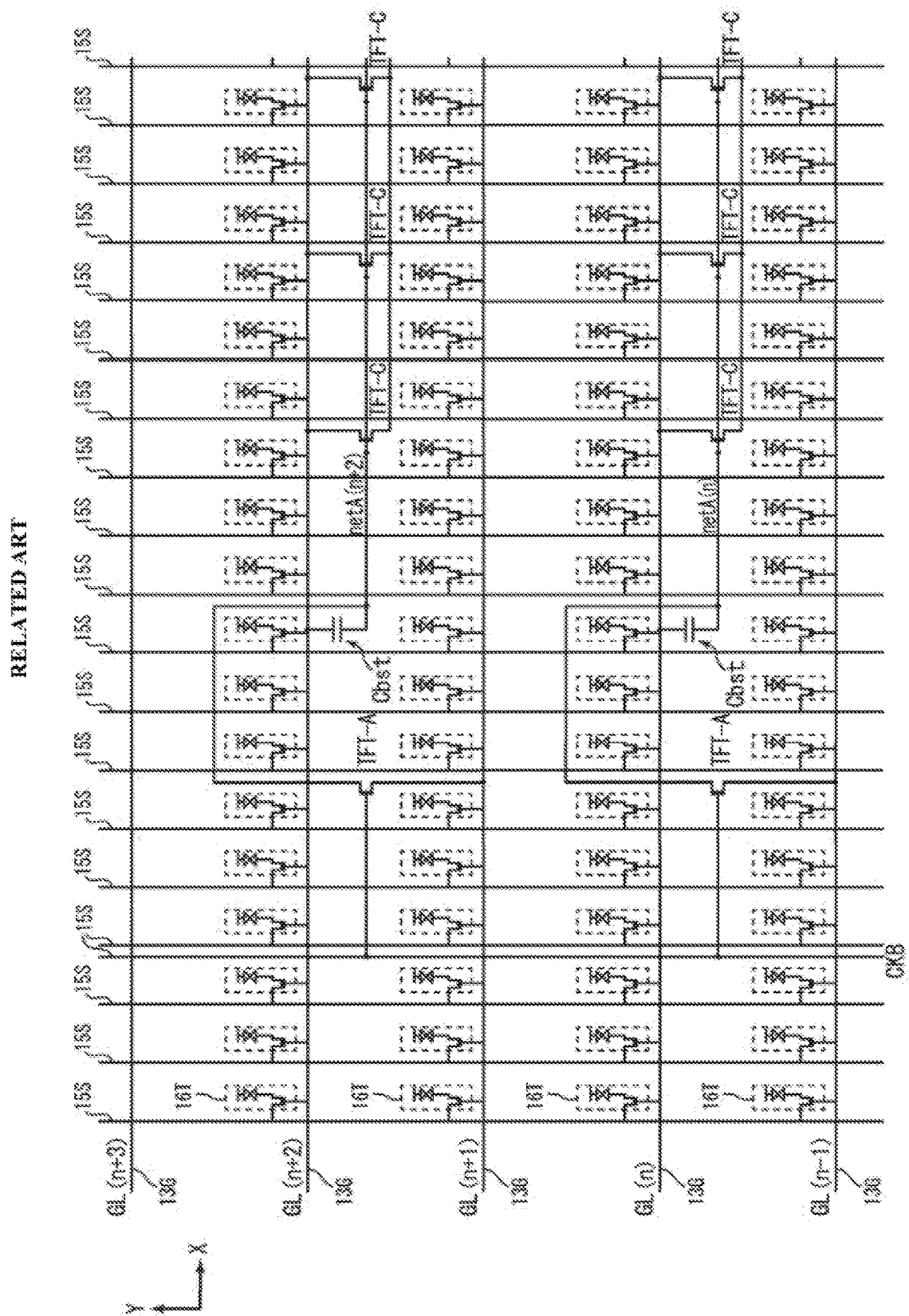
FIG. 11A illustrates an exemplary equivalent circuit in a case where the circuit of the gate driver illustrated in FIG.
Figure 11B:
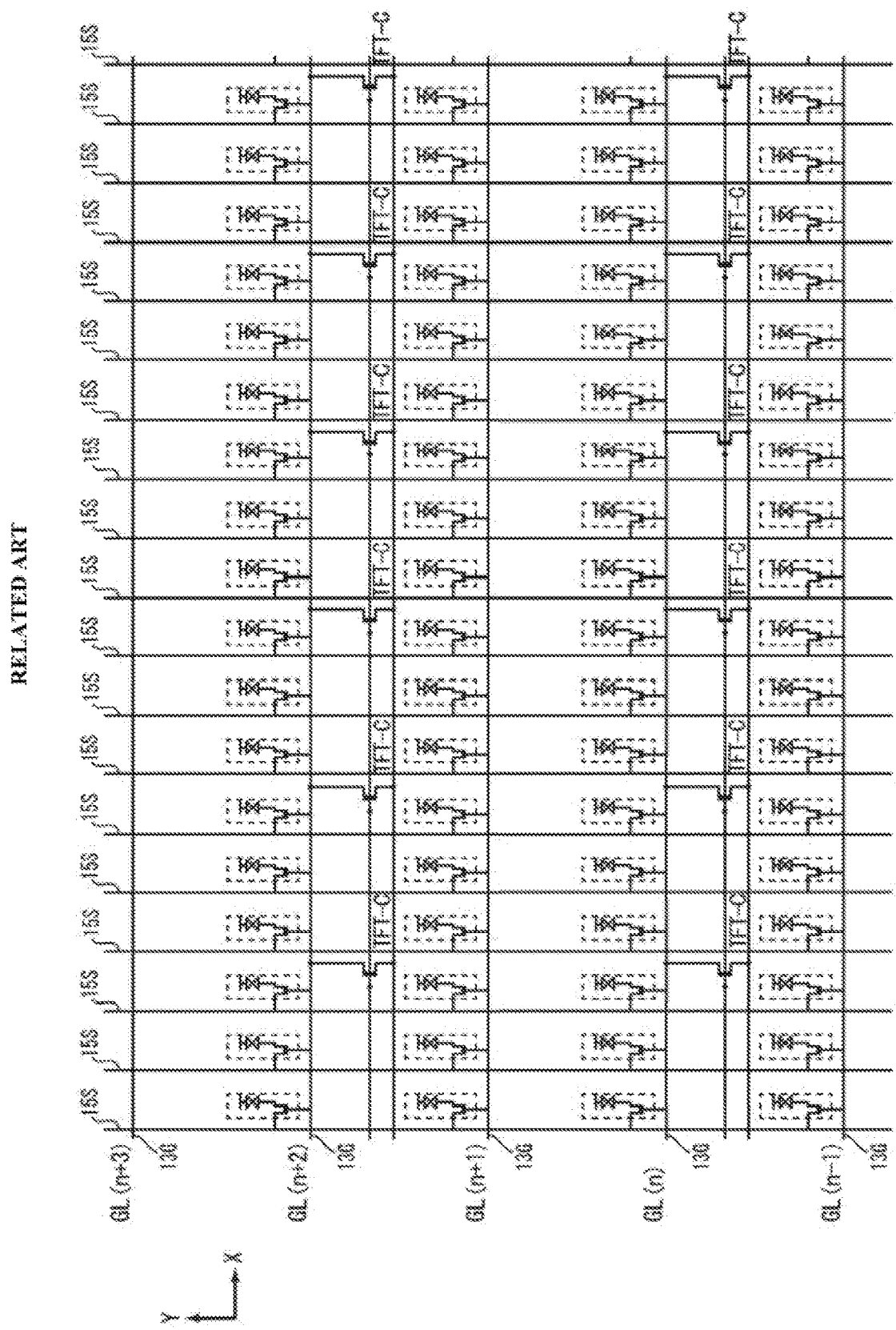

FIG. 11B illustrates an exemplary equivalent circuit in a case where the circuit of the gate driver illustrated in FIG. 4 is arranged in the display region of the conventional active matrix substrate illustrated in FIG. 8A.

Figure 11C:
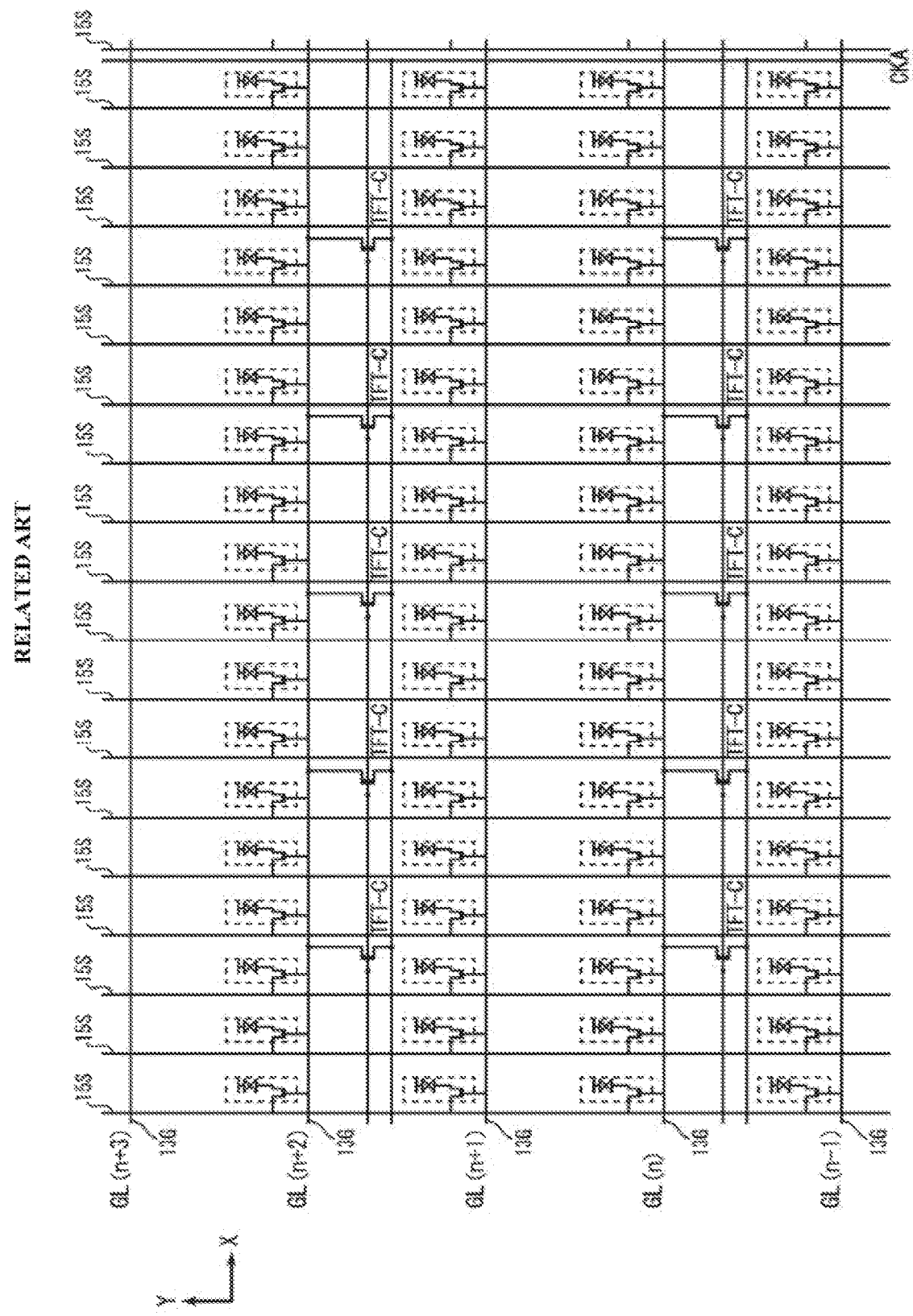

FIG. 11C illustrates an exemplary equivalent circuit in a case where the circuit of the gate driver illustrated in FIG. 4 is arranged in the display region of the conventional active matrix substrate illustrated in FIG. 8A.

Figure 11D:
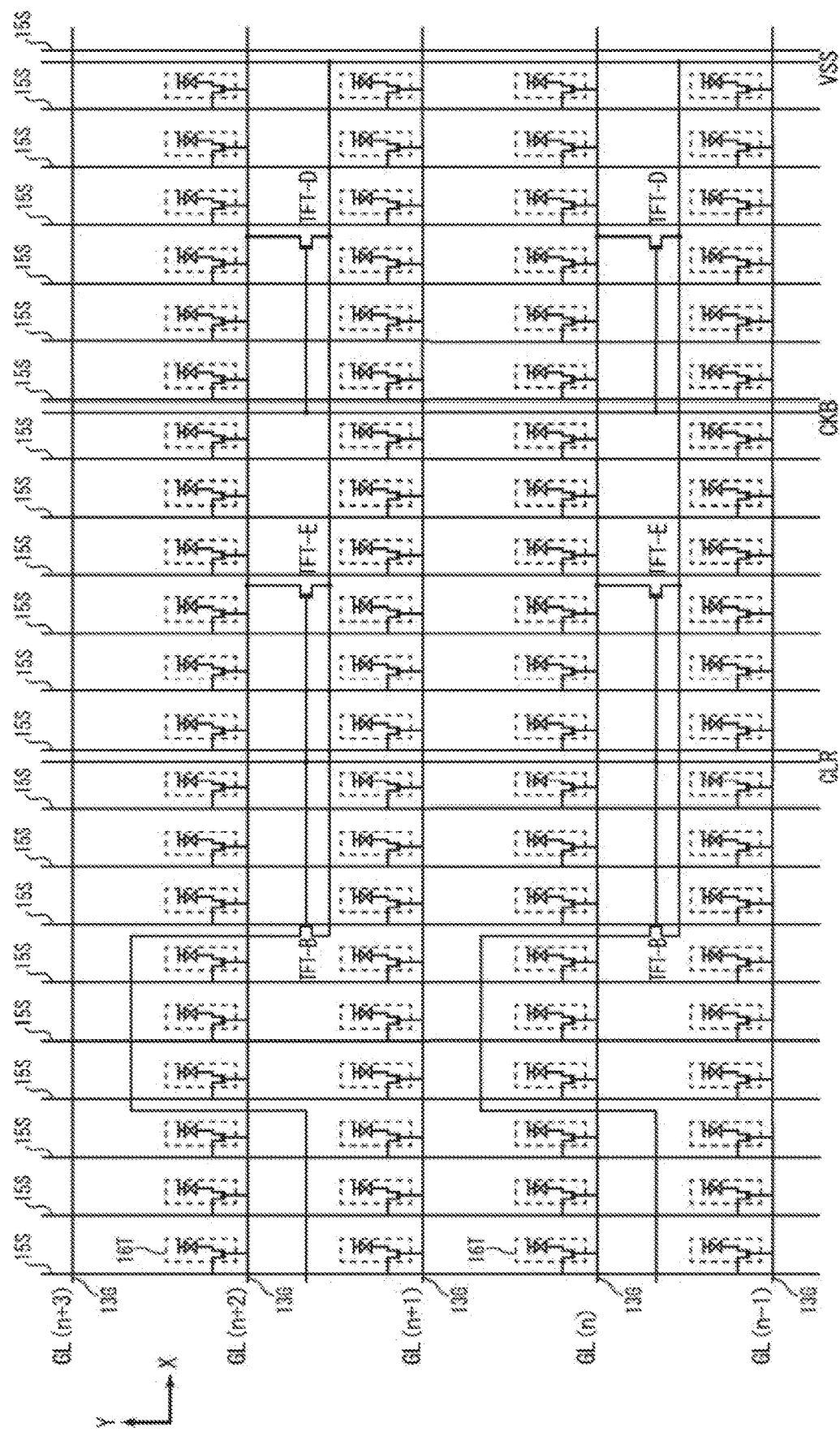

FIG. 11D illustrates an exemplary equivalent circuit in a case where the circuit of the gate driver illustrated in FIG. 4 is arranged in the display region of the conventional active matrix substrate illustrated in FIG. 8A.

Figure 12:
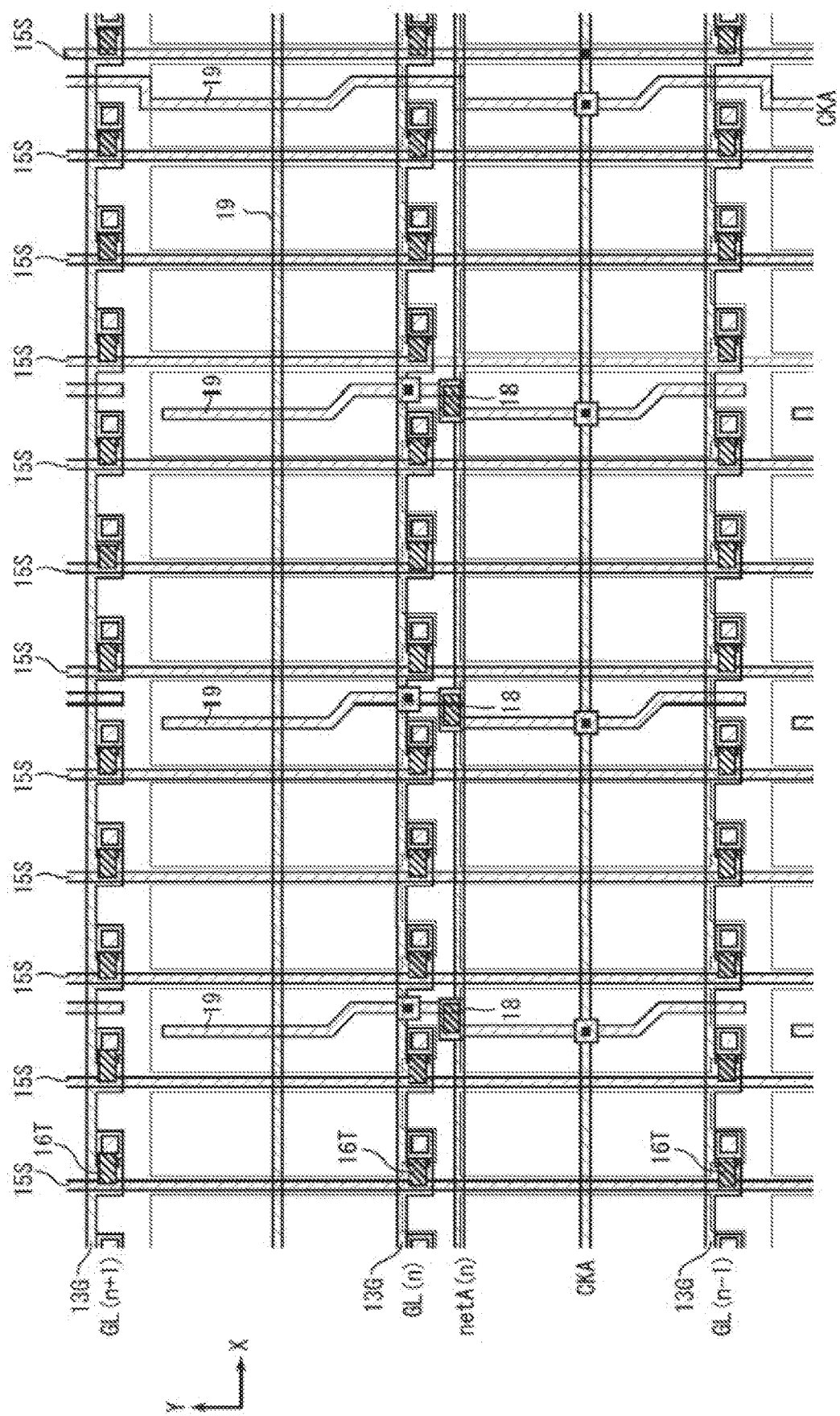

FIG. 12 illustrates a part of the TFTs-C excerpted from FIG. 11C and enlarged.

Figure 13A:
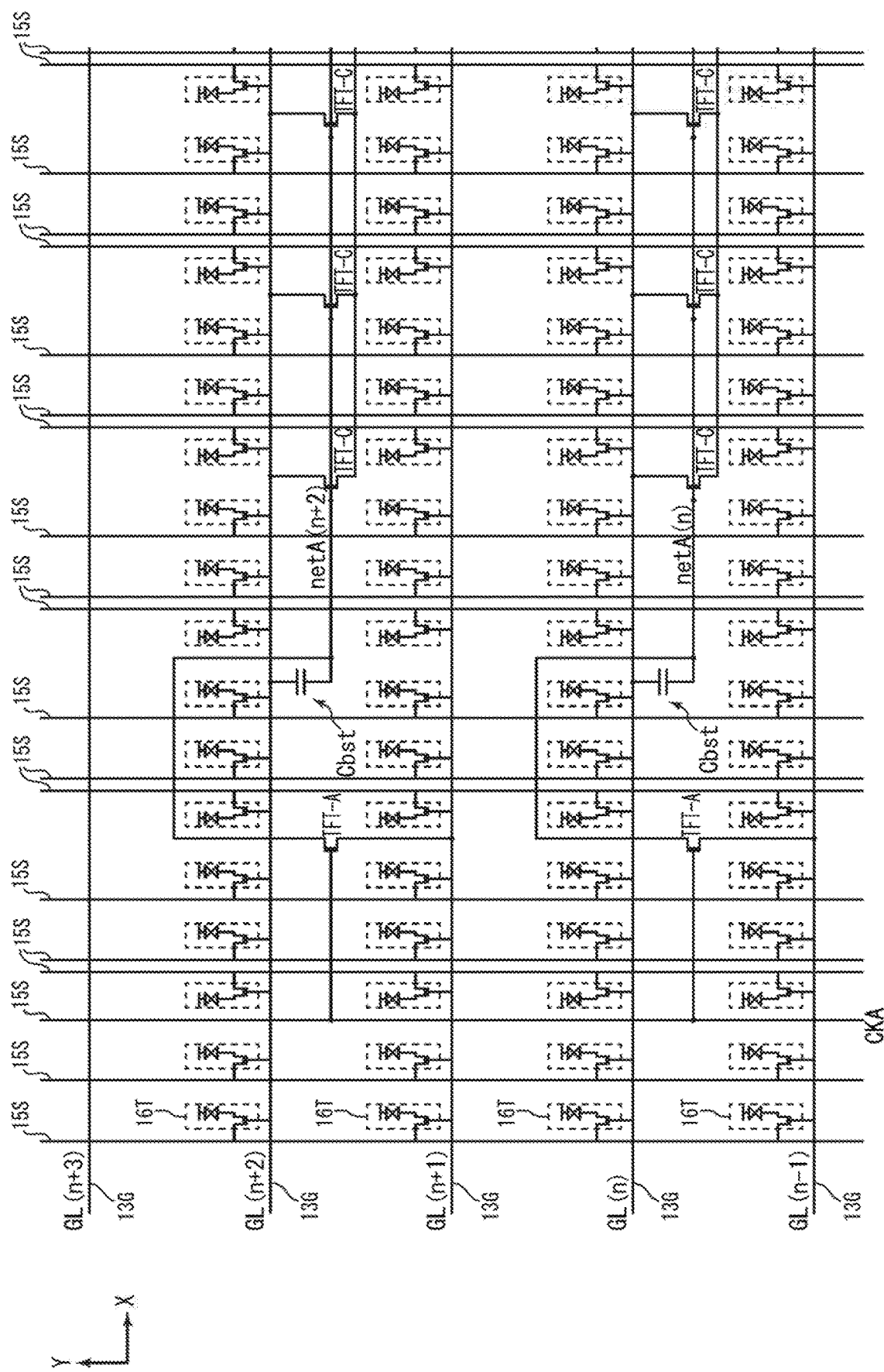

FIG. 13A illustrates an exemplary equivalent circuit in a case where the circuit of the gate driver illustrated in FIG. 4 is arranged in the display region of the active matrix substrate in Embodiment 1.

Figure 13B:
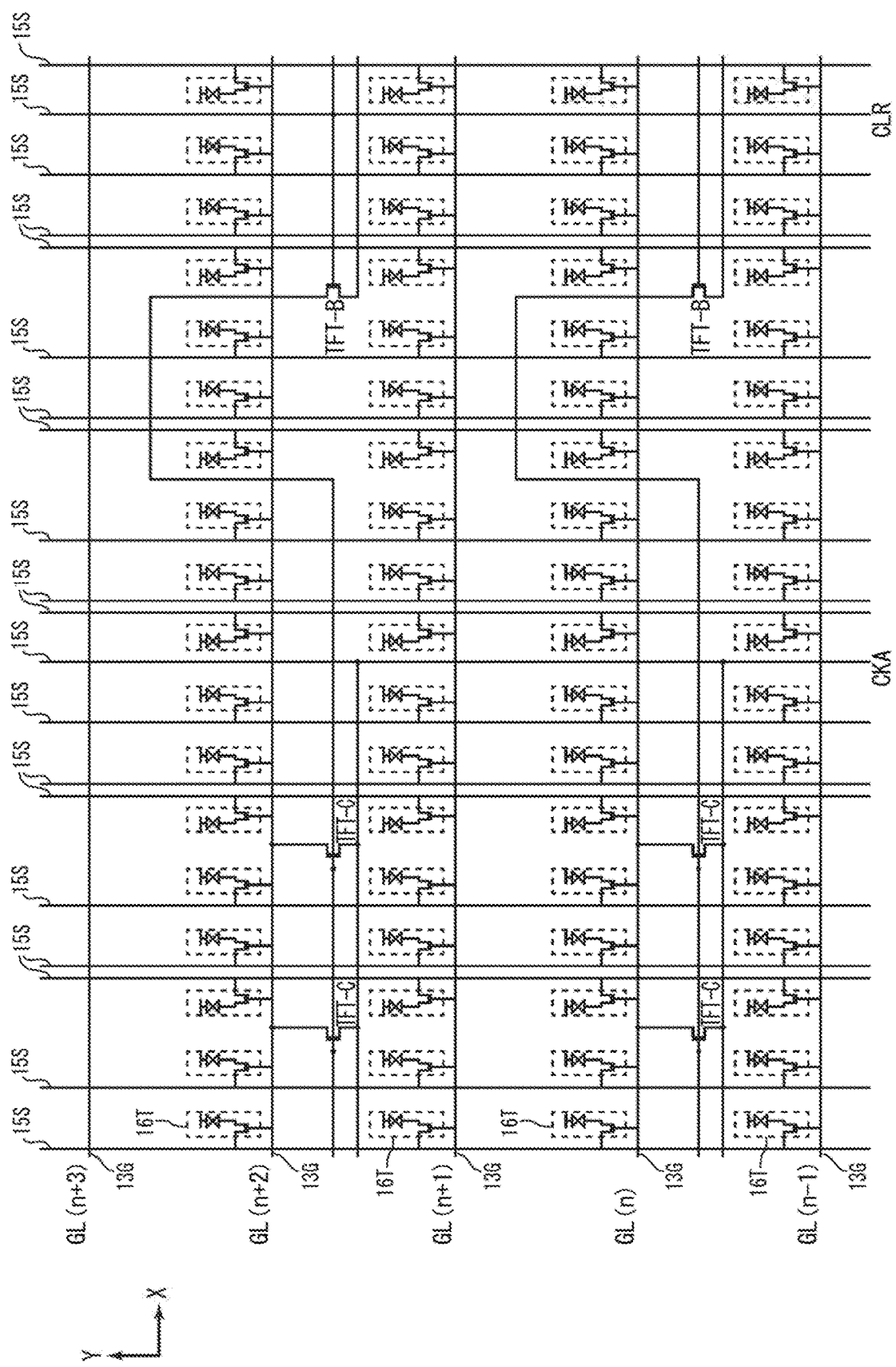

FIG. 13B illustrates the exemplary equivalent circuit in the case where the circuit of the gate driver illustrated in FIG. 4 is arranged in the display region of the active matrix substrate in Embodiment 1.

Figure 13C:
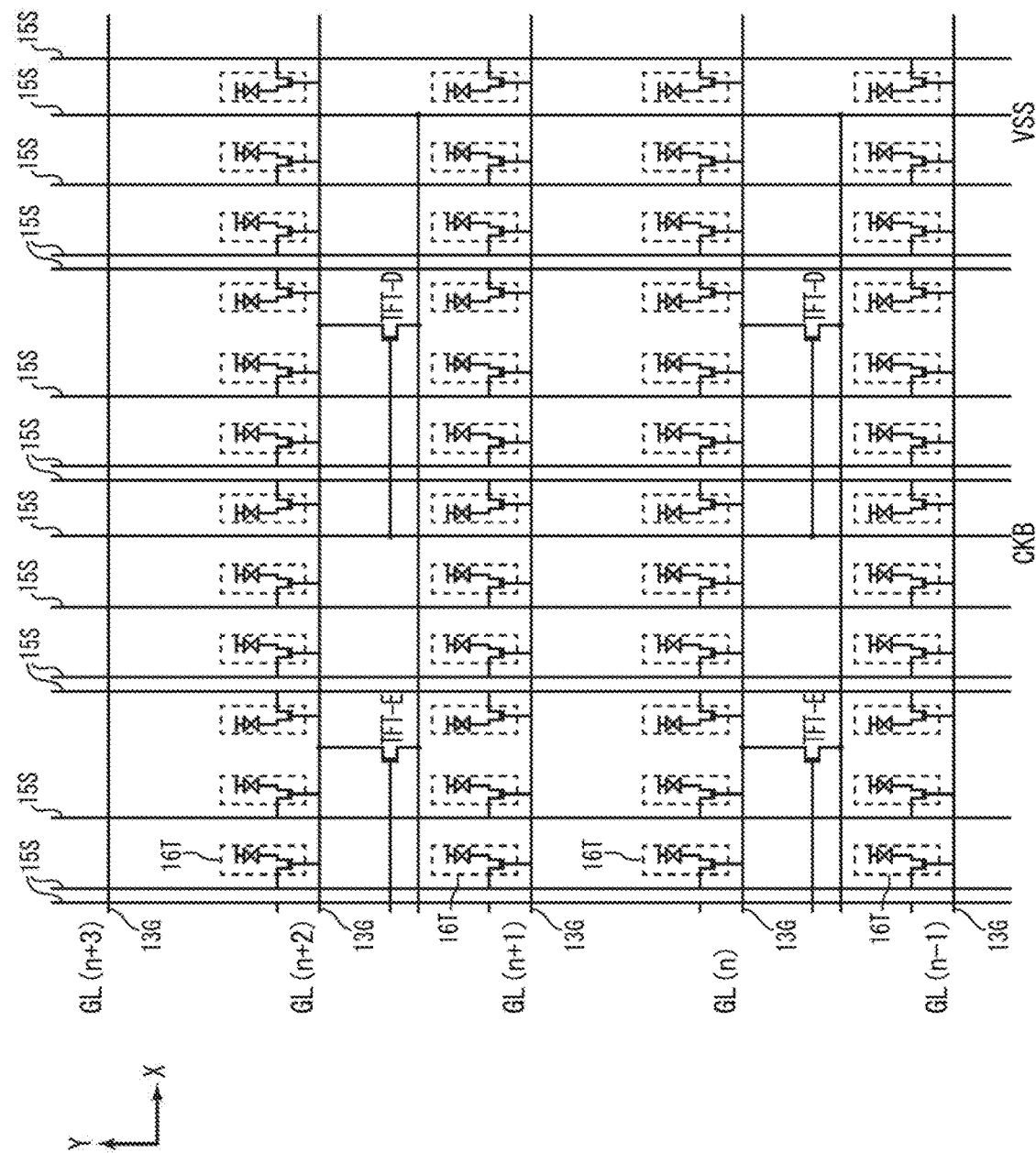

FIG. 13C illustrates the exemplary equivalent circuit in the case where the circuit of the gate driver illustrated in FIG. 4 is arranged in the display region of the active matrix substrate in Embodiment 1.

Figure 14:
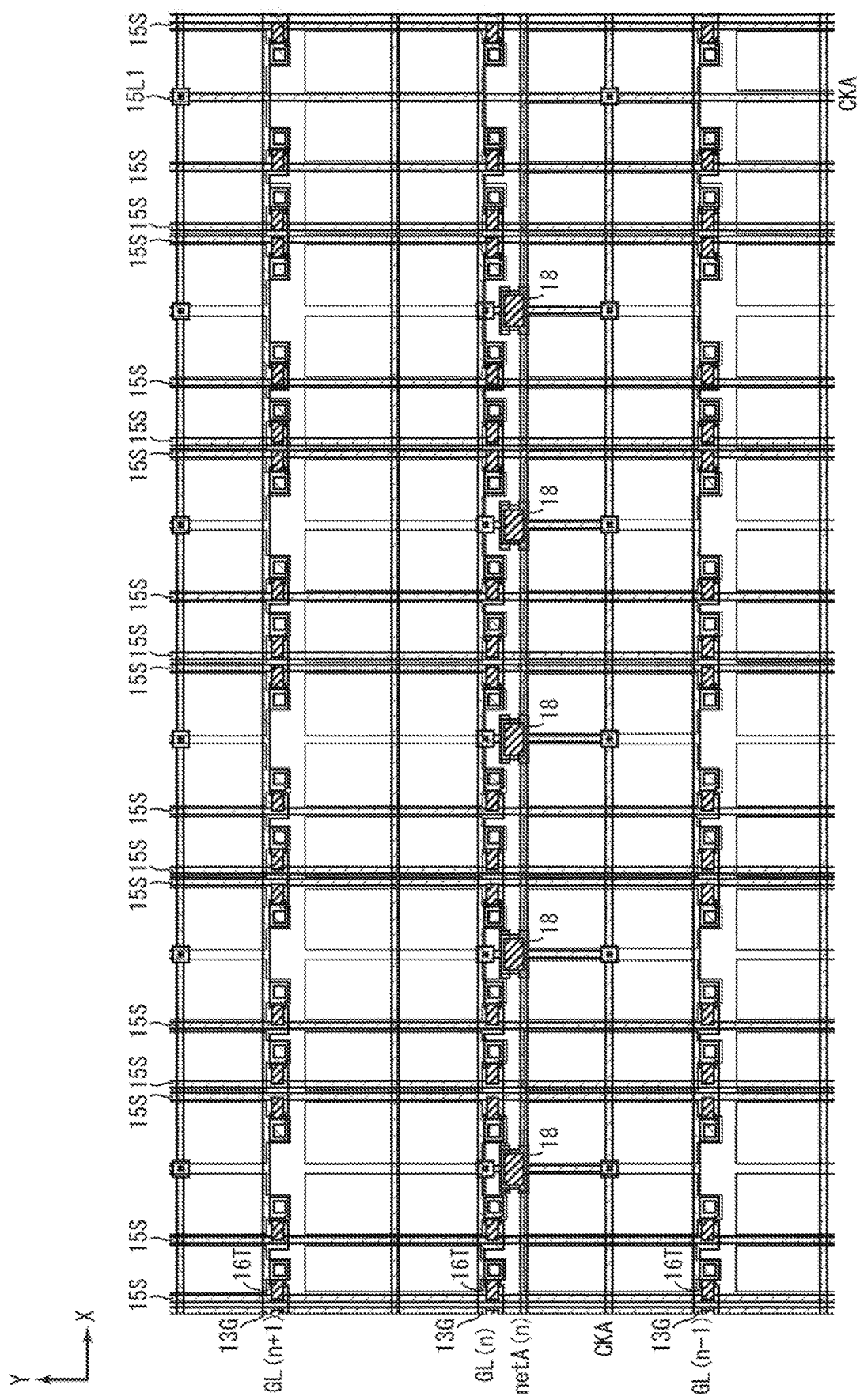

FIG. 14 illustrates the TFTs-C excerpted from FIGS. 13A to 13B and enlarged.

Figure 15A:
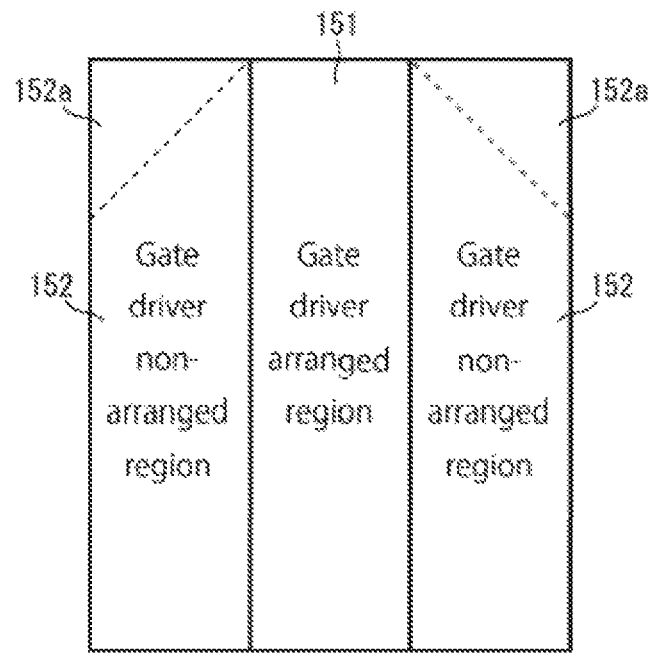

FIG. 15A schematically illustrates a gate driver arranged region and gate driver non-arranged regions in the conventional active matrix substrate.

Figure 15B:
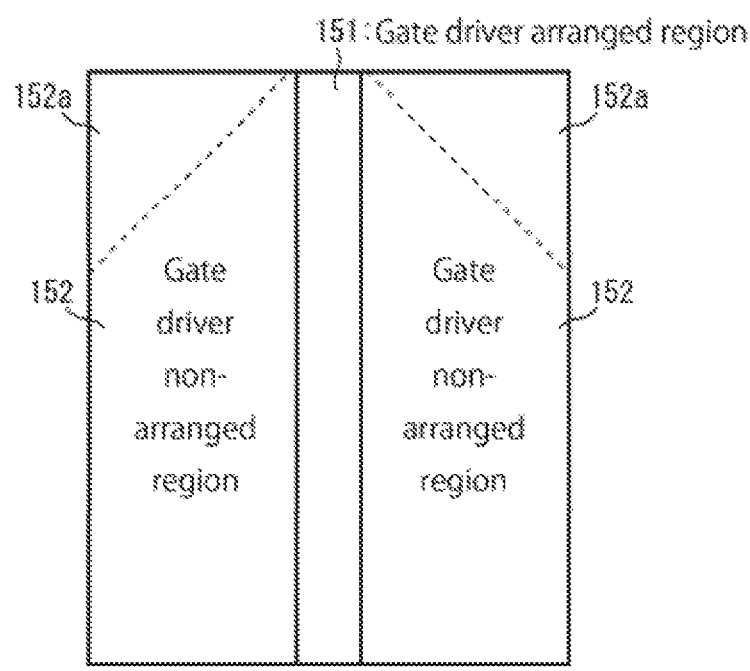

FIG. 15B schematically illustrates a gate driver arranged region and gate driver non-arranged regions in the active matrix substrate Embodiment 1.

Figure 16A:
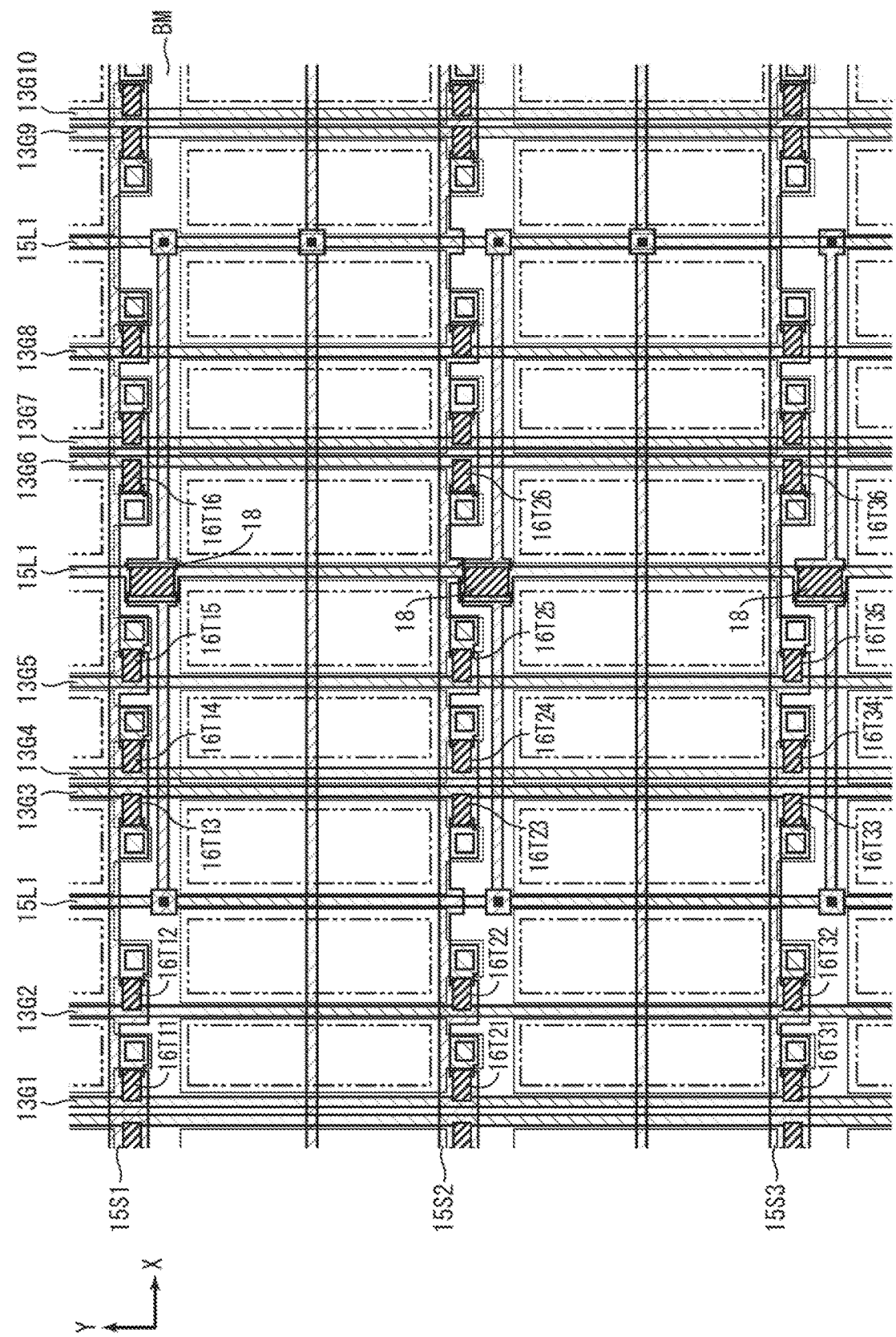

FIG. 16A illustrates a configuration of an active matrix substrate in Embodiment 2.

Figure 16B:
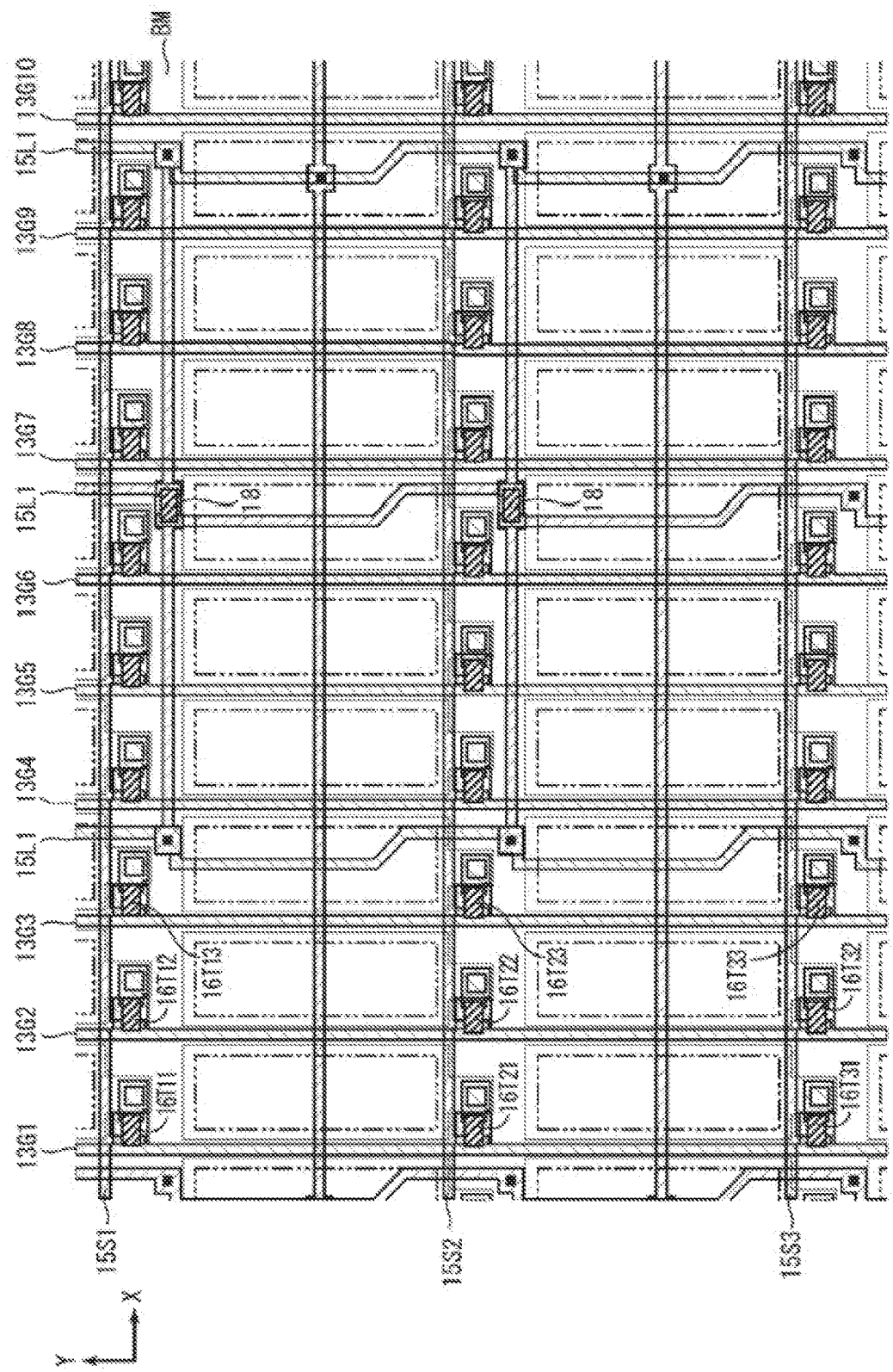

FIG. 16B illustrates a configuration of a conventional active matrix substrate in which gate lines are provided for respective colors, and source lines are provided for respective pixels.

Figure 17A:
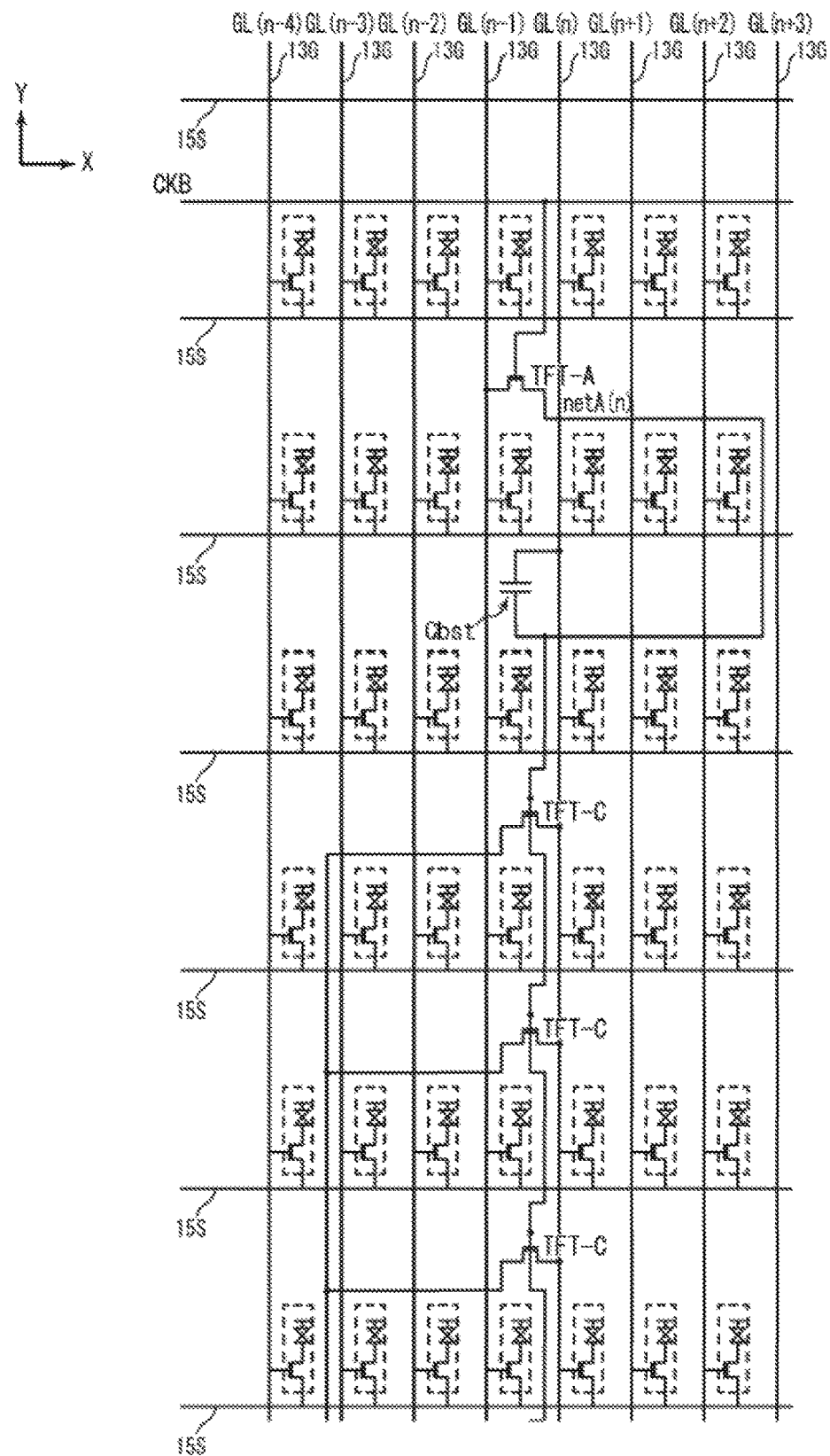

FIG. 17A illustrates an exemplary equivalent circuit in a case where the circuit of the gate driver illustrated in FIG. 4 is arranged in the display region of the conventional active matrix substrate illustrated in FIG. 16B.

Figure 17B:
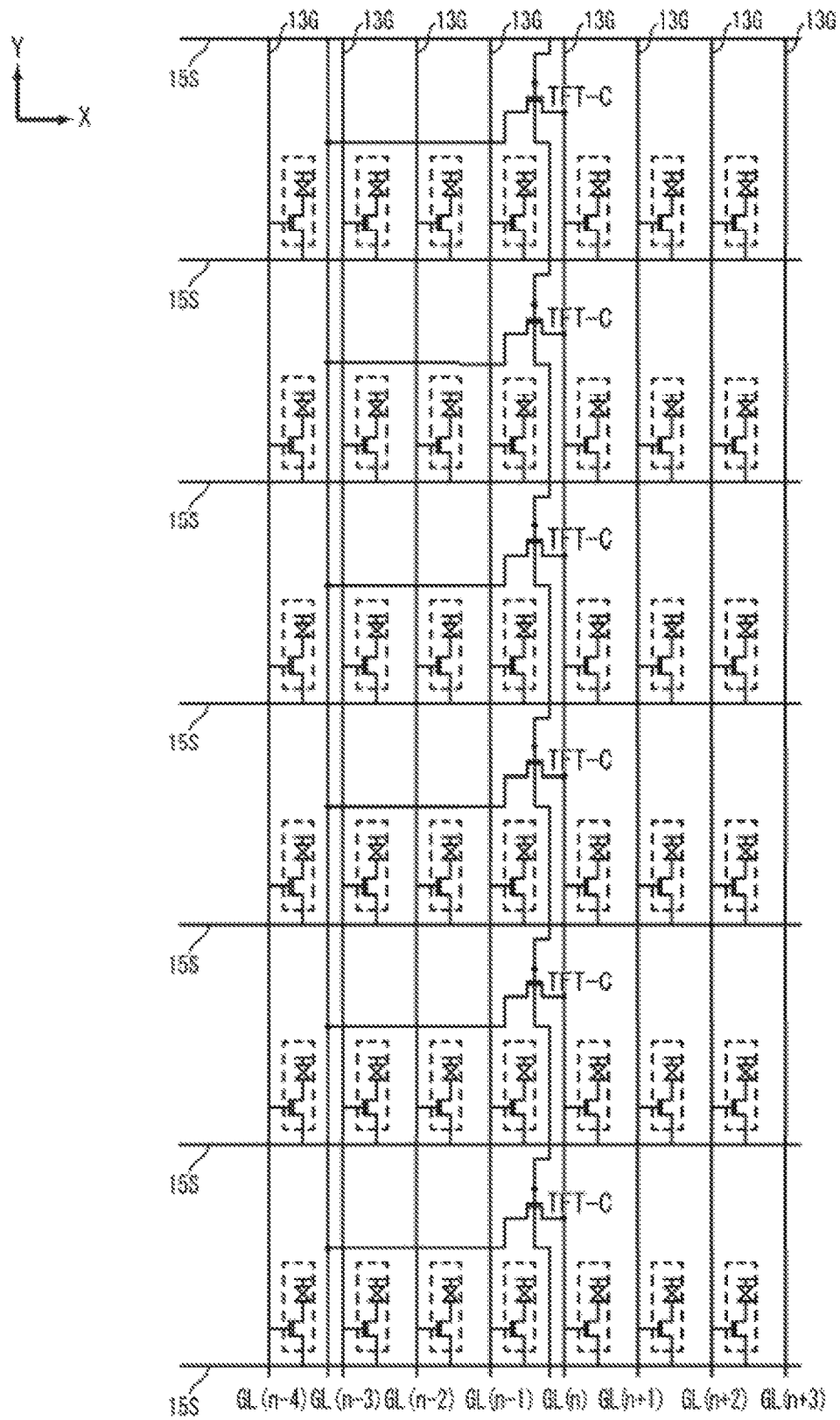

FIG. 17B illustrates an exemplary equivalent circuit in a case where the circuit of the gate driver illustrated in FIG. 4 is arranged in the display region of the conventional active matrix substrate illustrated in FIG. 16B.

Figure 17C:
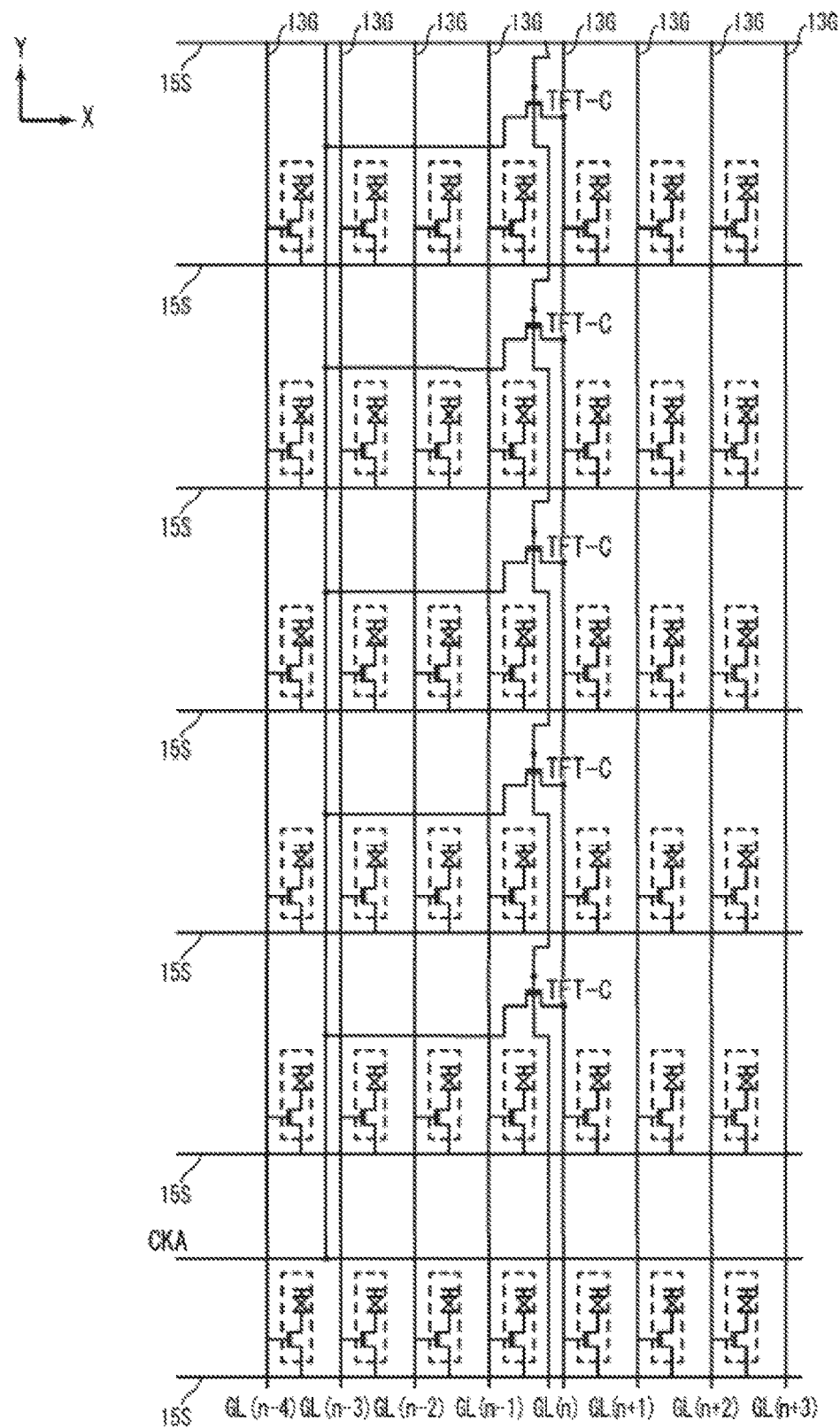

FIG. 17C illustrates an exemplary equivalent circuit in a case where the circuit of the gate driver illustrated in FIG. 4 is arranged in the display region of the conventional active matrix substrate illustrated in FIG. 16B.

Figure 17D:
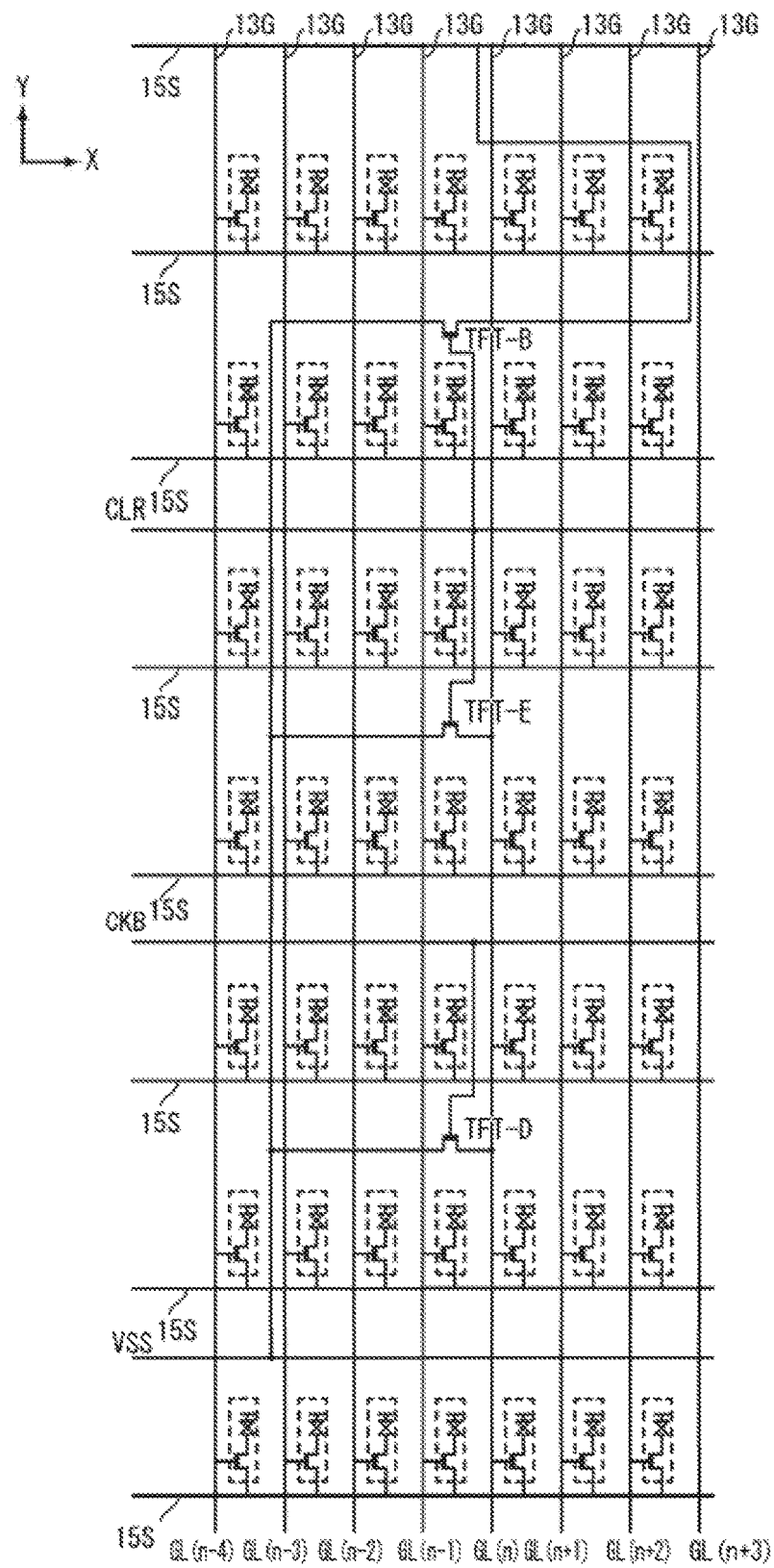

FIG. 17D illustrates an exemplary equivalent circuit in a case where the circuit of the gate driver illustrated in FIG. 4 is arranged in the display region of the conventional active matrix substrate illustrated in FIG. 16B.

Figure 18:
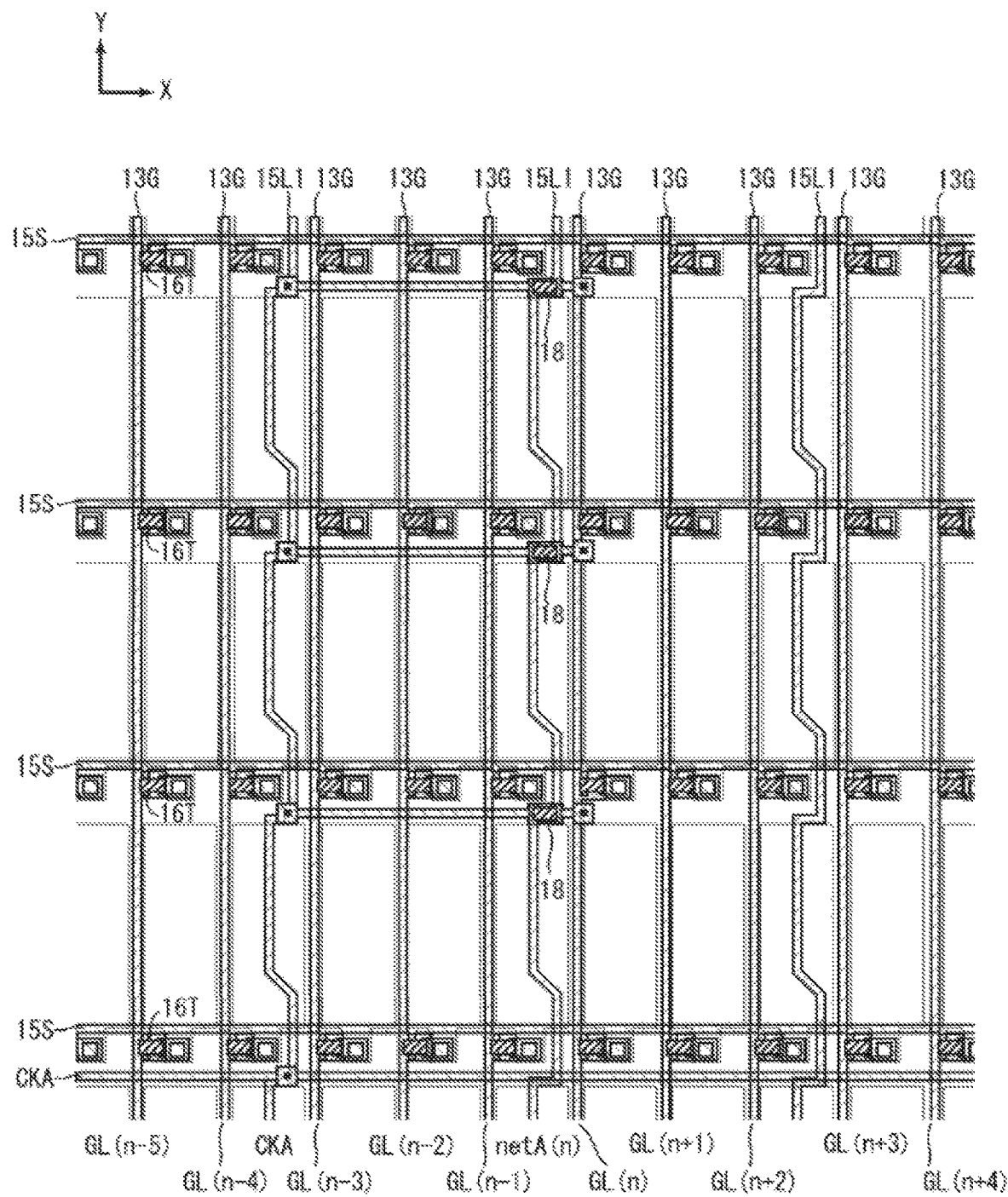

FIG. 18 illustrates a part of the TFTs-C excerpted from FIG. 17C and enlarged.

Figure 19A:
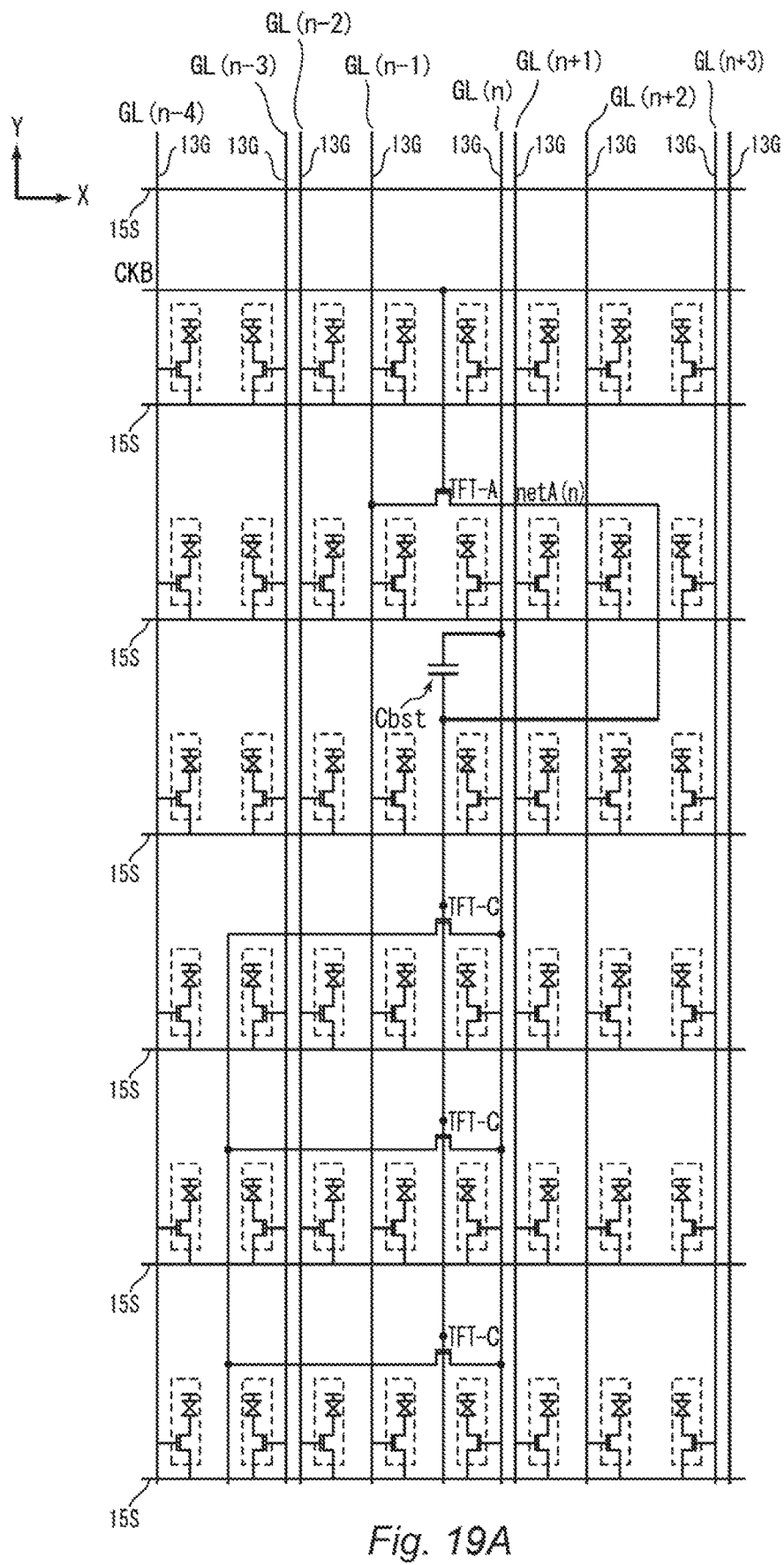

FIG. 19A illustrates an exemplary equivalent circuit in a case where the circuit of the gate driver illustrated in FIG. 4 is arranged in the display region of an active matrix substrate in Embodiment 2.

Figure 19B:
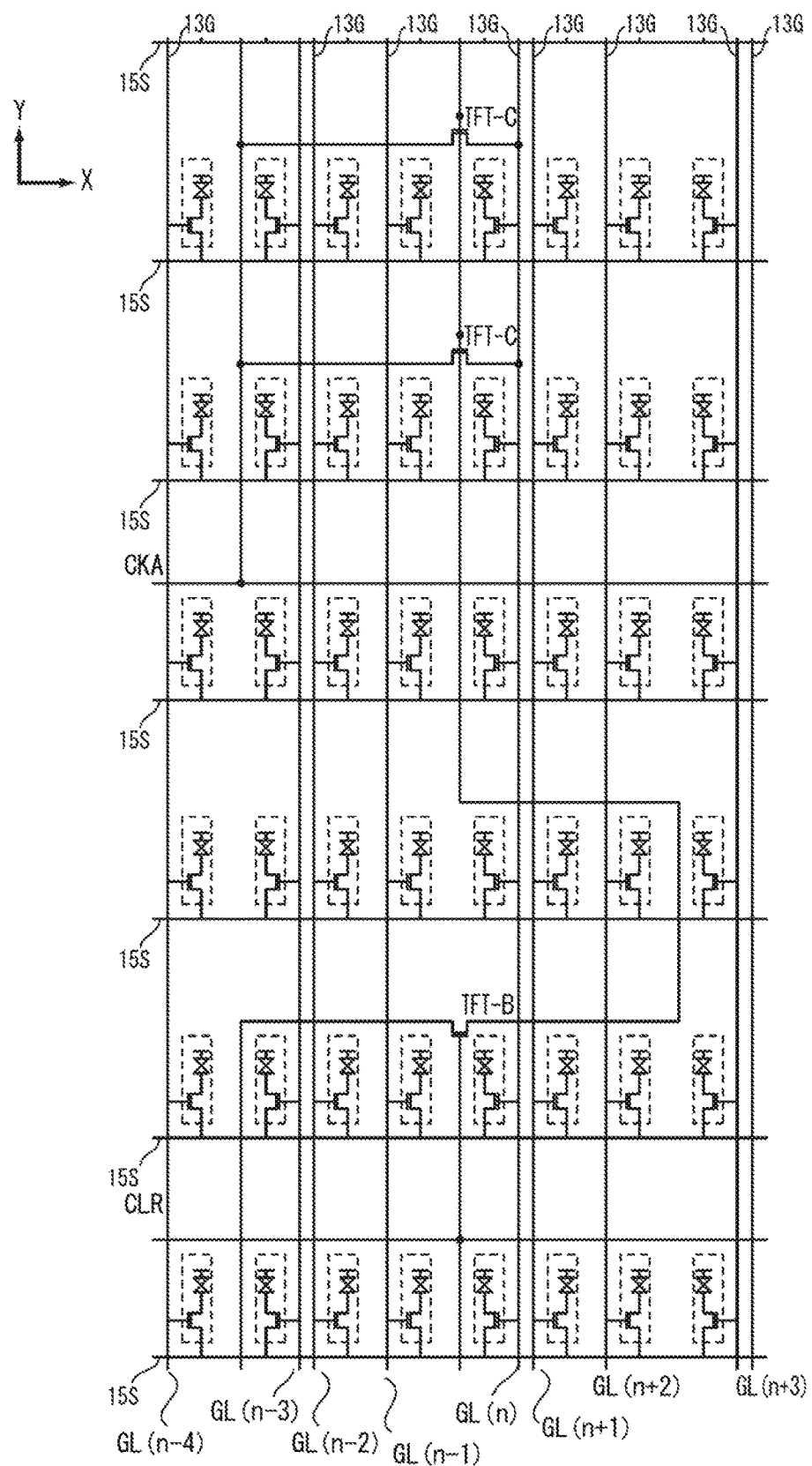

FIG. 19B illustrates an exemplary equivalent circuit in a case where the circuit of the gate driver illustrated in FIG. 4 is arranged in the display region of the active matrix substrate in Embodiment 2.

Figure 19C:
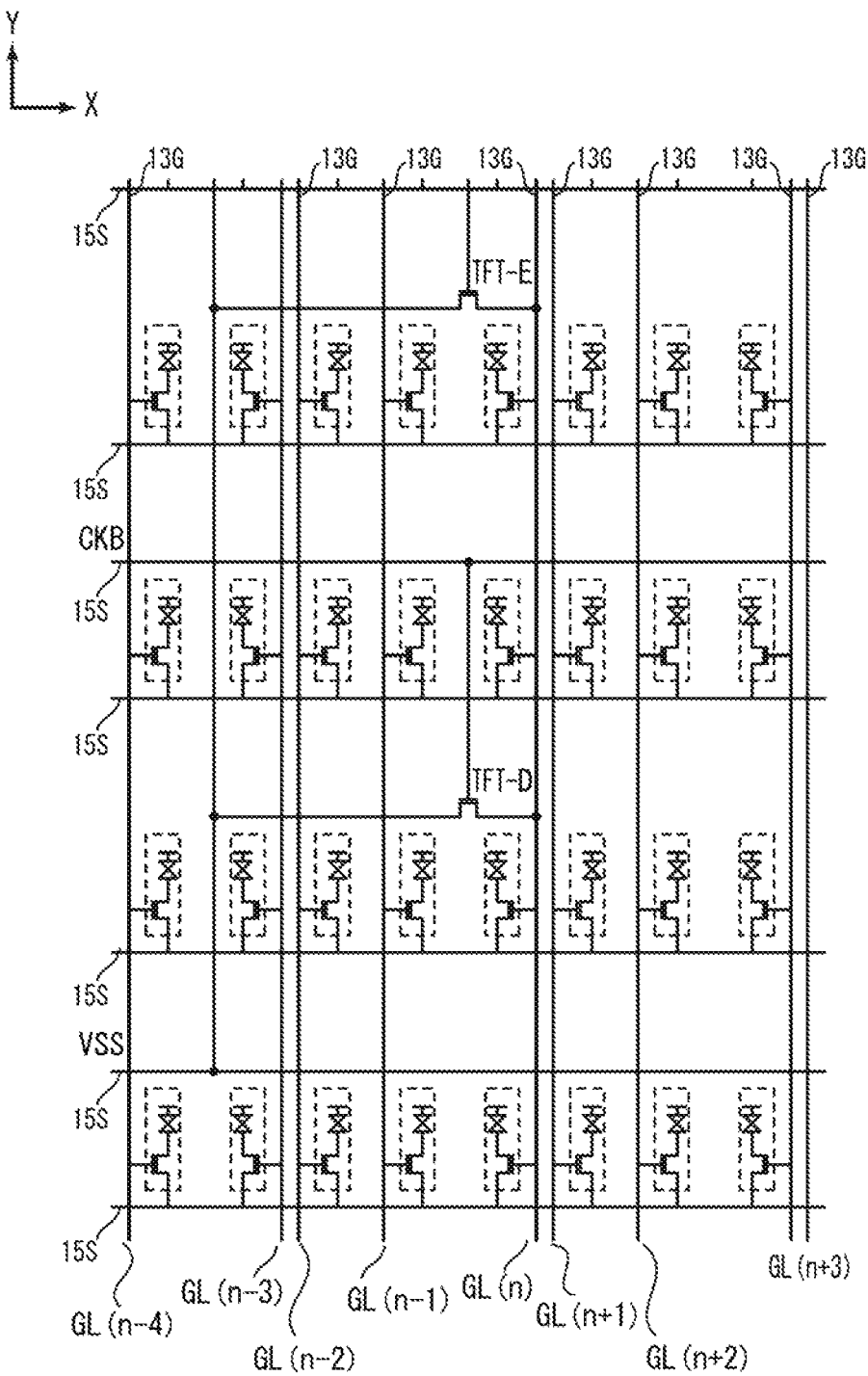

FIG. 19C illustrates an exemplary equivalent circuit in a case where the circuit of the gate driver illustrated in FIG. 4 is arranged in the display region of the active matrix substrate in Embodiment 2.

Figure 20:
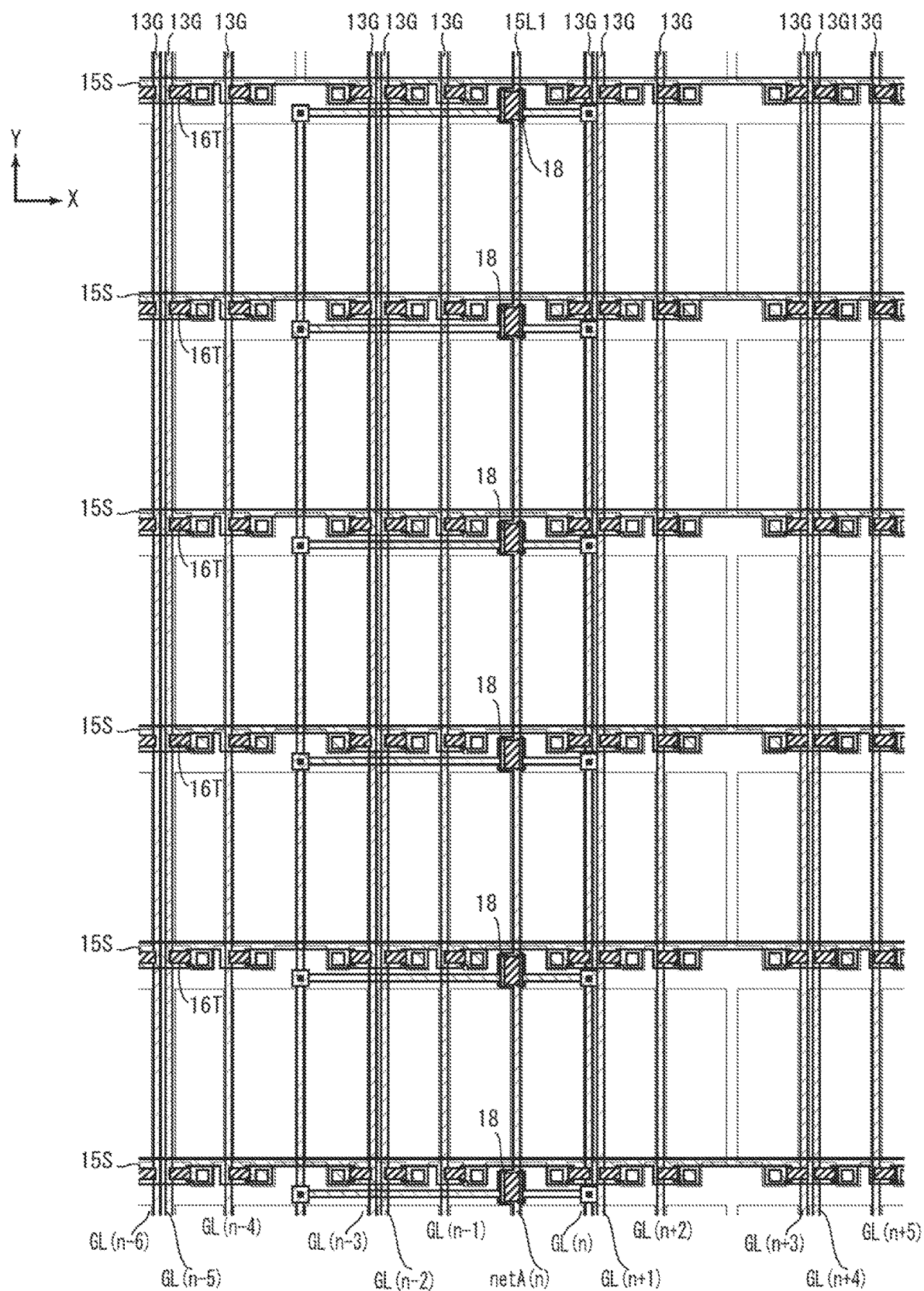

FIG. 20 illustrates a part of the TFTs-C excerpted from FIGS. 19A to 19B and enlarged.

Figure 21:
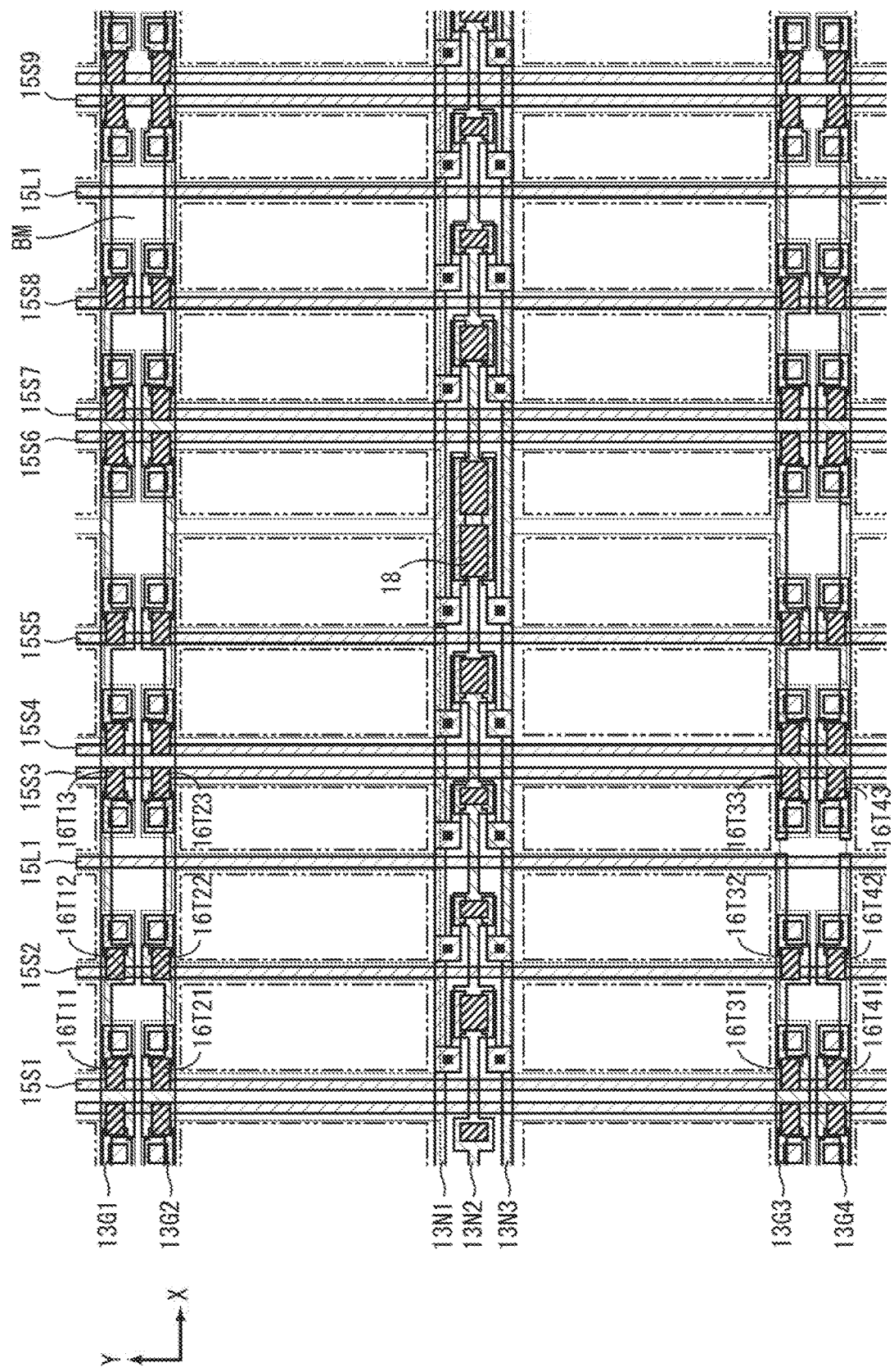

FIG. 21 illustrates a configuration an active matrix substrate in Embodiment 3.

Figure 22:
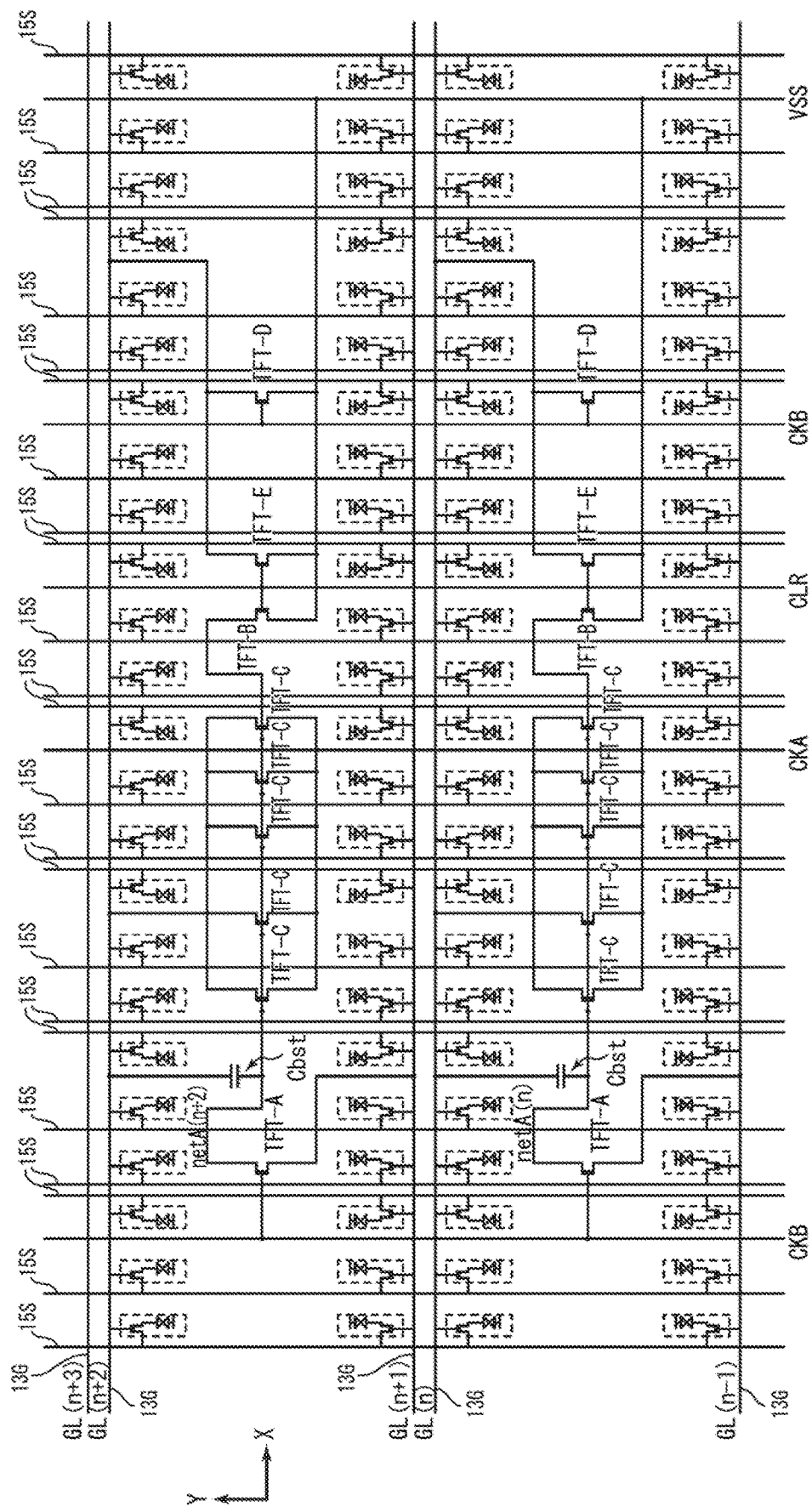

FIG. 22 illustrates an exemplary equivalent circuit in a case where the circuit of the gate driver illustrated in FIG. 4 is arranged in the display region of the active matrix substrate in Embodiment 3.

Figure 23:
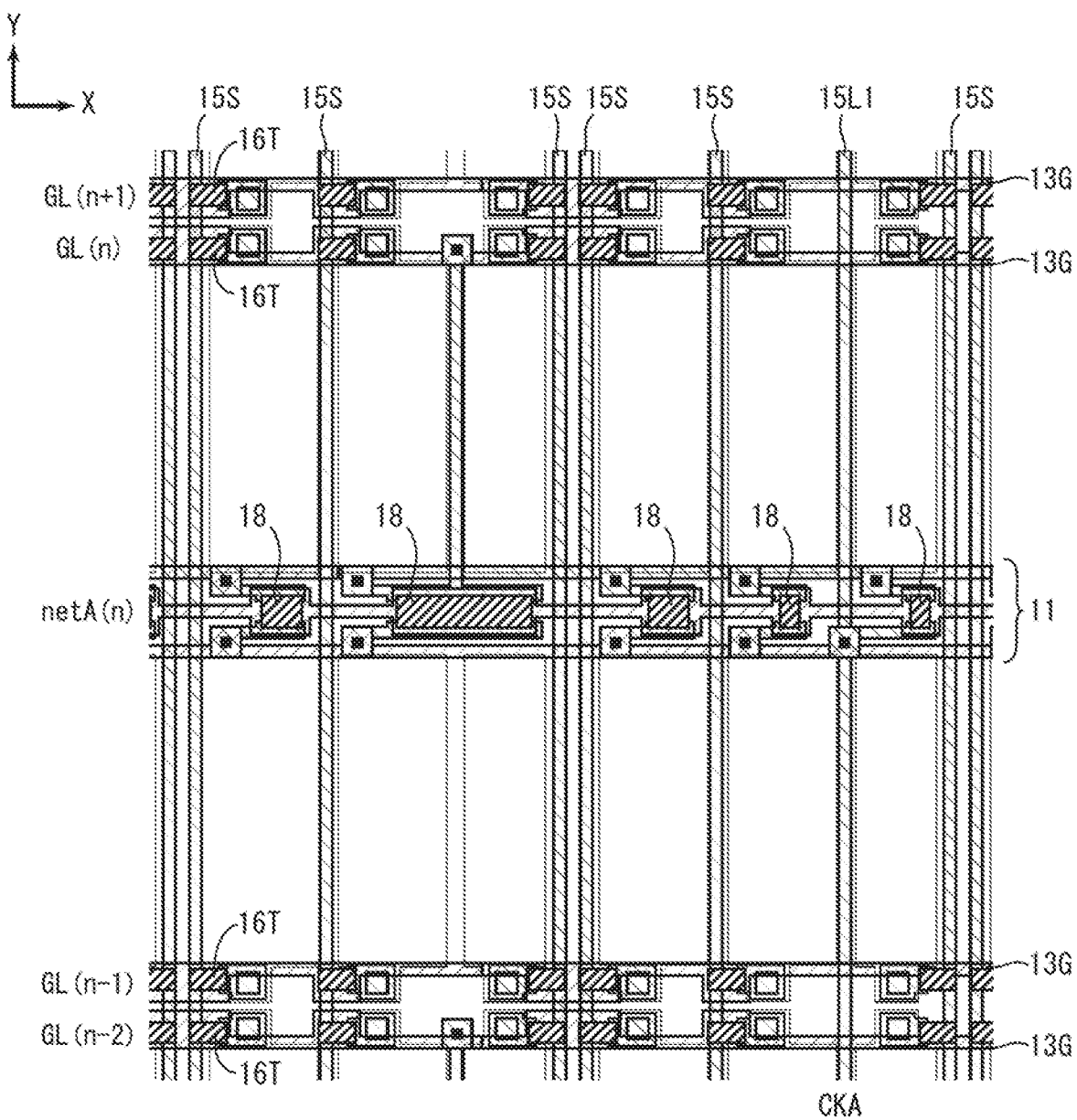

FIG. 23 illustrates a part of the TFTs-C excerpted from FIG. 22 and enlarged.

Figure 24:
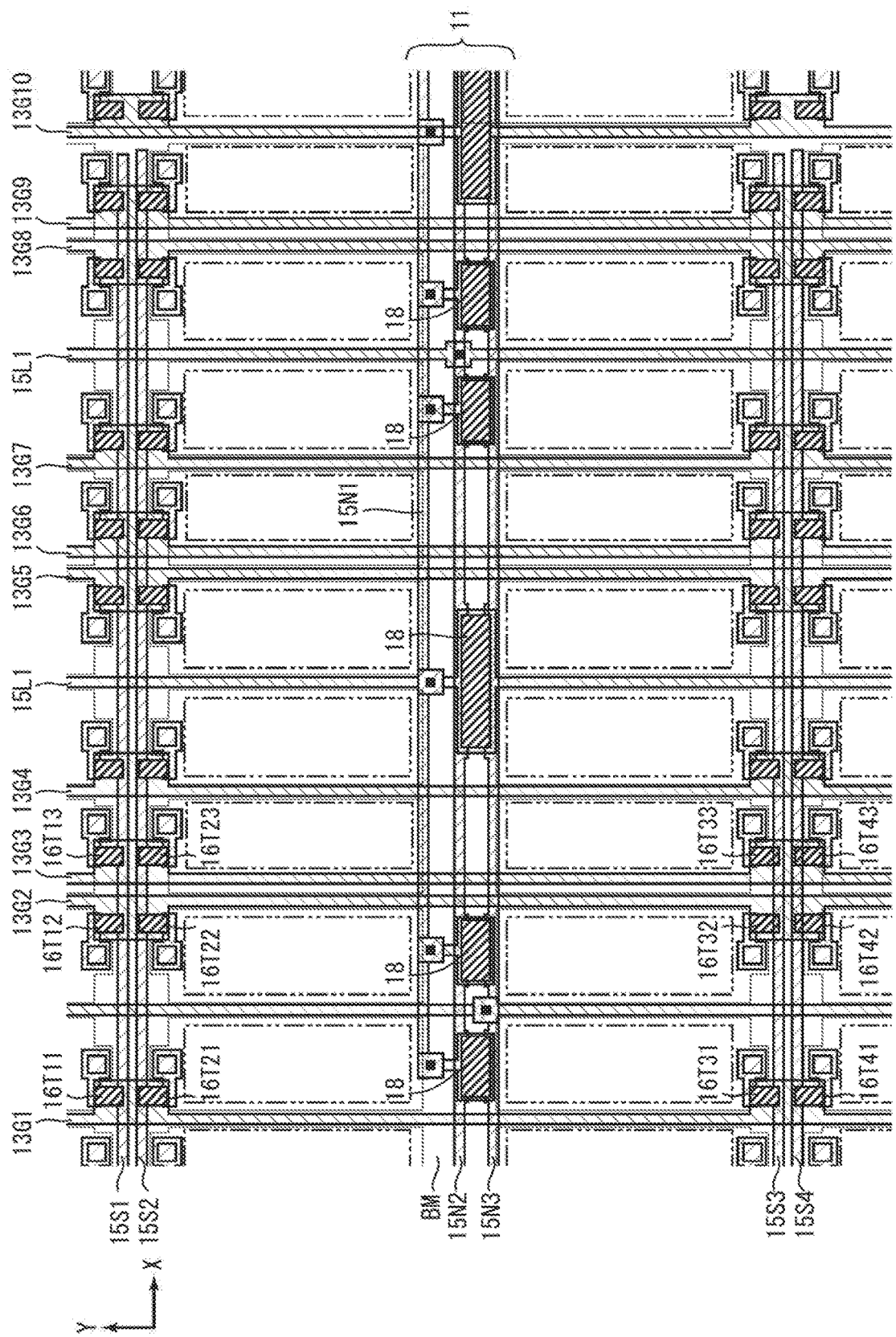

FIG. 24 illustrates a configuration an active matrix substrate in Embodiment 4.

Figure 25:
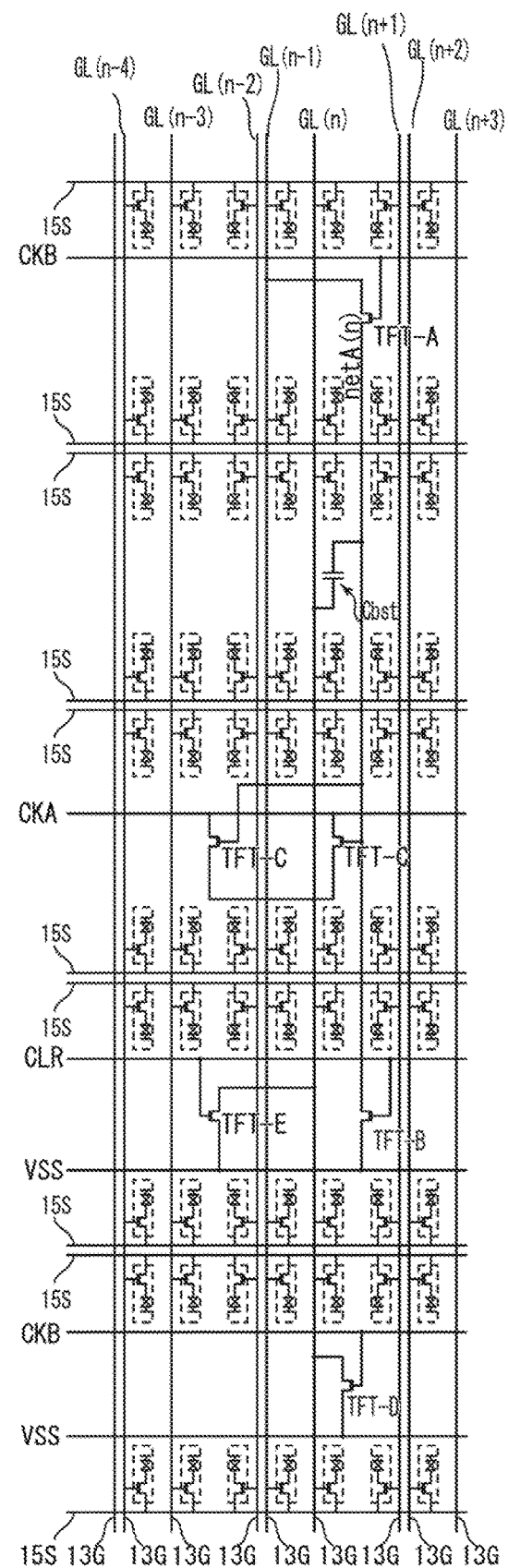

FIG. 25 illustrates an exemplary equivalent circuit in a case where the circuit of the gate driver illustrated in FIG. 4 is arranged in the display region of the active matrix substrate in Embodiment 4.

Figure 26:
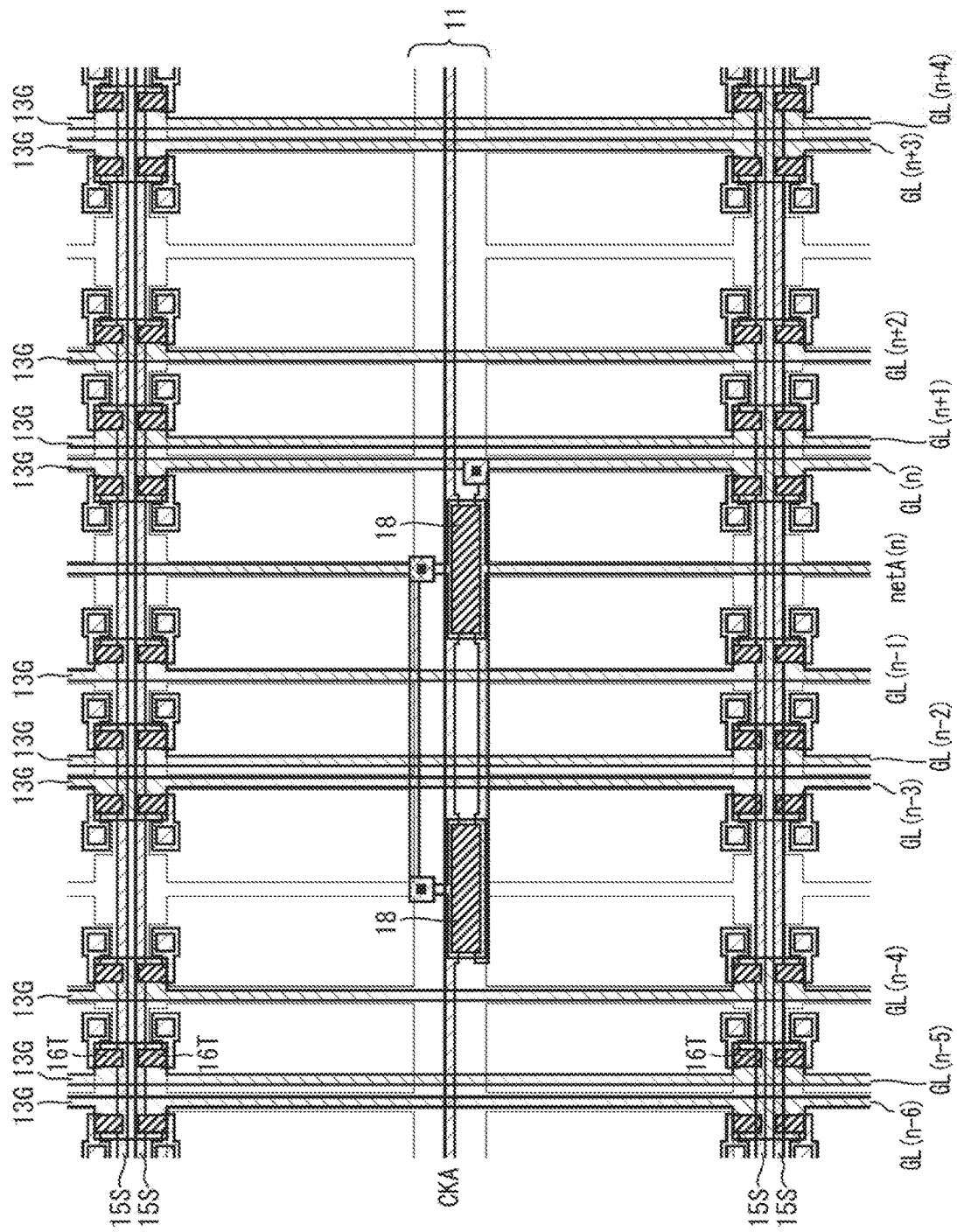

FIG. 26 illustrates a part of the TFTs-C excerpted from FIG. 25 and enlarged.

Figure 27:
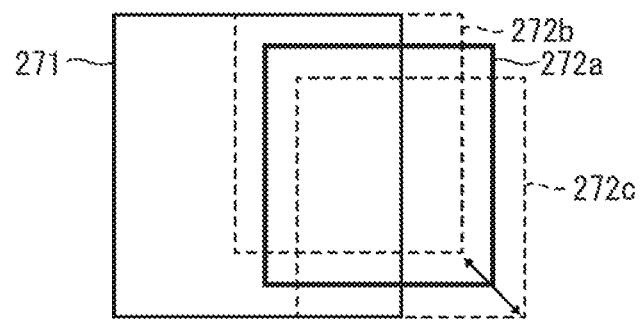

FIG. 27 is a diagram for explaining the displacement of a source layer with respect to a gate layer.

Figure 28:
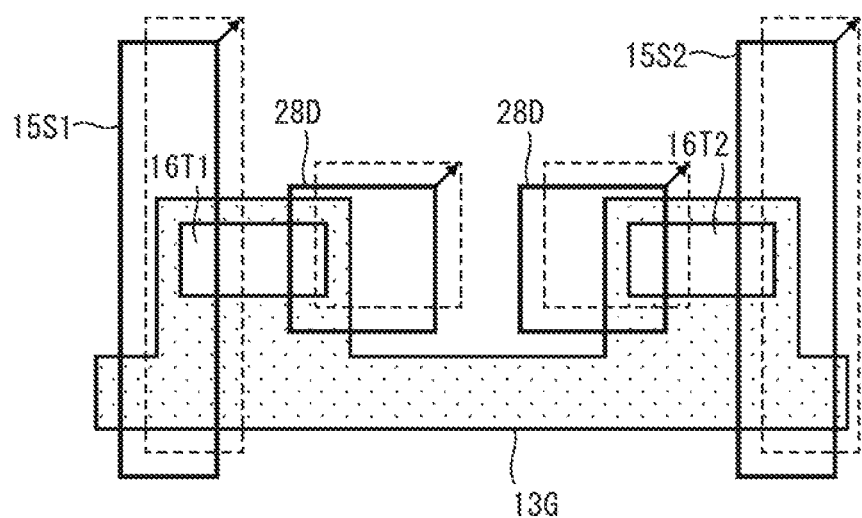

FIG. 28 is a diagram for explaining influences in a case where the displacement of the source line with respect to the gate line and the displacement of the drain pad with respect to the gate line occurs in the active matrix substrate in Embodiment 1.

Figure 29:
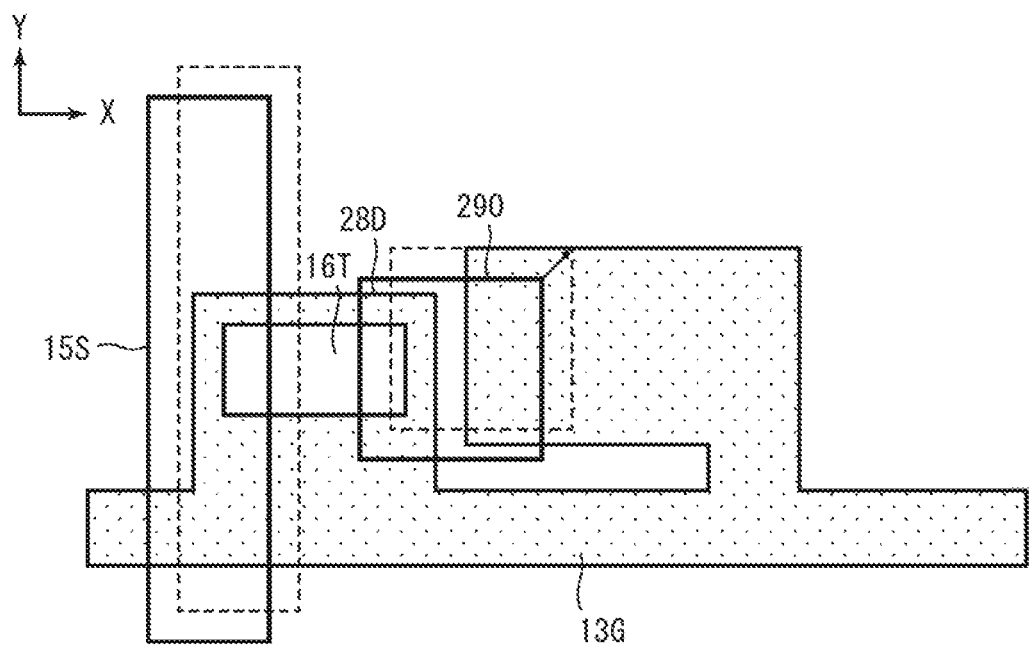

FIG. 29 illustrates an exemplary offset pattern formed on the gate layer.

Figure 30:
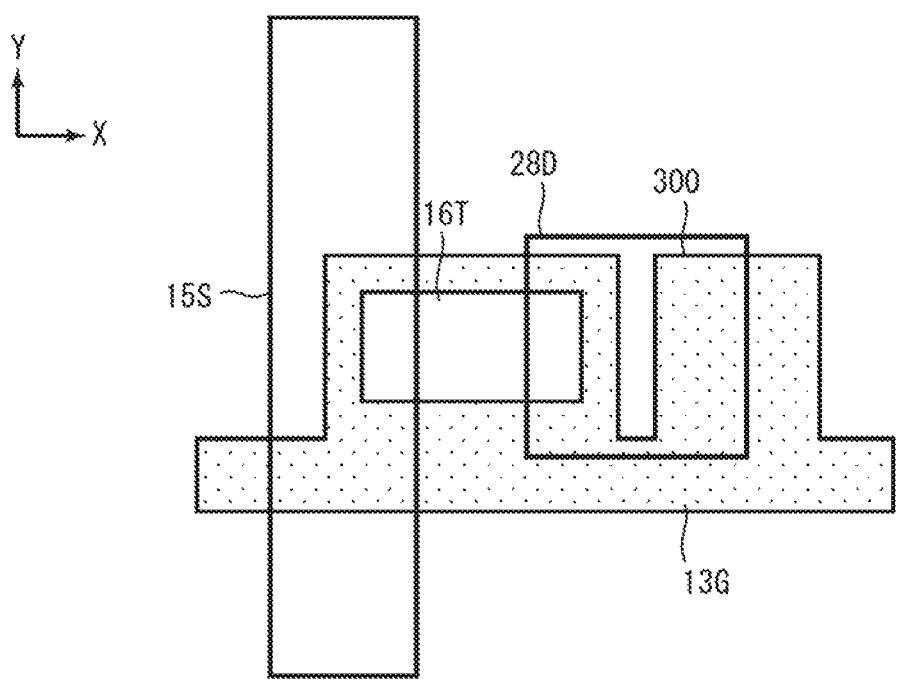

FIG. 30 illustrates an exemplary offset pattern of the gate layer for offsetting a change in the area of overlap between the gate line and the drain pad in a case where the drain pad is displaced in the horizontal direction with respect to the gate line.

Figure 31:
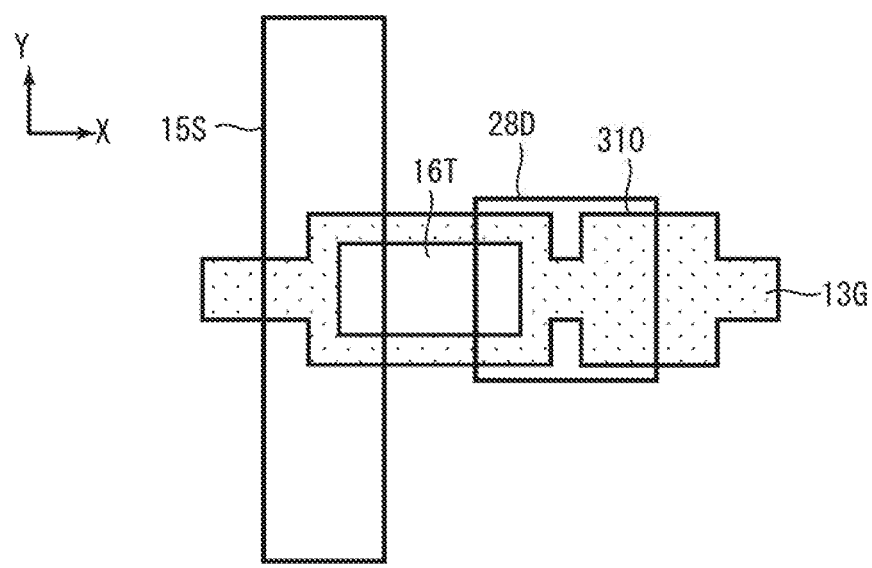

FIG. 31 illustrates an exemplary offset pattern of the gate layer for offsetting a change in the capacitance between the gate line and the drain pad in a case where the drain pad is displaced in the vertical and horizontal directions with respect to the gate line.

Figure 32:
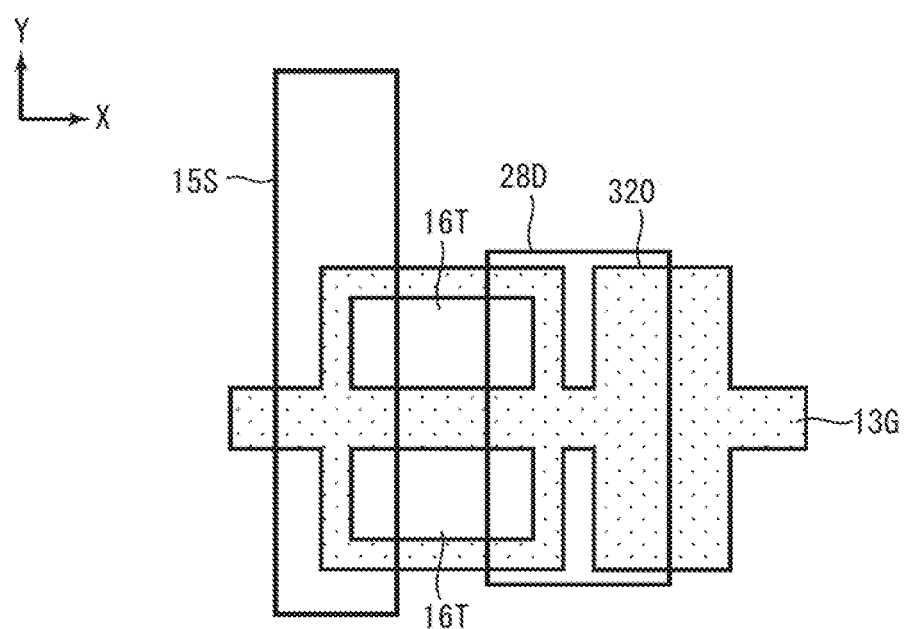

FIG. 32 illustrates an exemplary offset pattern of the gate layer provided in correspondence to two pixel-TFTs.

Figure 33:
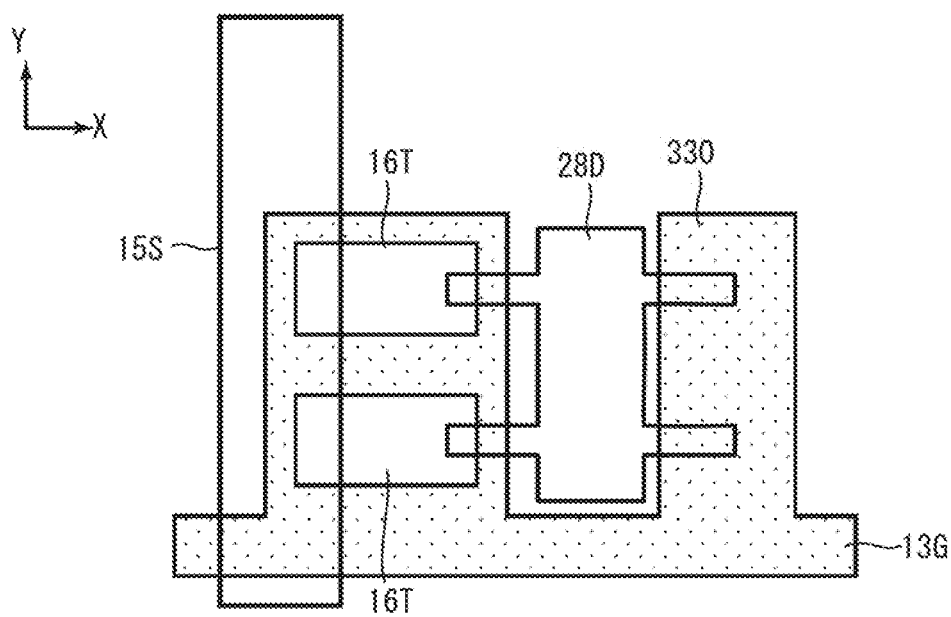

FIG. 33 illustrates an exemplary form of a non-rectangular drain pad and an offset pattern of the gate layer provided with respect to the drain pad.

Figure 34:
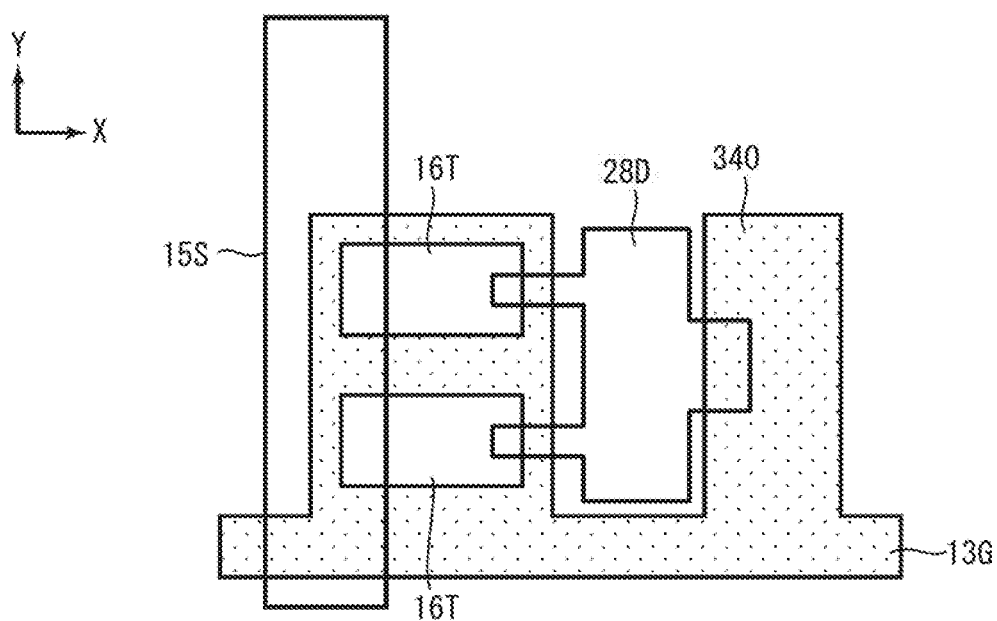

FIG. 34 illustrates another exemplary form of a non-rectangular drain pad and an offset pattern of the gate layer provided with respect to the drain pad.

Figure 35:
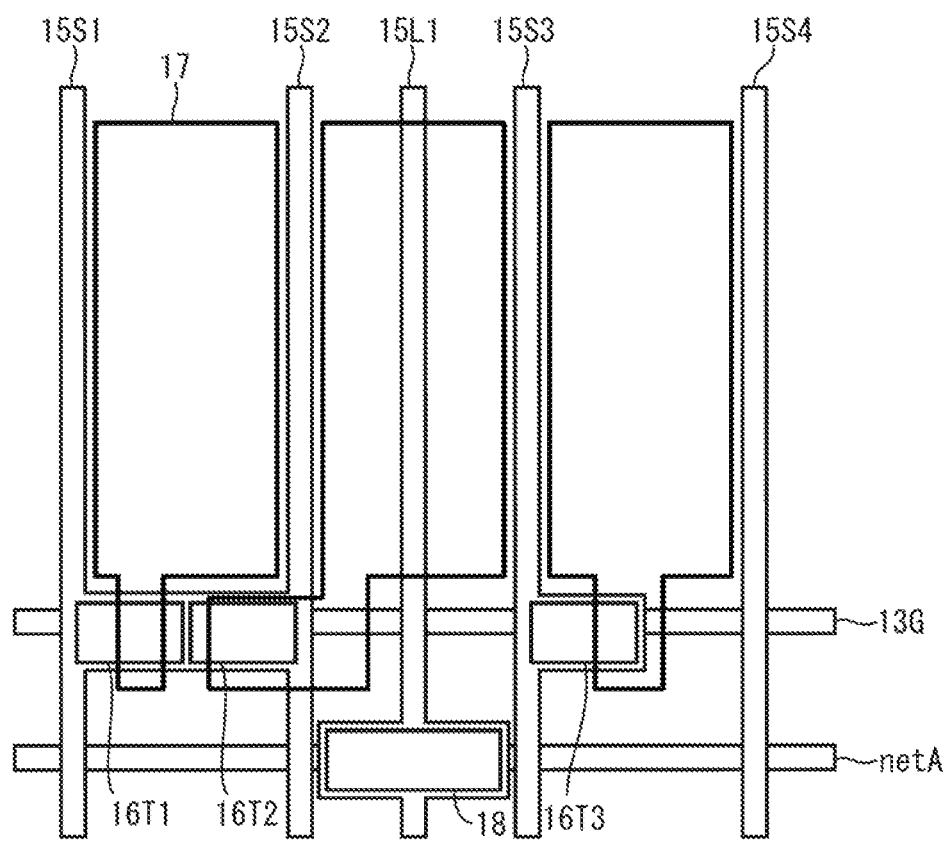

FIG. 35 is a schematic diagram for explaining a configuration of an active matrix substrate in which intervals between adjacent ones of the source lines are regular intervals.

MODE FOR CARRYING OUT THE INVENTION

An active matrix substrate in one embodiment of the present invention includes: a plurality of data lines; a plurality of lines that intersect with the data lines, and include at least a plurality of gate lines; a driving circuit that includes a plurality of switching elements, and are connected to at least part of the lines, so as to control potentials of the lines according to a control signal supplied from outside a display region; and a plurality of pixel control elements that are provided in correspondence to a plurality of pixels that compose the display region, and are connected with the data lines and the gate lines, so as to control display of the corresponding pixels, respectively. In the active matrix substrate, either the data lines or the gate lines are a plurality of vertical lines that extend in a longitudinal direction in plan view, and the other are a plurality of horizontal lines that extend in a lateral direction in plan view; among the pixel control elements, a part of the pixel control elements connected with one same horizontal line are arranged on one side with respect to the respective vertical lines to which the pixel control elements are connected, the side being different from a side on which the other pixel control elements connected with the same horizontal line are arranged; and at least a part of the switching elements are respectively arranged in areas between adjacent ones of the vertical lines, in each of which areas a distance between adjacent ones of the pixel control elements is wider than a distance between other adjacent ones of the pixel control elements.

Unlike the conventional active matrix substrate in which all of the pixel control elements are arranged on the same side with respect to the vertical lines extending in the longitudinal direction, this configuration includes areas between adjacent ones of the vertical lines, in each of which areas a distance between adjacent ones of the pixel control elements is greater than a distance between other adjacent ones of the pixel control elements. Since at least a part of the switching elements as constituent elements of a driving circuit are respectively arranged in these areas, large switching elements can be arranged therein. This can make the area for arranging a driving circuit smaller, thereby allowing the length of the internal node of the driving circuit to decrease. The decrease of the length of the internal node leads to a decrease in the number of the points of intersection between the internal node or the driver line and the gate lines or the source lines, which results in the improvement of the yield. Further, the decrease of the length of the internal node allows the parasitic capacitance of the internal node to decrease, resulting in a decrease in the electric power consumption.

The intervals of the vertical lines are irregular intervals, and the at least a part of the switching elements are arranged respectively in, among areas between the vertical lines arranged at irregular intervals, areas in each of which an interval between adjacent ones of the vertical lines is wider than an interval between other adjacent ones of the vertical lines.

According to this configuration, regarding the areas for arranging the switching elements, the dimension thereof in the lateral direction in plan view can be further increased, whereby larger switching elements can be arranged therein.

Among the pixel control elements, a part of the pixel control elements connected with one same vertical line are arranged on one side with respect to the respective horizontal lines to which the pixel control elements are connected, the side being different from a side on which the other pixel control elements connected with the same vertical line are arranged, and at least a part of the switching elements as constituent elements of the driving circuit are respectively arranged in areas between adjacent ones of the horizontal lines, in each of which areas a distance between adjacent ones of the pixel control elements is wider than a distance between other adjacent ones of the pixel control elements.

According to this configuration, regarding the areas for arranging the switching elements, the dimension thereof in the longitudinal direction in plan view can be further increased, whereby further larger switching elements can be arranged therein.

Intervals of the horizontal lines are irregular intervals, and the at least a part of the switching elements are arranged respectively in, among areas between the horizontal lines arranged at irregular intervals, areas in each of which an interval between adjacent ones of the horizontal lines is wider than an interval between other adjacent ones of the horizontal lines.

According to this configuration, regarding the areas for arranging the switching elements, the dimension thereof in the longitudinal direction in plan view can be still further increased, whereby further larger switching elements can be arranged therein.

The vertical lines may be the data lines, and the horizontal lines may be the gate lines. Alternatively, the vertical lines may be the gate lines, and the horizontal lines may be the data lines.

A drain pad of each pixel control element is formed in a layer different in a lamination direction from a gate layer that forms the gate line, and in the gate layer, a region is provided for preventing an area of overlap between the drain pad and the gate layer from changing when the drain pad and the gate layer are displaced from each other.

With this configuration, even in a case where the drain pad and the gate layer are displaced from each other, it is possible to prevent a change from occurring to the area of overlap between the drain pad and the gate layer. It is therefore possible to prevent a change from occurring to the capacitance between the drain pad and the gate layer, thereby suppressing the deterioration of the display quality caused by a change in the capacitance.

A display panel in one embodiment of the present invention includes: the above-described active matrix substrate; a counter substrate including a color filter and a counter electrode; and a liquid crystal layer interposed between the active matrix substrate and the counter substrate.

According to this configuration of the display panel, the driving circuit arranged region, in the active matrix substrate, can be made smaller, which allows the driving circuit non-arranged region to be made larger. Since the driving circuit non-arranged region is cuttable, the degree of freedom in forming the display panel in a shape other than the rectangular shape can be increased, and the degree of freedom in design of the display panel can be increased.

[Embodiment]

The following describes embodiments of the present invention in detail, while referring to the drawings. Identical or equivalent parts in the drawings are denoted by the same reference numerals, and the descriptions of the same are not repeated. To make the description easy to understand, in the drawings referred to hereinafter, the configurations are simply illustrated or schematically illustrated, or the illustration of part of constituent members is omitted. Further, the dimension ratios of the constituent members illustrated in the drawings do not necessarily indicate the real dimension ratios. The display pixel illustrated in the drawings is assumed to have such a size as a short side of about 40 μm and a long side of about 120 μm, but these are values set for convenience of explanation. The values do not necessarily indicate the real dimensions, and do not limit the embodiments.

<Embodiment 1>

(Configuration of Liquid Crystal Display Device)

Figure 1:
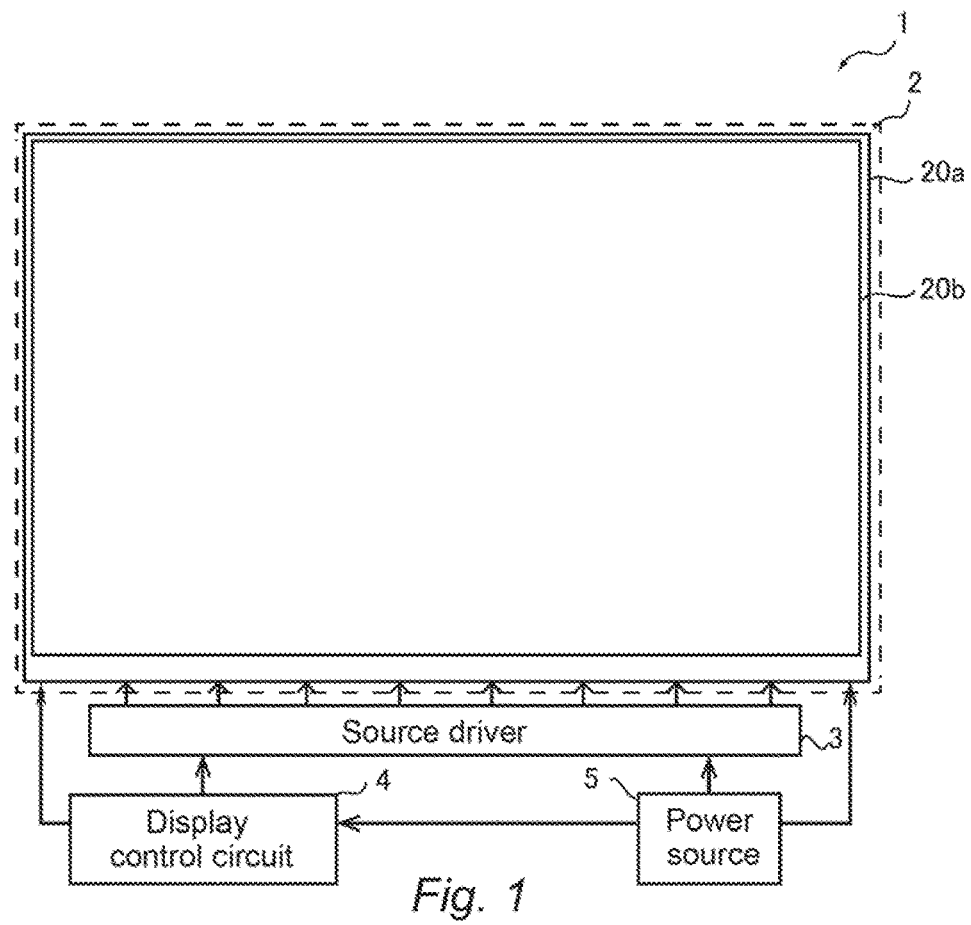
FIG. 1 is a schematic diagram illustrating a schematic configuration of a liquid crystal display device according to Embodiment 1.

FIG. 1 schematically illustrates a schematic configuration of a liquid crystal display device according to the present embodiment. The liquid crystal display device 1 includes a display panel 2, a source driver 3, a display control circuit 4, and a power source 5. The display panel 2 includes an active matrix substrate 20a, a counter substrate 20b, and a liquid crystal layer (not shown) interposed between these substrates. Though not shown in FIG. 1, polarizing plates are provided on the bottom surface side of the active matrix substrate 20a and on the top surface side of the counter substrate 20b. On the counter substrate 20b, there are formed a black matrix, color filters of three colors, which are red (R), green (G), and blue (B), and a common electrode (all are not shown).

As illustrated in FIG. 1, the active matrix substrate 20a is electrically connected with the source driver 3 formed on a flexible substrate. The display control circuit 4 is electrically connected with the display panel 2, the source driver 3, and the power source 5. The display control circuit 4 outputs control signals to the source driver 3, and driving circuits (referred to as gate drivers) formed on the active matrix substrate 20a, which are described below.

The control signals include a reset signal (CLR), clock signals (CKA, CKB), data signals and the like for displaying images on the display panel 2. The power source 5 is electrically connected with the display panel 2, the source driver 3, and the display control circuit 4, so as to supply a power source voltage signal to each.

(Configuration of Active Matrix Substrate)

Figure 2:
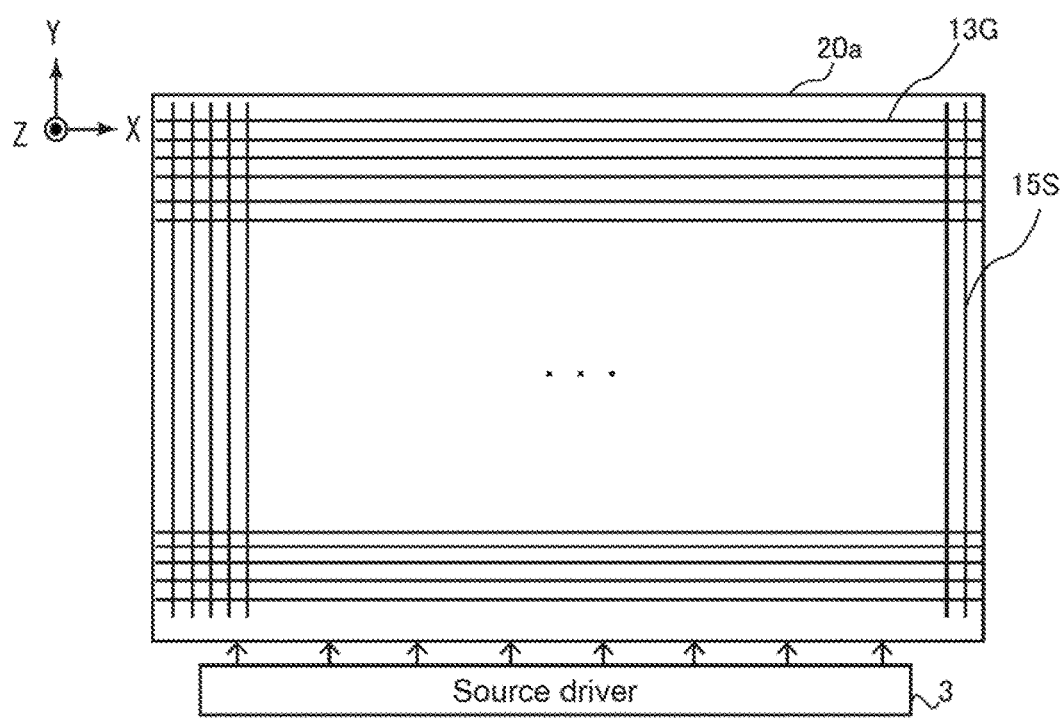
FIG. 2 is a schematic diagram illustrating a schematic configuration of an active matrix substrate.

FIG. 2 schematically illustrates a schematic configuration of the active matrix substrate 20a. On the active matrix substrate 20a, a plurality of gate lines 13G are formed substantially in parallel from one end to the other end in the X-axis direction of the active matrix substrate 20a. Further, on the active matrix substrate 20a, a plurality of source lines (data lines) 15S are formed approximately in parallel so as to extend in the Y axis direction, so as to intersect with the gate lines 13G. In other words, the source lines 15S are vertical lines extending in the longitudinal direction in plan view, and the gate lines 13G are horizontal lines extending in the lateral direction in plan view.

As will be described later, TFTs for controlling the display of pixels (hereinafter referred to as pixel-TFTs) (pixel control elements) are provided in the vicinity of intersections between the gate lines 13G and the source lines 15S. Each pixel corresponds to a color filter of any color among the red (R), green (G), and blue (B) provided on the counter substrate 20b side. One display pixel is composed of three adjacent pixels of a red pixel, a green pixel, and a blue pixel, and is capable of displaying various colors.

Figure 3:
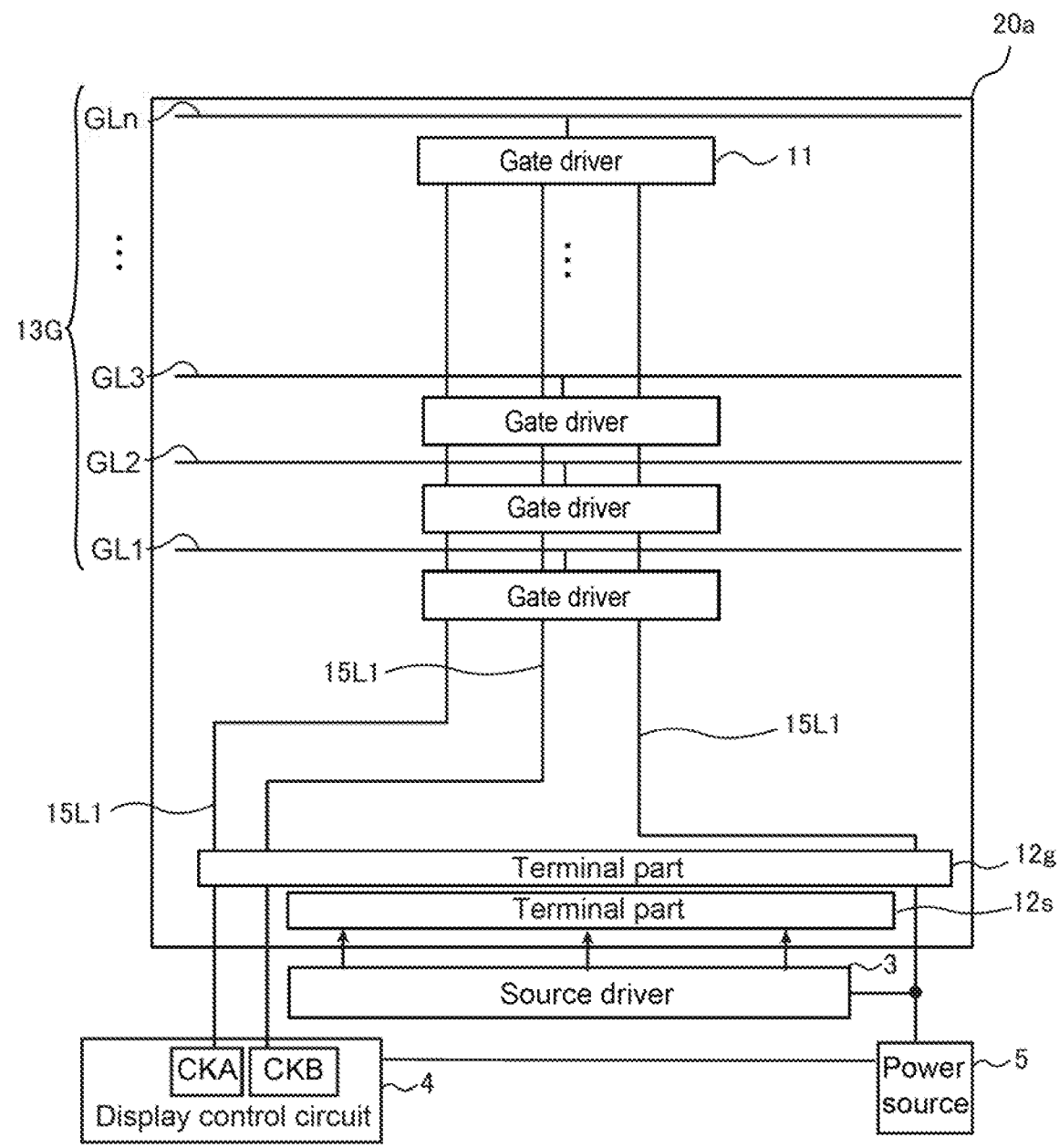
FIG. 3 is a schematic diagram illustrating a schematic configuration of an active matrix substrate, with the illustration of source lines being omitted, and respective parts connected with the active matrix substrate.

FIG. 3 is a schematic diagram illustrating a schematic configuration of the active matrix substrate 20a, with the illustration of the source lines 15S being omitted, and respective parts connected with the active matrix substrate 20a. As illustrated in the example illustrated in FIG. 3, the gate drivers 11 (the driving circuits) are formed in spaces between the gate lines 13G in the display region. In the example illustrated in FIG. 3, each of the gate lines 13G is connected with one gate driver 11, but may be connected with a plurality of the gate drivers 11.

In the display region of the active matrix substrate 20a, in a frame region on a side where the source driver 3 is provided, a terminal part 12g (a second terminal part) is formed. The terminal part 12g is connected with the display control circuit 4 and the power source 5. The terminal part 12g receives signals such as control signals (CKA, CKB) and a power source voltage signal output from the display control circuit 4 and the power source 5. The control signals (CKA, CKB), the power source voltage signal, and other signals input to the terminal part 12g are supplied to each gate driver 11 via the driver lines 15L1.

The gate driver 11 outputs a voltage signal indicating either one of the selected state and the non-selected state, to the gate line 13G connected therewith, according to the signals supplied thereto, and outputs the voltage signal to the gate line 13G of the next stage. In the following description, voltage signals respectively corresponding to the selected state and the non-selected state are referred to as "scanning signals" in some cases. Further, the state in which the gate line 13G is selected is referred to as "the driving of the gate line 13G".

Further, on the active matrix substrate 20a, in a frame region on a side where the source driver 3 is provided, a terminal part 12s (a first terminal part) that connects the source driver 3 and the source lines 15S is formed. The source driver 3 outputs data signals to each source line 15S according to the control signals input from the display control circuit 4.

(Configuration of Gate Driver)

Here, the configuration of the gate driver 11 in the present embodiment is described. FIG. 4 illustrates an exemplary equivalent circuit of the gate driver 11 for driving the gate line 13G of GL(n). As illustrated in FIG. 4, the gate driver 11 includes TFTs-A to-E formed with thin film transistors (TFTs) as switching elements, a capacitor Cbst, terminals 111 to 117, and a group of terminals to which the power source voltage signal at a low level is input.

The terminal 111 receives a set signal (S) through the gate line 13G of GL(n−1) of the previous stage. The terminal 111 of the gate driver 11 connected to the gate line 13G of GL(1) receives a gate start pulse signal (S) output from the display control circuit 4. The terminals 113, 116 receive the reset signal (CLR) output from the display control circuit 4. The terminal 114 receives the clock signal (CKA) input thereto. The terminals 112, 115 receive the clock signal (CKB) input thereto. The terminal 117 outputs the set signal (S) to the gate line 13G of the subsequent stage.

Figure 5:
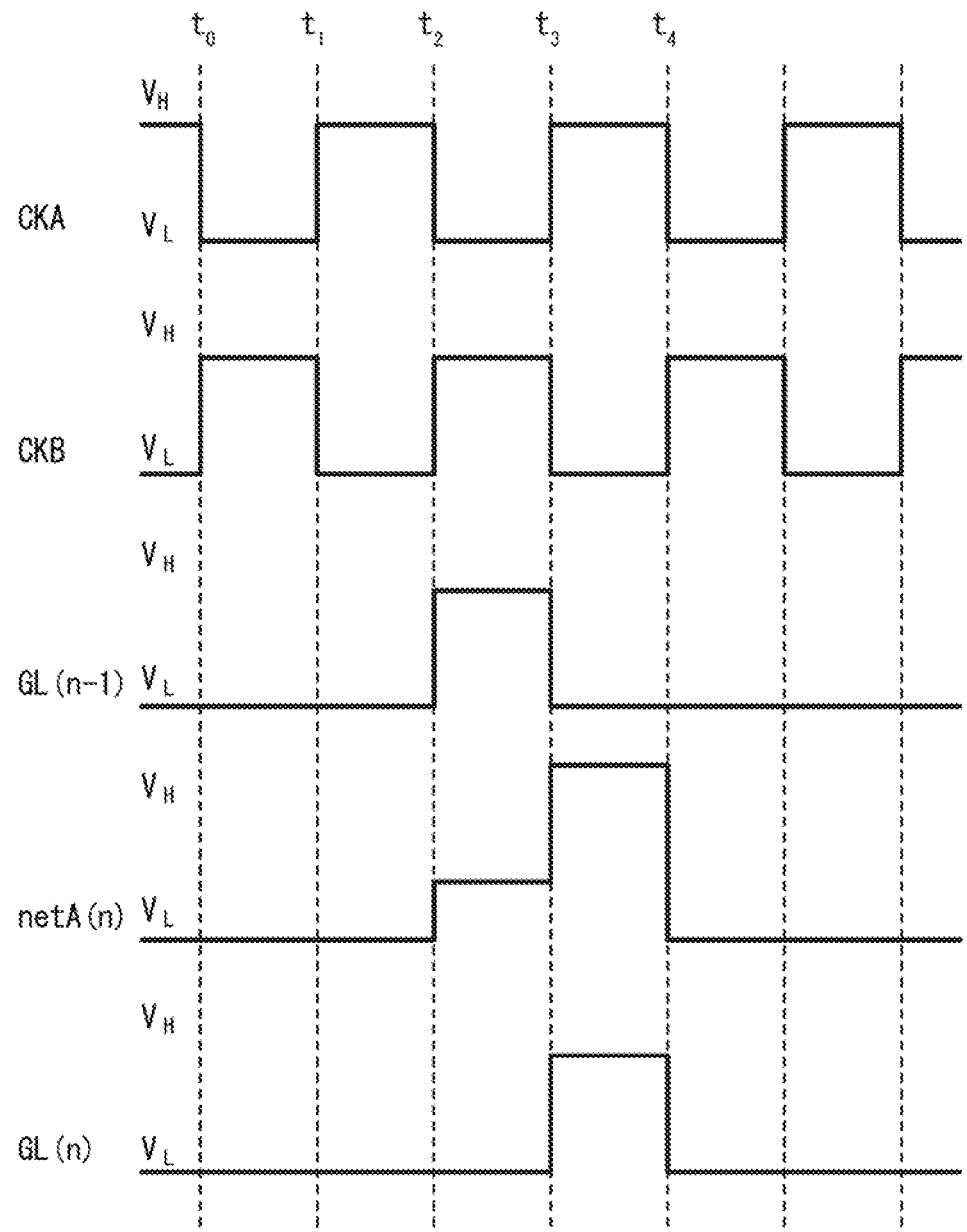
FIG. 5 is a timing chart when the gate driver scans gate lines.

The clock signal (CKA) and the clock signal (CKB) are two-phase clock signals whose phases are reversed every horizontal scanning period (see FIG. 5).

In FIG. 4, the line to which the source terminal of TFT-A, the drain terminal of TFT-B, one of electrodes of the capacitor Cbst, and the gate terminal of TFT-C are connected is referred to as "netA(n)".

The gate terminal of TFT-A is connected with the terminal 112, the drain terminal thereof is connected with the terminal 111, and the source terminal thereof is connected to netA(n).

The gate terminal of TFT-B is connected with the terminal 113, the drain terminal thereof is connected with netA(n), and the source terminal thereof is connected to the power source voltage terminal VSS.

The gate terminal of TFT-C is connected with netA(n), the drain terminal thereof is connected with the terminal 114, and the source terminal thereof is connected with the output terminal 117.

Regarding the capacitor Cbst, one of electrodes thereof is connected with netA(n), and the other electrode thereof is connected with the terminal 117.

The gate terminal of TFT-D is connected with the terminal 115, the drain terminal thereof is connected with the terminal 117, and the source terminal thereof is connected to the power source voltage terminal VSS.

The gate terminal of TFT-E is connected with the terminal 116, the drain terminal thereof is connected with the terminal 117, and the source terminal thereof is connected to the power source voltage terminal VSS.

(Operation of Gate Driver)

Next, the operation of the gate driver 11 is described with reference to FIGS. 4 and 5. FIG. 5 is a timing chart when the gate driver 11 scans the gate lines 13G. In FIG. 5, the period from t3 to t4 is a period while the gate line of GL(n) is selected. The clock signal (CKA) and the clock signal (CKB), supplied from the display control circuit 4, whose phases are reversed every horizontal scanning period, are input to the gate driver 11 through the terminals 112, 114, and 115. Further, though the illustration is omitted in FIG. 5, the reset signal (CLR), which is maintained at the H (High) level for a certain set period during every perpendicular scanning period, is input from the display control circuit 4, through the terminals 113 and 116, to the gate driver 11. When the reset signal (CLR) is input, the netA(n) and the gate line 13G make a transition to the L (Low) level.

From time 0 to t1 in FIG. 5, the clock signal (CKA) at the L level is input to the terminal 114, and the clock signal (CKB) at the H level is input to the terminals 112 and 115. This causes TFT-A and TFT-D shift to the ON state, netA(n) is charged to the power source voltage (VSS) at the L level, TFT-C is turned OFF, and a potential at the L level is output from the terminal 117.

Next, at time t1, when the clock signal (CKA) shifts to the H level and the clock signal (CKB) shifts to the L level, TFT-A and TFT-D are turned OFF, the potential of netA(n) is maintained at the L level, and a potential at the L level is output from the terminal 117.

At time t2, the clock signal (CKA) shifts to the L level, the clock signal (CKB) shifts to the H level, and the set signal (S) is input to the terminal 111 via the gate line of GL(n−1). This causes TFT-A to be turned ON, and netA(n) is charged to a potential obtained by lowering the H level by the threshold voltage of the TFT-A. Since TFT-D is in the ON state during this period, a potential at the L level is output from the terminal 117.

At time t3, when the clock signal (CKA) shifts to the H level and the clock signal (CKB) shifts to the L level, TFT-C is turned ON, and TFT-D is turned OFF. This causes the potential of the terminal 117 to start being charged to the H level. Simultaneously, netA(n) is charged to a further higher potential through the capacitor Cbst. Here, the configuration is designed so that the potential of netA(n) is higher a potential obtained by raising the H level by the threshold voltage of TFT-C. Since this causes TFT-C to maintain the ON state, the gate line 13G of GL(n) connected to the terminal 117 is charged to the H level, and shifts to the selected state.

At time t4, when the clock signal (CKA) shifts to the L level and the clock signal (CKB) shifts to the H level, the potential of netA(n) shifts to the L level through TFT-A, and TFT-C is turned OFF. Further, TFT-D is turned ON, and therefore, a potential at the L level is output from the terminal 117.

In this way, the set signal (S) is output from the terminal 117 of the gate driver 11 to the gate line 13G, whereby the gate line 13G shifts to the selected state. The liquid crystal display device 1 sequentially scans the gate lines 13G by the gate drivers 11 connected respectively to the gate lines 13G, and supplies data signals to the source lines 15S, respectively, by using the source driver 3, thereby causing images to be displayed on the display panel 2.

In a case where the pixel-TFTs (pixel control elements) are arranged on the same side with respect to the plurality of source lines 15S extending in the longitudinal direction in plan view as described above, it is impossible to ensure a large area as an area where TFTs such as TFTs-A to-E and the like that compose the gate drivers 11 (hereinafter these TFTs are referred to as "driver-TFTs") are arranged. In the present embodiment, therefore, among the plurality of pixel-TFTs connected with the same gate line 13G (the horizontal line), a part of the pixel-TFTs are arranged on a different side, such as the right side or the left side, with respect to the respective source lines 15S (the vertical lines) to which the pixel-TFTs are connected.

Further, In the present embodiment, the intervals between the adjacent gate lines 13G are regular interval, but the intervals between the adjacent source lines 15S are not regular intervals, but irregular intervals.

More specifically, among the intervals between adjacent two of the source lines 15S, the interval between two source lines 15S positioned on both sides of the position where the driver-TFT is arranged is widest. The pixel-TFT connected with the source line 15S positioned to the left of the position where the driver-TFT is arranged is arranged on the right side with respect to the source line 15S to which the pixel-TFT is connected. Further, the pixel-TFT connected with the source line 15S positioned to the right of the position where the driver-TFT is arranged is arranged on the left side with respect to the source line 15S to which the pixel-TFT is connected.

Figure 6:
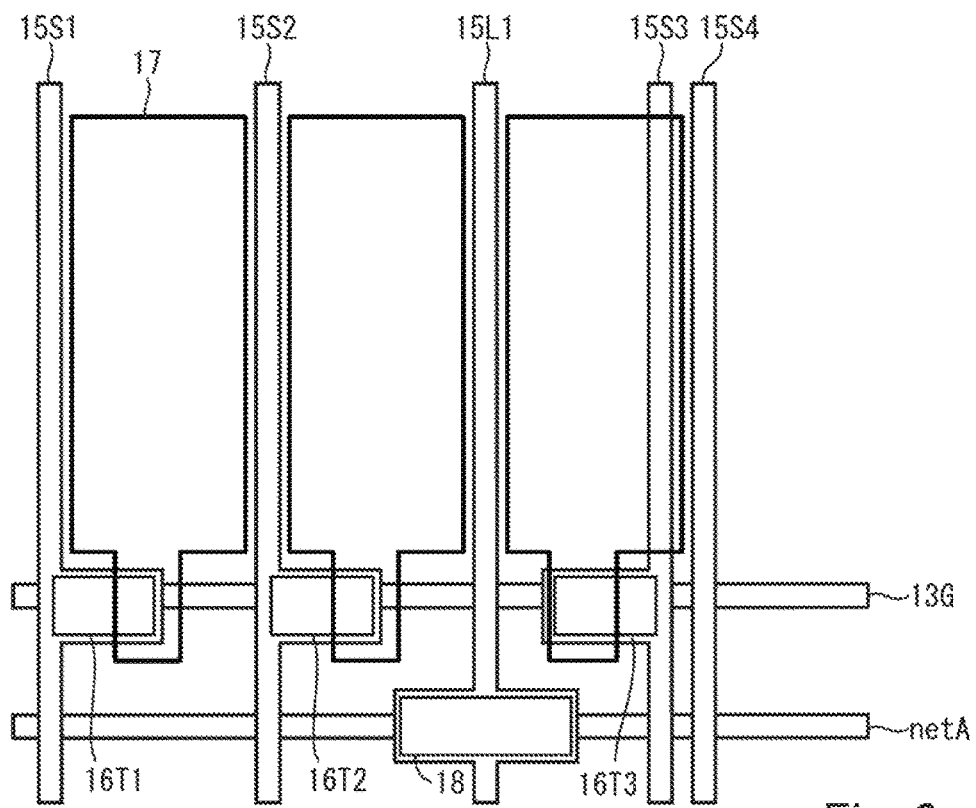
FIG. 6 is a schematic diagram for explaining a configuration of an active matrix substrate in Embodiment 1.

FIG. 6 is a schematic diagram for explaining a configuration of the active matrix substrate 20a in the present embodiment. The interval between the source line 15S1 and the source line 15S2, the interval between the source line 15S2 and the source line 15S3, and the interval between the source line 15S3 and the source line 15S4, are different from one another. More specifically, the interval between the source line 15S2 and the source line 15S3 is wider than the interval between the source line 15S1 and the source line 15S2 and the interval between the source line 15S3 and the source line 15S4, and these source lines are apart from each other at a distance of at least one pixel. In FIG. 6, the pixel electrodes 17 of the respective pixels are illustrated as well.

Further, among the pixel-TFTs 16T1, 16T2, and 16T3 connected with the same gate line 13G, the pixel-TFT 16T1 connected with the source line 15S1, and the pixel-TFT 16T2 connected with the source line 15S2 are arranged on the right side with respect to the source lines 15S to which these pixel-TFTs are connected, respectively, and on the other hand, the pixel-TFT 16T3 connected with the source line 15S3 is arranged on the left side with respect to the source line 15S to which the TFT 16T3 is connected.

The driver-TFT 18 is arranged in an area between the source line 15S2 and the source line 15S3, which is wider among the areas between the adjacent twos of the source line 15S.

Figure 7:
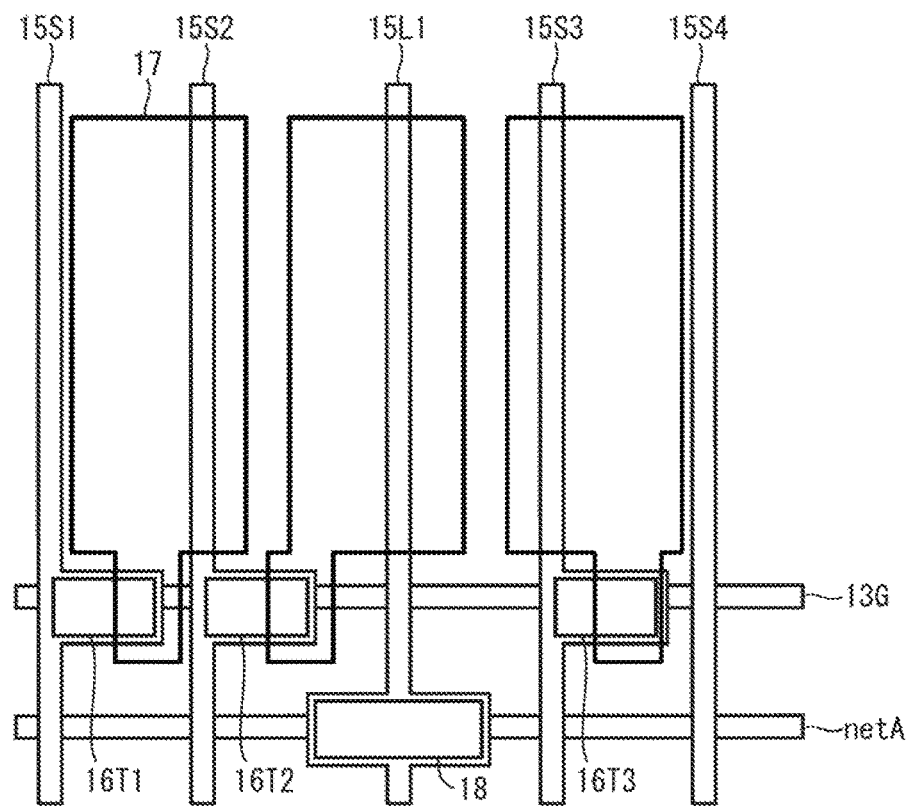
FIG. 7 illustrates an exemplary comparative configuration in which intervals between adjacent ones of the source lines are irregular intervals, but a plurality of pixel-TFTs connected to the same gate line are arranged on the same side with respect to the respective source lines to which the pixel-TFTs are connected.

FIG. 7 illustrates an exemplary comparative configuration in which intervals between adjacent ones of the source lines 15S are irregular intervals, but a plurality of pixel-TFTs connected with the same gate line are arranged on the same side with respect to the respective source lines to which the pixel-TFTs are connected. In other words, the pixel-TFTs 16T are all arranged on the right side with respect to the respective source lines 15S to which the pixel-TFTs 16T are connected. In the configuration illustrated in FIG. 7 as well, as is the case with the configuration illustrated in FIG. 6, the interval between the source line 15S2 and the source line 15S3 is wider than the interval between the source line 15S1 and the source line 15S2, and the interval between the source line 15S3 and the source line 15S4.

In the exemplary comparative configuration illustrated in FIG. 7 as well, the driver-TFT 18 can be arranged between the space between the source line 15S2 and the source line 15S3, which is wider. In the configuration illustrated in FIG. 7, however, the source line 15S2, the driver line 15L1, and the source line 15S3 are arranged in pixel areas (aperture areas), which causes the aperture ratio to decrease.

In contrast, according to the configuration of the present embodiment illustrated in FIG. 6, among a plurality of the pixel-TFTs connected with the same gate line 13G, a part of the pixel-TFTs are arranged on a different side with respect to the respective source lines 15S to which the pixel-TFTs are connected. This allows the source line 15S2 and the driver line 15L1 to be arranged in light-shielding areas between the pixels, whereby the aperture ratio can be increased as compared with the configuration illustrated in FIG. 7.

Figure 8B:
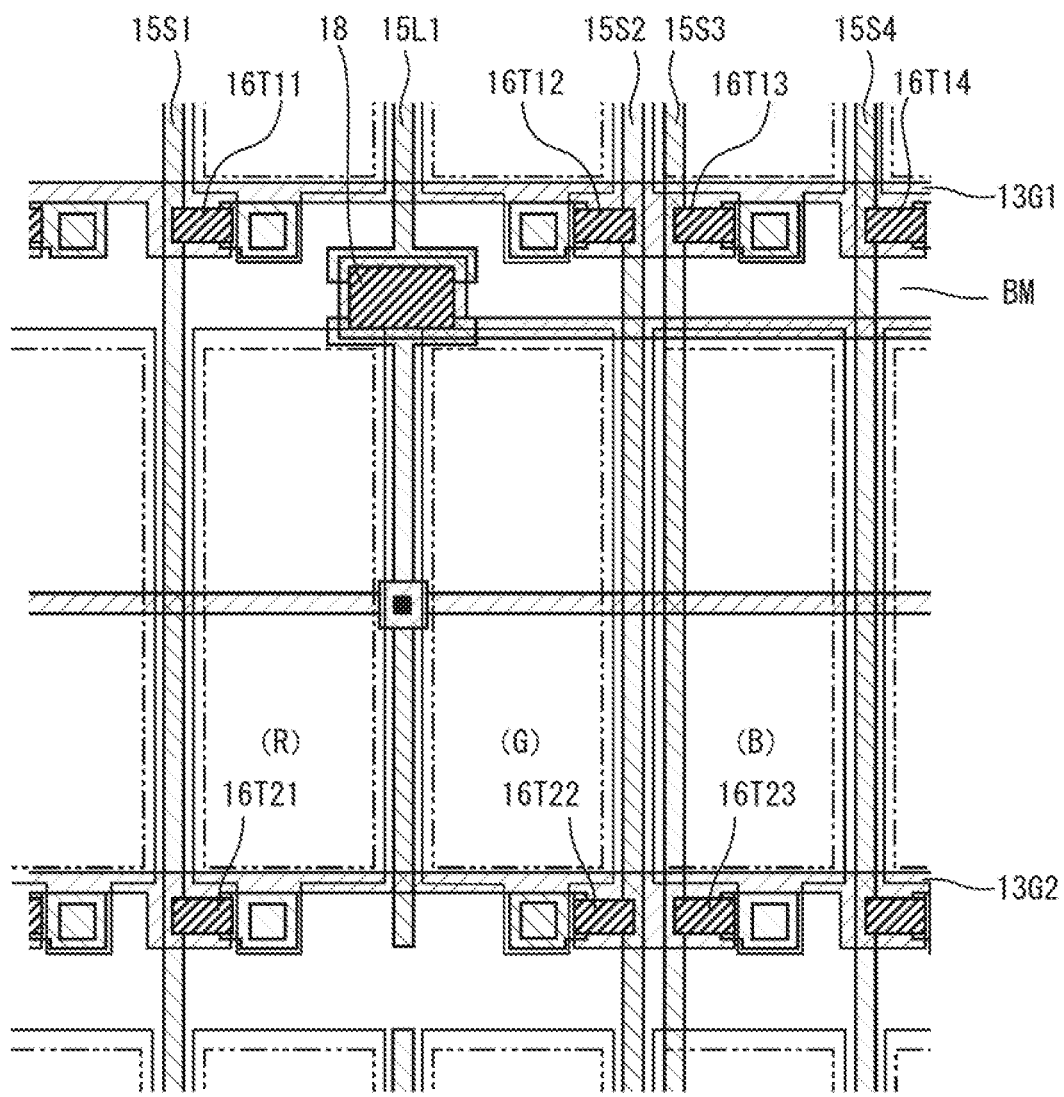
FIG. 8B illustrates a configuration of the active matrix substrate in Embodiment 1.

FIGS. 8A and 8B are diagrams for comparing and explaining the configuration of the active matrix substrate 20a in the present embodiment, and a configuration of a conventional active matrix substrate in which the intervals between adjacent ones of the source lines are approximately identical and a plurality of pixel-TFTs connected to the same gate line 13B are arranged on the same side. FIG. 8A illustrates a configuration a conventional active matrix substrate, and FIG. 8B illustrates a configuration of the active matrix substrate 20a in the present embodiment.

In FIGS. 8A and 8B, the descriptions of "(red)", "(blue)", and "(green)" indicate the colors of corresponding color filters. Further, in FIGS. 8A and 8B, the area denoted by "BM", which is indicated by alternate long and two short dashed lines, is a light-shielding area BM in which light is blocked by a black matrix (not shown) formed on the counter substrate 20b.

As illustrated in FIG. 8A, on the conventional active matrix substrate, a plurality of the source lines 15S are arranged in the area BM at regular intervals. Further, at positions where the driver-TFTs 18 are arranged, the driver lines 15L1 that are connected with the driver-TFTs 18 are arranged in the pixel areas (aperture areas). On the other hand, at positions where the driver-TFTs 18 are not arranged, dummy lines (not shown) for making the aperture ratio uniform are arranged in the pixel region, at positions corresponding to the positions where the driver lines 15L1 are arranged.

On the other hand, on the active matrix substrate 20a in the present embodiment, as illustrated in FIG. 8B, the driver lines 15L1 are arranged in the area BM. Besides, among the source lines 15S, the source lines 15S1 and 15S2 are arranged in the area BM, and the source line 15S3 is arranged in the pixel areas. In this case, since the positions at which the source lines 15S are arranged in one display pixel are the same irrespective of the presence/absence of the driver-TFTs 18, the dummy lines for making the aperture ratio uniform are unnecessary.

Figure 9A:
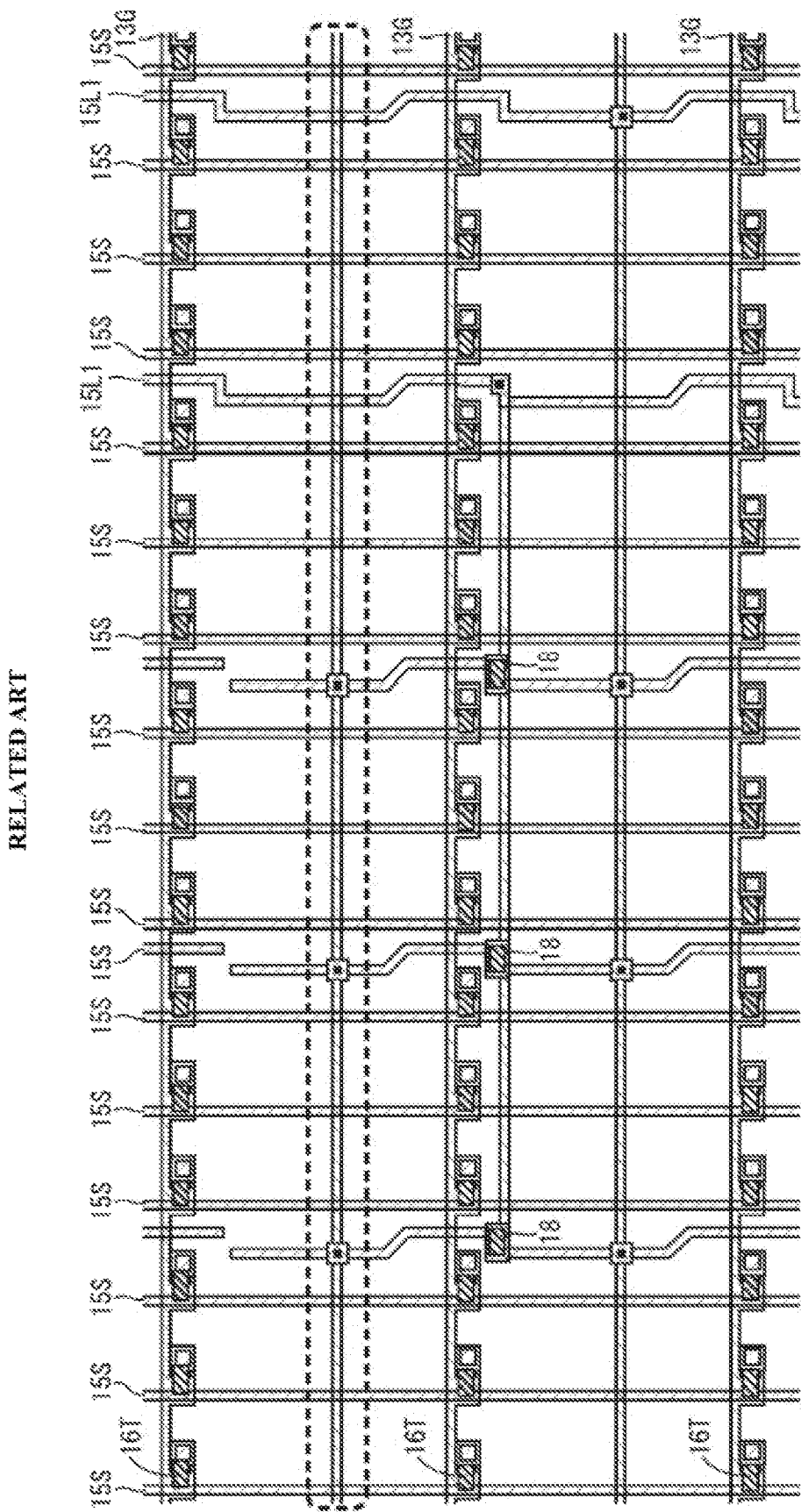
FIG. 9A illustrates a configuration of the conventional active matrix substrate for explaining the length of an internal node.
Figure 9B:
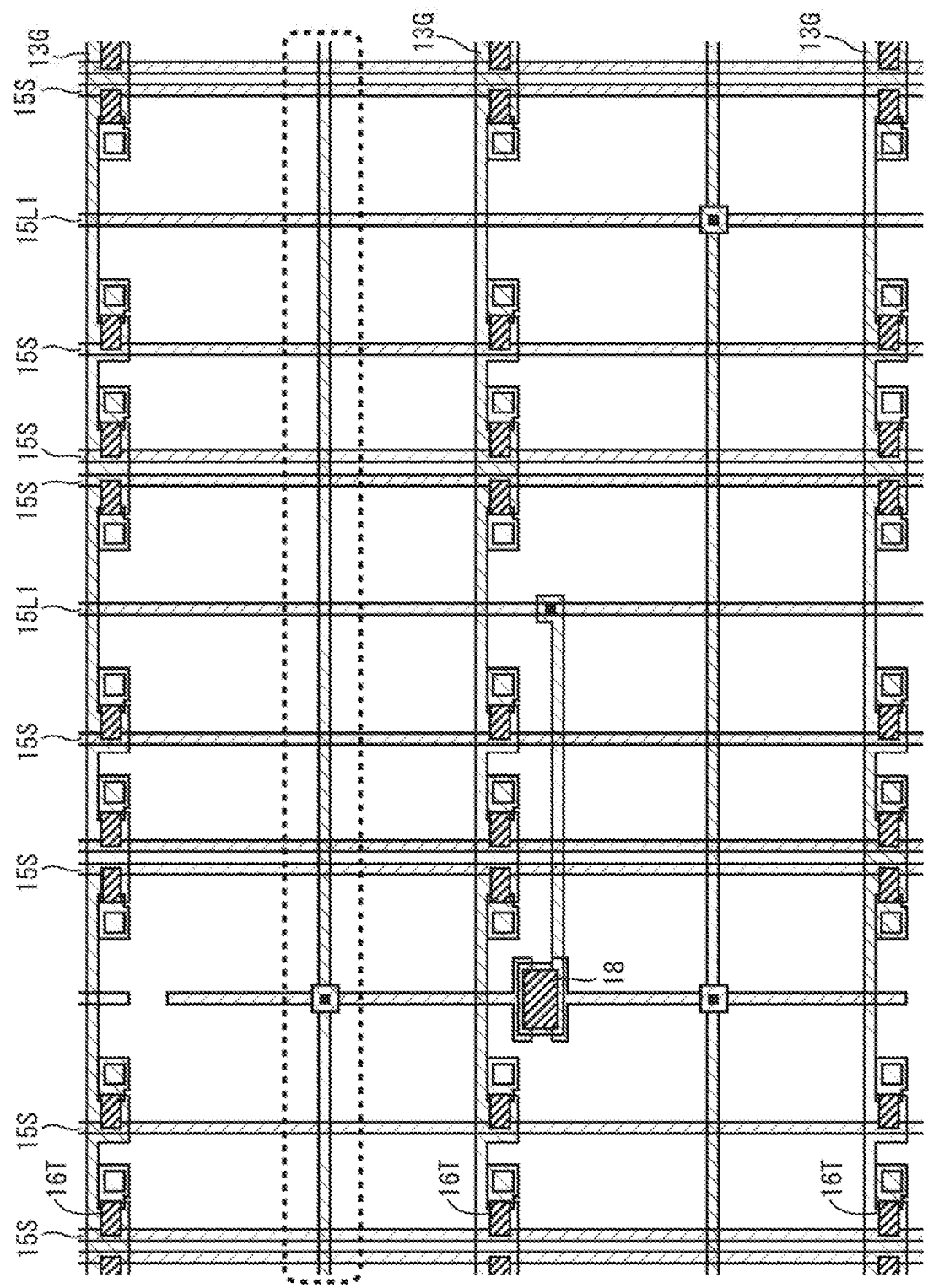
FIG. 9B illustrates a configuration of the active matrix substrate in Embodiment 1 for explaining the length of an internal node.

FIGS. 9A and 9B are diagrams for comparing and explaining the length of an internal node of the active matrix substrate 20a in the present embodiment, and the length of an internal node of the conventional active matrix substrate. FIG. 9A illustrates a configuration of the conventional active matrix substrate, and FIG. 9B illustrates a configuration of the active matrix substrate 20a in the present embodiment. The internal node is a line corresponding to netA illustrated in FIG. 4.

As illustrated in FIG. 9A, in the case of the conventional active matrix substrate, a plurality of source lines 15S are arranged at regular intervals, and a plurality of pixel-TFTs connected with the same gate line 13G are arranged on the same side with respect to the source lines 15S. Therefore, the area for arranging the driver-TFT 18 is narrow, and only a small driver-TFT 18 can be arranged therein. It is therefore necessary to arrange small driver-TFTs 18 at a plurality of positions, which causes the length of the internal node in the gate driver 11 to increase. In the example illustrated in FIG. 9A, the internal node of the gate driver 11 has a length over five display pixels. Further, an increase in the length of the internal node causes parasitic capacitances of the internal node to increase, resulting in an increase of the electric power consumption.

On the other hand, in the active matrix substrate 20a in the present embodiment, as described above, the area for arranging the driver-TFT 18 is wide, as compared with the conventional active matrix substrate. A larger driver-TFT 18, as compared with the conventional active matrix substrate, therefore can be arranged, which enables to decrease the area for arranging the entire driver 11. This enables to make the internal node of the gate driver 11 shorter. In the case of the conventional active matrix substrate illustrated in FIG. 9A, it is necessary to arrange three small driver-TFTs 18, but in contrast, in the case of the active matrix substrate 20a of the present embodiment illustrated in FIG. 9B, only one large driver-TFT 18 may be arranged as a driver-TFT 18 having the same processing capability. With this configuration, in the example illustrated in FIG. 9B, the internal node of the driver 11 has a length equivalent to three display pixels. As the internal node is shorter, the internal node has a smaller parasitic capacitance, whereby the electric power consumption decreases.

Figure 10A:
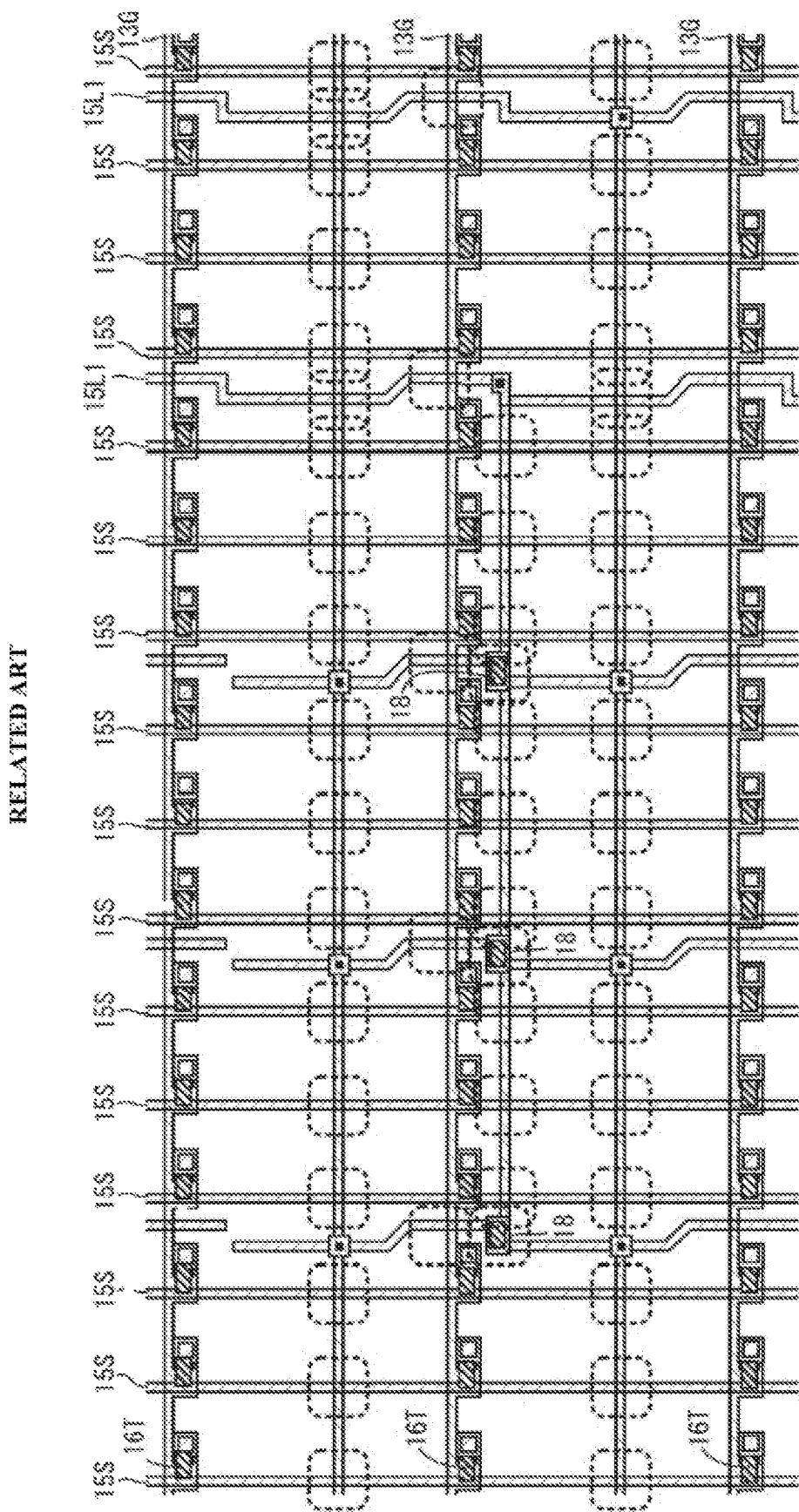
FIG. 10A is a diagram for comparing and explaining the number of intersection points between internal nodes or driver lines and source lines or gate lines, the diagram illustrating a configuration of the conventional active matrix substrate.
Figure 10B:
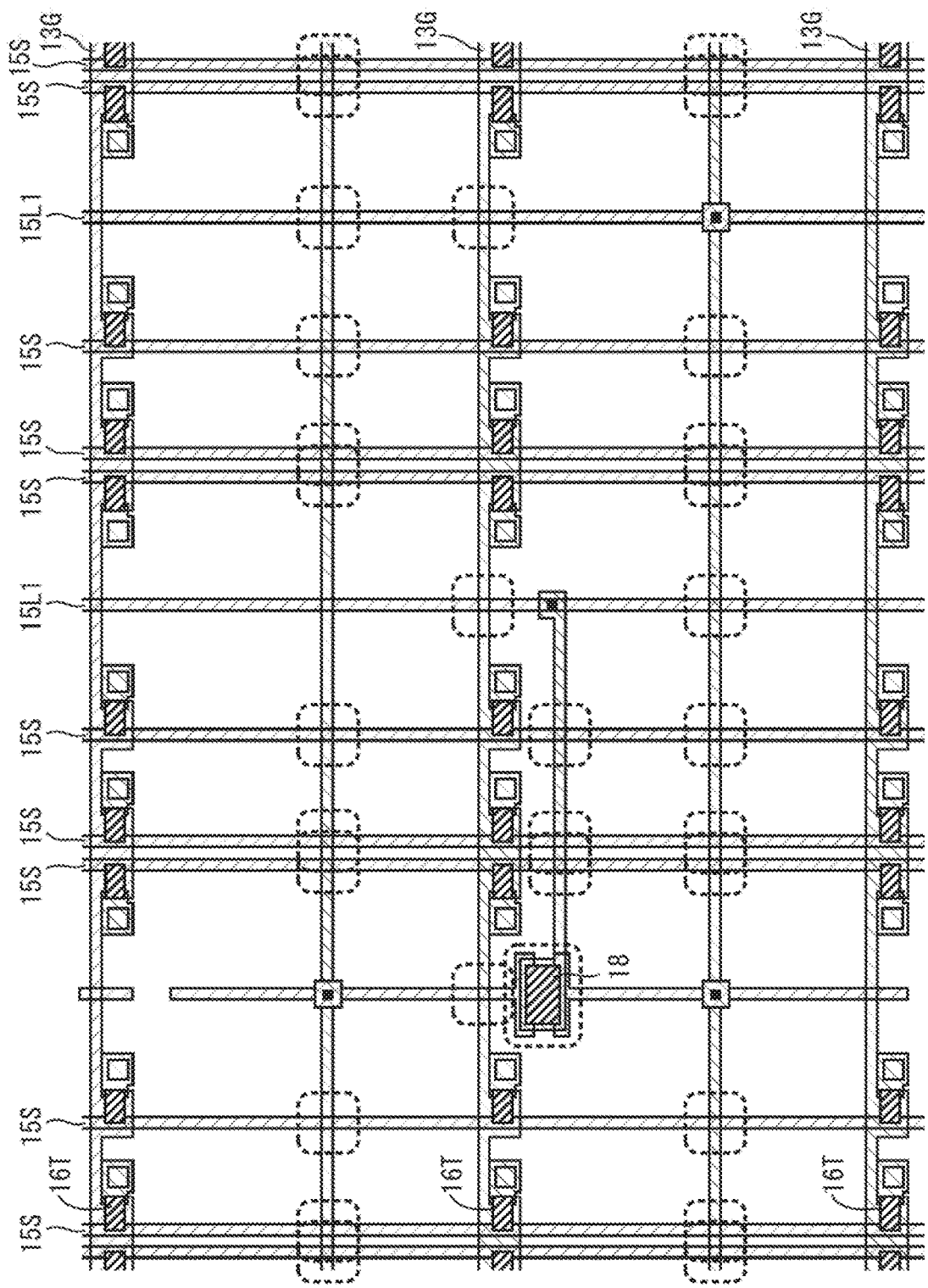
FIG. 10B is a diagram for comparing and explaining the number of intersection points between internal nodes or driver lines and source lines or gate lines, the diagram illustrating a configuration of the active matrix substrate in Embodiment 1.

FIGS. 10A and 10B are diagrams for comparing and explaining the number of points of intersection between the internal nodes (netA) or the driver lines 15L1 and the source lines 15S or the gate lines 13G in the active matrix substrate 20a in the present embodiment and those in the conventional active matrix substrate. FIG. 10A illustrates the configuration of the conventional active matrix substrate, and FIG. 10B illustrates the configuration of the active matrix substrate 20a in the present embodiment. In FIGS. 10A and 10B, the points of intersection between the internal nodes (netA) or the driver lines 15L1 and the source lines 15S or the gate lines 13G are encircled by dotted lines so as to be indicated.

As described above, in the conventional active matrix substrate, since the length of the internal node of the gate driver 11 increases, the points of connection between the internal node (netA) in the X axis direction and the source lines 15S in the Y axis direction increases. Besides, since it is necessary to arrange small driver-TFTs 18 at a plurality of points, the points of connection between the driver lines 15L1 in the Y axis direction and the gate line 13G in the X axis direction increase.

On the other hand, in the active matrix substrate 20a in the present embodiment, as described above, the length of the internal node of the gate driver 11 decreases. As is clear from comparison between FIG. 10A and FIG. 10B, therefore, points of connection between the internal node in the X axis direction and the source lines 15S in the Y axis direction decrease. Further, as compared with the conventional active matrix substrate, a larger driver-TFT 18 can be arranged, which makes it possible to decrease the number of driver-TFTs 18. This makes it possible to decrease the points of connection between the driver lines in the Y axis direction and the gate line 13G in the X axis direction. This allows the probability of occurrence of leak failure at points of intersection to decrease, resulting in the improvement of the yield.

Further, in the active matrix substrate 20a in the present embodiment, as compared with the conventional active matrix substrate, a distance between the driver line 15L1 extending in the Y axis direction and the drain pad of the pixel-TFT 16T as an element electrically connected to the pixel electrode increases. This causes capacitive coupling between the pixel electrode and the driver line 15L1 to become smaller, which makes it possible to decrease noise propagation from the driver line with respect to the pixel potential, and improve the image quality.

FIGS. 11A to 11D illustrate an exemplary equivalent circuit in a case where the circuit of the gate driver 11 illustrated in FIG. 4 is arranged in the display region of the conventional active matrix substrate illustrated in FIG. 8A. In view of the size of the diagram drawn herein, one circuit diagram is divided into four diagrams of FIGS. 11A to 11D. For example, the source line 15S shown at the right end of FIG. 11A is the same as the source line 15S shown at the left end of FIG. 11B. Further, the source line 15S shown at the right end of FIG. 11B is the same as the source line 15S shown at the left end of FIG. 11C. Still further, the source line 15S shown at the right end of FIG. 11C is the same as the source line 15S shown at the left end of FIG. 11D. Still further, FIG. 12 illustrates a part of the TFTs-C (driver-TFTs 18) excerpted from FIG. 11C and enlarged.

In the example illustrated in FIGS. 11A to 11D and FIG. 12, only a TFT-C (driver-TFT 18) having a length of at most 6 μm in the X axis direction can be arranged per one display pixel. In a case where the requirements for the TFT-C to be arranged are assumed to be the length L in the Y axis direction=6 μm, and the length W in the X axis direction>80 μm, it is necessary to arrange 14 TFTs-C having the length L in the Y axis direction=6 μm, and the length W in the X axis direction=6 μm (6 μm×14=84 μm>80 μm). In a case where one TFT-C is arranged per one display pixel, it is necessary to arrange TFTs-C over 14 display pixels.

FIGS. 13A to 13C illustrate an exemplary equivalent circuit in a case where the circuit of the gate driver 11 illustrated in FIG. 4 is arranged in the display region of the active matrix substrate 20a in the present embodiment. In view of the size of the diagram drawn herein, one circuit diagram is divided into three diagrams of FIGS. 13A to 13C. For example, the source line 15S shown at the right end of FIG. 13A is the same as the source line 15S shown at the left end of FIG. 13B. Further, the source line 15S shown at the right end of FIG. 13B is the same as the source line 15S shown at the left end of FIG. 13C. Still further, FIG. 14 illustrates a part of the TFTs-C (driver-TFTs 18) excerpted from FIGS. 13A to 13B and enlarged.

As described above, in the active matrix substrate 20a in the present embodiment, larger driver-TFTs 18 can be arranged, as compared with the case of the conventional active matrix substrate. In the example illustrated in FIGS. 13A to 13C and FIG. 14, a TFT-C (driver-TFT 18) having a length of 6 μm in the Y axis direction and a length of 18 μm in the X axis direction can be arranged. In a case where the requirements for the TFT-C to be arranged are assumed to be the length L in the Y axis direction=6 μm, and the length W in the X axis direction>80 μm, therefore, five TFTs-C having the length L in the Y axis direction=6 μm, and the length W in the X axis direction=18 μm may be arranged (18 μm×5=90 μm>80 μm). In a case where one TFT-C is arranged per one display pixel, it is only required to arrange TFTs-C over five display pixels. This can make the area for arranging the gate driver 11 smaller, as compared with the case of the conventional active matrix substrate.

FIG. 15A schematically illustrates a gate driver arranged region 151 where the gate drivers 11 are arranged, and gate driver non-arranged regions 152 where no gate driver 11 is arranged, in the conventional active matrix substrate. FIG. 15B schematically illustrates a gate driver arranged region 151 where the gate drivers 11 are arranged and gate driver non-arranged regions 152 where no gate driver 11 is arranged, in the active matrix substrate 20a of the present embodiment.

As described with reference to FIGS. 11A to 11D, and FIGS. 13A to 13C, the gate driver arranged region 151 where the gate drivers 11 are arranged can be smaller in size, in the active matrix substrate 20a in the present embodiment, as compared with the conventional active matrix substrate. This allows the gate driver non-arranged region 152, where no gate driver 11 is arranged, to be larger (see FIGS. 15A and 15B).

The gate driver non-arranged region 152, where no gate driver 11 is arranged, is cuttable. FIGS. 15A and 15B illustrate an exemplary cuttable area as an area 152a. In the case of the active matrix substrate 20a in the present embodiment, as compared with the conventional active matrix substrate, the gate driver non-arranged region 152, where the gate drivers 11 are arranged, can be larger, which allows the cuttable area 152a to be larger. This enables to increase the degree of freedom when the display panel 2 is formed in a shape other than the rectangular shape, thereby increasing the degree of freedom in the design of the liquid crystal display device 1.

<Embodiment 2>

In the active matrix substrate 20a in Embodiment 1, the source lines 15S are arranged for the respective colors, and the gate lines 13G are arranged for the respective pixels. In the active matrix substrate 20a in Embodiment 2, the gate lines 13G are arranged for respective colors, and the source lines 15S are arranged for respective pixels. In other words, the gate lines 13G are vertical lines that extend in the longitudinal direction in plan view, and the source lines 15S are horizontal lines that extend in the lateral direction in plan view.

In the active matrix substrate 20a in the present embodiment, among a plurality of the pixel-TFTs 16T connected with the same source line 15S, a part of the pixel-TFTs 16T are arranged on a different side with respect to the respective gate lines 13G to which the pixel-TFTs 16T are connected. Besides, the intervals between adjacent ones of the gate lines 13G are, not regular intervals, but irregular intervals.

More specifically, among the intervals between adjacent two gate lines 13G, the interval between the two gate lines 13G positioned on both sides of the position where the driver-TFT 18 is arranged is widest, with the foregoing two gate lines being apart from each other by one or more pixels. Further, the pixel-TFT 16T connected with the gate line 13G positioned on the left to the driver-TFT 18 arranged position is arranged on the right side with respect to the gate line 13G to which the pixel-TFT 16T concerned is connected, and the pixel-TFT 16T connected with the gate line 13G positioned on the right to the driver-TFT 18 arranged position is arranged on the left side to the gate line 13G to which the pixel-TFT 16T concerned is connected.

FIG. 16A illustrates a configuration of an active matrix substrate 20a in Embodiment 2. The interval between the gate line 13G4 and the gate line 13G5, the interval between the gate line 13G5 and the gate line 13G6, and the interval between the gate line 13G6 and the gate line 13G7 are different from one another. More specifically, the interval between the gate line 13G5 and the gate line 13G6 is wider than the interval between the gate line 13G4 and the gate line 13G5, and the interval between the gate line 13G6 and the gate line 13G7; the gate line 13G5 and the gate line 13G6 are apart from each other by one or more pixels.

Further, among the pixel-TFTs 16T14, 16T15, and 16T16 connected to the same source line 15S, the pixel-TFT 16T14 connected to the gate line 13G4, and the pixel-TFT 16T15 connected to the gate line 13G5, are arranged on the right side with respect to the respective gate lines 13G to which these are connected. On the other hand, the pixel-TFT 16T16 connected to the gate line 13G6 is arranged on the left side with respect to the gate line 13G to which the pixel-TFT 16T16 is connected.

The driver-TFT 18 is arranged in a space between the gate line 13G5 and the gate line 13G6, which are arranged at a wide interval. The driver line 15L1, which is electrically connected with the driver-TFT 18, is arranged in the light-shielding area BM, which is between adjacent ones of the pixels.

Among the gate lines 13G, a part of the gate lines 13G are arranged in the pixel areas. In the example illustrated in FIG. 16A, the gate lines 13G1, 13G2, 13G4, 13G5, 13G7, 13G8, and 13G10 are arranged in the light-shielding area BM, which is between adjacent ones of the pixels, while the gate lines 13G3, 13G6, and 13G9 are arranged in the pixel areas. In this case, since the gate lines 13G are arranged in the same manner with respect to each display pixel irrespective of the presence/absence of the driver-TFTs 18 arranged therein, dummy lines for making the aperture ratio uniform are not needed.

FIG. 16B illustrates a configuration of a conventional active matrix substrate on which the gate lines 13G are arranged for the respective colors, and the source lines 15S are arranged for the respective pixels. On the conventional active matrix substrate, a plurality of gate lines 13G are arranged at regular intervals, and a plurality of pixel-TFTs 16T connected with the same source line 15S are arranged on the same side with respect to the respective gate lines 13G to which the forgoing pixel-TFTs are connected. In the exemplary configuration illustrated in FIG. 16B, all of the pixel-TFTs 16T are arranged on the right side with respect to the respective gate lines 13G to which the pixel-TFTs 16T are connected.

In the conventional active matrix substrate illustrated in FIG. 16B, for the same reason as that in the case of the conventional active matrix substrate illustrated in FIG. 8A, the area for arranging the driver-TFT 18 is small, and hence, only a small driver-TFT 18 can be arranged therein. It is therefore necessary to arrange small driver-TFTs 18 at a plurality of positions, which causes the length of the internal node in the gate driver 11 to increase. An increase in the length of the internal node causes parasitic capacitances of the internal node to increase, resulting in an increase of the electric power consumption.

Besides, in the conventional active matrix substrate, since the length of the internal node of the gate driver 11 increases, the points of connection between the internal node (netA) in the Y axis direction and the source lines 15S in the X axis direction increase.

In contrast, in the active matrix substrate in the present embodiment, the gate lines 13G are arranged at irregular intervals, and among a plurality of pixel-TFTs 16T connected with the same source line 15S, a part of the pixel-TFTs 16T are arranged on a different side with respect to the respective gate lines 13G to which the pixel-TFTs 16T are connected, whereby the area for arranging a driver-TFT 18 is made wider in the X axis direction. This makes it possible to arrange a larger driver-TFT 18 as compared with the conventional active matrix substrate, thereby making the area for arranging the entire gate driver 11 smaller. This allows the length of the internal node of the gate driver 11 to decrease, thereby allowing the parasitic capacitance of the internal node to decrease, resulting in a decrease in the electric power consumption.

In addition, since the length of the internal node of the gate driver 11 decreases, the points of connection between the internal node in the Y axis direction and the source lines 15S in the X axis direction decrease.

Still further, as is the case with the active matrix substrate 20a in Embodiment 1, as compared with the conventional active matrix substrate, a distance between the driver line 15L1 extending in the Y axis direction and an element electrically connected to the pixel electrode (for example, the drain pad of the pixel-TFT 16T) increases. This causes capacitive coupling between the pixel electrode and the driver line 15L1 to become smaller, which makes it possible to decrease noise propagation from the driver line with respect to the pixel potential, and improve the image quality.

FIGS. 17A to 17D illustrate an exemplary equivalent circuit in a case where the circuit of the gate driver 11 illustrated in FIG. 4 is arranged in the display region of the conventional active matrix substrate illustrated in FIG. 16B. In view of the size of the diagram drawn herein, one circuit diagram is divided into four diagrams of FIGS. 17A to 17D. For example, the source line 15S shown at the lower end of FIG. 17A is the same as the source line 15S shown at the upper end of FIG. 17B. Further, the source line 15S shown at the lower end of FIG. 17B is the same as the source line 15S shown at the upper end of FIG. 17C. Still further, the source line 15S shown at the lower end of FIG. 17C is the same as the source line 15S shown at the upper end of FIG. 17D. Still further, FIG. 18 illustrates a part of the TFTs-C (driver-TFTs 18) excerpted from FIG. 17C and enlarged.

In the case of the conventional active matrix substrate, the size of the area for arranging the driver-TFT 18 is limited. In a case where a TFT-C having a length in the X axis direction of 6 µm is arranged, since the TFT-C (driver-TFT 18) cannot be arranged between adjacent ones of the pixel-TFTs 16T, as illustrated in FIG. 18, a TFT-C that is long in the Y axis direction cannot be arranged. In the example illustrated in FIG. 18, only a TFT-C having a length of at most 6 µm in the Y axis direction can be arranged. Therefore, in a case where the requirements for the TFT-C to be arranged are assumed to be the length L in the X axis direction=6 µm, and the length W in the Y axis direction>80 µm, it is necessary to arrange 14 TFTs-C having the length L in the X axis direction=6 µm, and the length W in the Y axis direction=6 µm (6 µm×14=84 µm>80 µm). In a case where one TFT-C is arranged per one display pixel, it is necessary to arrange TFTs-C over 14 display pixels.

FIGS. 19A to 19C illustrate an exemplary equivalent circuit in a case where the circuit of the gate driver 11 illustrated in FIG. 4 is arranged in the display region of the active matrix substrate 20a in the present embodiment. In view of the size of the diagram drawn herein, one circuit diagram is divided into three diagrams of FIGS. 19A to 19C. For example, the source line 15S shown at the lower end of FIG. 19A is the same as the source line 15S shown at the upper end of FIG. 19B. Further, the source line 15S shown at the lower end of FIG. 19B is the same as the source line 15S shown at the upper end of FIG. 19C. Still further, FIG. 20 illustrates a part of the TFTs-C (driver-TFTs 18) excerpted from FIGS. 19A to 19B.

As described above, in the active matrix substrate 20a in the present embodiment, larger driver-TFTs 18 can be arranged, as compared with the case of the conventional active matrix substrate. As compared with the conventional active matrix substrate, particularly the X-axis-direction dimension of the areas for arranging the driver-TFTs 18 is increased, which allows the TFTs-C having a length in the X axis direction of 6 µm to be arranged between adjacent ones of the pixel-TFTs 16T (see FIG. 20). In the example illustrated in FIG. 20, therefore, TFTs-C having a length in the X axis direction of 6 µm and a length in the Y axis direction of 18 µm can be arranged.

In a case where the requirements for the TFT-C to be arranged are assumed to be the length L in the X axis direction=6 µm, and the length W in the Y axis direction>80 µm, therefore, five TFTs-C having the length L in the X axis direction=6 µm, and the length W in the Y axis direction=18 µm may be arranged (18 µm×5=90 µm>80 µm). In a case where one TFT-C is arranged per one display pixel, it is only required to arrange TFTs-C over five display pixels. This can make the area for arranging the gate driver 11 smaller, as compared with the case of the conventional active matrix substrate.

<Embodiment 3>

In the active matrix substrate 20a in Embodiment 1, among a plurality of the pixel-TFTs 16T connected with the same gate line 13G, a part of the pixel-TFTs 16T are arranged on a different side with respect to the respective source lines 15S to which the pixel-TFTs 16T are connected. Besides, the intervals between adjacent ones of the source lines 15S are not regular intervals, but irregular intervals.

An active matrix substrate 20a in Embodiment 3, while keeping the above-described characteristics of the configuration of the active matrix substrate 20a in Embodiment 1, further has the following characteristics: among a plurality of the pixel-TFTs 16T connected with the same source line 15S (vertical line), a part of the pixel-TFTs 16T are arranged on a different side with respect to the respective gate lines 13G (horizontal lines) to which the pixel-TFTs 16T are connected; and the intervals between adjacent ones of the gate lines 13G are not regular intervals, but irregular intervals.

FIG. 21 illustrates a configuration of the active matrix substrate 20a in Embodiment 3. The interval between the source line 15S1 and the source line 15S2, the interval between the source line 15S2 and the source line 15S3, and the interval between the source line 15S3 and the source line 15S4 are different from one another. More specifically, the interval between the source line 15S2 and the source line 15S3 is wider than the interval between the source line 15S1 and the source line 15S2, and the source line 15S3 and the source line 15S4.

Besides, among the pixel-TFTs 16T11, 16T12, and 16T13 connected with the same gate line 13G1, the pixel-TFT 16T11 connected to the source line 15S1, and the pixel-TFT 16T12 connected with the source line 15S2, are arranged on the right side with respect to the respective source lines 15S to which these are connected. On the other hand, the pixel-TFT 16T13 connected with the source line 15S3 is arranged on the left side with respect to the source line 15S to which the pixel-TFT 16T13 is connected.

In addition, the interval between the gate line 13G1 and the gate line 13G2 is different from the interval between the gate line 13G2 and the gate line 13G3. More specifically, the interval between the gate line 13G2 and the gate line 13G3 is wider than the interval between the gate line 13G1 and the gate line 13G2, and these are apart from each other by two pixels.

Still further, among the pixel-TFTs 16T11, 16T21, 16T31, and 16T41 connected with the same source 15S1, the pixel-TFT 16T11 connected with the gate line 13G1, and the pixel-TFT 16T31 connected with the gate line 13G3 are arranged on the lower side with respect to the respective gate lines 13G to which these are connected, and the pixel-TFT 16T21 connected with the gate line 13G2, and the pixel-TFT 16T41 connected with the gate line 13G4, are arranged on the upper side with respect to the respective gate lines 13G to which these are connected.

The driver-TFT 18 is arranged in a space between adjacent ones of the gate lines 13G arranged at a wide interval, among spaces between adjacent two gate lines 13G, and in the light-shielding area BM between the pixels adjacent in the Y axis direction. In the example illustrated in FIG. 21, the driver-TFT 18 is arranged between the gate line 13G2 and the gate line 13G3 and in the light-shielding area BM between the pixels adjacent in the Y axis direction.

The driver line 15L1, electrically connected with the driver-TFT 18, and extending in the Y axis direction, is arranged in the light-shielding area BM between pixels adjacent in the X axis direction. Further, the driver lines 15N1, 15N2, and 15N3, electrically connected with the driver-TFT 18, and extending in the X axis direction, are arranged between the gate line 13G2 and the gate line 13G3, in the light-shielding area BM between the pixels adjacent in the Y axis direction, similarly to the driver-TFT 18. In other words, all of the driver lines 15L1, 15N1 to 15N3 are arranged in the light-shielding area BM, and are not in the pixel areas.

Among a plurality of the source lines 15S, a part of the source lines 15S are arranged in the pixel areas. In the example illustrated in FIG. 21, the source lines 15S1, 15S2, 15S4, 15S5, 15S7, and 15S8 are arranged in the light-shielding area BM between the pixels adjacent in the X axis direction, whereas the source lines 15S3, 15S6, and 15S9 are arranged in the pixel areas. In this case, the source lines 15S are arranged in the same manner with respect to each display pixel, and hence, dummy lines for making the aperture ratio uniform are not needed.

In the case of the active matrix substrate in Embodiment 3, as is the case with the active matrix substrate in Embodiment 1, the areas for arranging the driver-TFT 18 can be made wider in the X axis direction, and this makes it possible to arrange larger driver-TFTs 18 as compared with the conventional active matrix substrate. This can make the area for arranging the entire gate driver 11 smaller, thereby allowing the length of the internal node of the gate driver 11 to decrease. The decrease of the length of the internal node allows the parasitic capacitance of the internal node to decrease, resulting in a decrease in the electric power consumption.

In addition, since the length of the internal node of the gate driver 11 decreases, the points of connection between the internal node in the X axis direction and the source lines 15S in the Y axis direction decrease. Further, since larger driver-TFTs 18 can be arranged as compared with the conventional active matrix substrate, the number of the driver-TFTs 18 can be decreased. The points of connection between the driver lines 15L1 in the Y axis direction and the gate lines 13G in the X axis direction, therefore, can be decreased.

Still further, since the drain pad of the pixel-TFT 16T as an element electrically connected with the pixel electrode 17, and the driver line 15L1, are apart from each other by one pixel in the Y axis direction, capacitive coupling therebetween decreases. This makes it possible to decrease noise propagation from the driver line with respect to the pixel potential, and improve the image quality.

Still further, as illustrated in FIG. 21, in the light-shielding area BM, which is between the pixels adjacent in the Y axis direction, the pixel-TFTs 16T are not arranged in the areas where the driver-TFTs 18 are arranged, and only the driver-TFTs 18 and the driver lines 15N1 to 15N3 are arranged in such areas. This therefore allows the driver-TFTs to be arranged in wider areas as compared with the active matrix substrate in Embodiment 1. This makes it easier to arrange an element that requires a large area, such as an electrostatic protection circuit or a capacitor forming part, in an area where the driver-TFT 18 is arranged.

In the conventional active matrix substrate illustrated in FIGS. 11A to 11D, only a TFT-C (driver-TFT 18) having a length of at most 6 µm in the X axis direction can be arranged per one display pixel. In a case where the requirements for the TFT-C to be arranged are assumed to be the length L in the Y axis direction=6 µm, and the length W in the X axis direction>80 µm, it is necessary to arrange 14 TFTs-C having the length L in the Y axis direction=6 µm, and the length W in the X axis direction=6 µm (6 µm×14=84 µm>80 µm).

FIG. 22 illustrates an exemplary equivalent circuit in a case where the circuit of the gate driver 11 illustrated in FIG. 4 is arranged in the display region of the active matrix substrate 20a in the present embodiment. FIG. 23 illustrates a part of the TFTs-C (driver-TFTs 18) excerpted from FIG. 22 and enlarged.

In a case where the requirements for the TFT-C to be arranged are assumed to be the length L in the Y axis direction=6 µm, and the length W in the X axis direction>80 µm, TFTs-C having the length L in the Y axis direction=6 µm, and the lengths W in the X axis direction=12 µm, 44 µm, 12 µm, 6 µm, and 6 µm, respectively, may be arranged in the case of FIGS. 22 and 23, whereby the requirements are satisfied. As a result, it is only required to arrange TFTs-C (driver TFTs) over two display pixels, as illustrated in FIG. 23, and this can make the area for arranging the gate driver 11 smaller, as compared with the case of the conventional active matrix substrate.

<Embodiment 4>

In the active matrix substrate 20a in Embodiment 2, among a plurality of the pixel-TFTs 16T connected with the same source line 15S, a part of the pixel-TFTs 16T are arranged on a different side with respect to the respective gate lines 13G to which the pixel-TFTs 16T are connected. Besides, the intervals between adjacent ones of the gate lines 13G are not regular intervals, but irregular intervals.

An active matrix substrate 20a in Embodiment 4, while keeping the above-described characteristics of the configuration of the active matrix substrate 20a in Embodiment 2, further has the following characteristics: among a plurality of the pixel-TFTs 16T connected with the same gate line 13G (vertical line), a part of the pixel-TFTs 16T are arranged on a different side with respect to the respective source lines 15S (horizontal line) to which the pixel-TFTs 16T are connected; and the intervals between adjacent ones of the source lines 15S are not regular intervals, but irregular intervals.

FIG. 24 illustrates a configuration of an active matrix substrate 20a in Embodiment 4. The interval between the gate line 13G1 and the gate line 13G2, the interval between the gate line 13G2 and the gate line 13G3, and the interval between the gate line 13G3 and the gate line 13G4 are different from one another. More specifically, the interval between the gate line 13G1 and the gate line 13G2 is wider than the interval between the gate line 13G2 and the gate line 13G3, and the interval between the gate line 13G3 and the gate line 13G4; and the gate line 13G1 and the gate line 13G2 are apart from each other by one pixel or more.

Besides, among the pixel-TFTs 16T11, 16T12, and 16T13 connected with the same source line 15S1, the pixel-TFT 16T11 connected with the gate line 13G1, and the pixel-TFT 16T13 connected with the gate line 13G3, are arranged on the right side with respect to the respective gate lines 13G to which these are connected. On the other hand, the pixel-TFT 16T12 connected with the gate line 13G2 is arranged on the left side with respect to the gate line 13G to which the pixel-TFT 16T12 is connected.

In addition, the interval between the source line 15S1 and the source line 15S2 is different from the interval between the source line 15S2 and the source line 15S3. More specifically, the interval between the source line 15S2 and the source line 15S3 is wider than the interval between the source line 15S1 and the source line 15S2, and these are apart from each other by two pixels.

Still further, among the pixel-TFTs 16T11, 16T21, 16T31, and 16T41 connected with the same gate line 13G1, the pixel-TFT 16T11 connected with the source line 15S1, and the pixel-TFT 16T31 connected with the source line 15S3 are arranged on the upper side with respect to the respective source lines 15S to which these are connected, and the pixel-TFT 16T21 connected with the source line 15S2, and the pixel-TFT 16T41 connected with the source line 15S4 are arranged on the lower side with respect to the respective source lines 15S to which these are connected.

The driver-TFT 18 is arranged in a space between adjacent ones of the source lines 15S arranged at a wide interval, among spaces between adjacent two source line 15S, and in the light-shielding area BM between the pixels adjacent in the Y axis direction. In the example illustrated in FIG. 24, the driver-TFT 18 is arranged between the source line 15S2 and the source line 15S3 and in the light-shielding area BM between the pixels adjacent in the Y axis direction.

The driver line 15L1, electrically connected with the driver-TFT 18, and extending in the Y axis direction, is arranged in the light-shielding area BM between pixels adjacent in the X axis direction. Further, the driver lines 15N1, 15N2, and 15N3, electrically connected with the driver-TFT 18, and extending in the X axis direction, are arranged between the source line 15S2 and the source line 15S3, in the light-shielding area BM between the pixels adjacent in the Y axis direction. In other words, all of the driver lines are arranged in the light-shielding area BM, and are not in the pixel areas.

Among a plurality of the gate lines 13G, a part of the gate lines 13G are arranged in the pixel areas. In the example illustrated in FIG. 24, the gate lines 13G1, 13G2, 13G4, 13G5, 13G7, 13G8, and 13G10 are arranged in the light-shielding area BM between the pixels adjacent in the X axis direction, whereas the gate lines 13G3, 13G6, 13G9 are arranged in the pixel areas. In this case, the gate lines 13G are arranged in the same manner with respect to each display pixel, and hence, dummy lines for making the aperture ratio uniform are not needed.

In the case of the active matrix substrate 20a in Embodiment 4, as is the case with the active matrix substrate in Embodiment 2, the areas for arranging the driver-TFT 18 can be made wider, and this makes it possible to arrange larger driver-TFTs 18 as compared with the conventional active matrix substrate. This can make the area for arranging the entire gate driver 11 smaller, thereby allowing the length of the internal node of the gate driver 11 to decrease. The decrease of the length of the internal node allows the parasitic capacitance of the internal node to decrease, resulting in a decrease in the electric power consumption.

In addition, since the length of the internal node of the gate driver 11 decreases, the points of connection between the internal node in the Y axis direction and the source lines 15S in the X axis direction decrease.

Further, as compared with the conventional active matrix substrate, the distance between the driver line 15L1 extending in the Y axis direction, and the drain pad as an element electrically connected with the pixel electrode can be increased, whereby greater noise reducing effects can be achieved.

Still further, since the drain pads as elements electrically connected with the pixel electrodes, and the driver lines 15N1 to 15N3, are one pixel apart in the Y axis direction, capacitive coupling decreases. This makes it possible to decrease noise propagation from the driver line with respect to the pixel potential, and improve the image quality.

Still further, as illustrated in FIG. 24, in the light-shielding area BM, which is spaces between the pixels adjacent in the Y axis direction, in the areas where the driver-TFTs 18 are arranged, the pixel-TFTs 16T are not arranged, and only the driver-TFTs 18 and the driver lines 15N1 to 15N3 are arranged. This therefore allows the driver-TFTs 18 to be arranged in wider areas as compared with the active matrix substrate in Embodiment 2. This makes it easier to arrange an element that requires a large area, such as an electrostatic protection circuit or a capacitor forming part, in an area where the driver-TFT 18 is arranged.

As described in the description of Embodiment 2, in the case of the conventional active matrix substrate, the size of the area for arranging the driver-TFT 18 is limited. In the example illustrated in FIGS. 17A to 17D and 18, in a case where the requirements for the TFT-C (driver TFT 18) to be arranged are assumed to be the length L in the short axis direction=6 μm, and the length W in the long axis direction>80 μm, it is necessary to arrange TFTs-C having the length L in the X axis direction=6 μm, and the length W in the Y axis direction=6 μm over 14 display pixels (6 μm×14=84 μm>80 μm).

FIG. 25 illustrates an exemplary equivalent circuit in a case where the circuit of the gate driver 11 illustrated in FIG. 4 is arranged in the display region of the active matrix substrate 20a in the present embodiment. Further, FIG. 26 illustrates a part of the TFTs-C (driver-TFTs 18) excerpted from FIG. 25 and enlarged.

In a case where the requirements for the TFT-C to be arranged are assumed to be the length L in the short axis direction=6 μm, and the length W in the long axis direction>80 μm, two TFTs-C (driver-TFTs 18) having the length in the Y axis direction=6 μm, and the length in the X axis direction=40 μm, respectively, may be arranged in the case of the example illustrated in FIGS. 25 and 26, whereby the requirements are satisfied. As a result, it is only required to arrange TFTs-C (driver-TFTs 18) over two display pixels, as illustrated in FIG. 26, and this can make the area for arranging the gate driver 11 smaller, as compared with the case of the conventional active matrix substrate.

<Embodiment 5>

In order to form the active matrix substrate 20a in Embodiments 1 to 4 described above, a gate layer composing the gate lines 13G, and a source layer composing the source lines 15S are formed on a glass substrate. The gate layer and the source layer are formed in different layers in the lamination direction. Here, in some cases, a displacement occurs between the layers in the plane direction intersecting with the lamination direction at right angles, whereby the area of overlap between the gate layer and the source layer varies with the substrate, or alternatively, with the position. In a case where such displacement occurs, there is possibility that, even if the capacitance between the gate layer and the source layer is in the same pattern on design, the actual capacitance varies with the position.

Influences of this appear noticeably particularly between the drain pad of the pixel-TFT 16T and other elements, and causes the deterioration of the display quality. For example, the capacitance between the drain pad and the gate line 13G increases/decreases due to displacement, and the pull-in amount of the pixel-TFT in the OFF state increases/decreases.

FIG. 27 is a diagram for explaining the displacement of a source layer 272 with respect to a gate layer 271. When the source layer 272 is displaced to a position 272b from a position 272a as a reference position, an area of overlap between the gate layer 271 and the source layer 272 increases, whereby the capacitance increases; and when the source layer 272 is displaced to a position 272c, the area of overlap between the gate layer 271 and the source layer 272 decreases, whereby the capacitance decreases.

FIG. 28 is a diagram for explaining influences in a case where the displacement of the source line 15S with respect to the gate line 13G and the displacement of the position of the drain pad 28D with respect to the gate line 13G occurs in the active matrix substrate 20a in Embodiment 1. In FIG. 28, the positions as reference positions of the source line 15S and the drain pad 28D are indicated by solid lines, and the positions thereof when the displacement occurs are indicated by dotted lines.

As described above, in the active matrix substrate 20a in Embodiment 1, among a plurality of the pixel-TFTs 16T connected with the same gate line 13G, a part of the pixel-TFTs are arranged on a different side with respect to the respective source lines 15S to which the pixel-TFTs are connected. In the example illustrated in FIG. 28, the pixel-TFT 16T1 is arranged on the right side with respect to the source line 15S1, and the pixel-TFT 16T2 is arranged on the left side with respect to the source line 15S2.

When a displacement occurs between the source lines 15S and the drain pads 28D in such an arrangement, as indicated by the dotted lines in the drawing, regarding the pixel-TFTs 16T that are arranged on different sides from each other with respect to the respective source lines 15S to which the pixel-TFTs 16T are connected, the areas of overlap between the gate line 13G and the drain pad 28D change between the pixel-TFTs 16T, whereby the capacitances change. In the example illustrated in FIG. 28, the area of overlap between the gate line 13G and the drain pad 28D1 decreases, whereby the capacitance decreases, and the pull-in amount of the pixel-TFT 16T in the OFF state decreases. On the other hand, the area of overlap between the gate line 13G and the drain pad 28D2 increases, whereby the capacitance increases, and the pull-in amount of the pixel-TFT 16T in the OFF state increases.

In the active matrix substrate 20a in Embodiment 5, therefore, an offset pattern is formed in the gate layer, so that, even in a case where a displacement occurs between the layers, the change in the area of overlap between the gate layer and the drain pad caused by the displacement can be offset FIG. 29 illustrates an exemplary offset pattern 290 formed on the gate line 13G (gate layer). In FIG. 29 as well, reference positions of the source line 15S and the drain pad 28D are indicated by solid lines, and positions thereof when a displacement occurs are indicated by dotted lines.

The offset pattern 290 is in such a shape that, when a displacement occurs between the gate line 13G and the drain pad 28D, the area of overlap between the gate line 13G and the drain pad 28D can be prevented from changing. In the example illustrated in FIG. 29, the offset pattern 290 is formed so that, in a case where the drain pad 28D is formed at the reference position, the area of overlap between the gate line 13G and the drain pad 28D when no offset pattern 290 is formed, and the area of overlap between the offset pattern 290 and the drain pad 28D, become point-symmetric with respect to the center point of the drain pad 28D. By providing the offset pattern 290 as illustrated in FIG. 29, even in a case where the position of the drain pad 28D is displaced from the reference position indicated by the solid lines to a position indicated by the dotted lines, a change in the area of overlap between the gate line 13G and the drain pad 28D can be suppressed, whereby a change in the capacitance between the two can be suppressed.

FIG. 30 illustrates an exemplary offset pattern 300 of the gate line 13G (gate layer) for offsetting a change in the area of overlap between the gate line 13G and the drain pad 28D in a case where the drain pad 28D is displaced in the horizontal direction with respect to the gate line 13G.

An offset pattern 300 is formed in the following manner: in a case where the drain pad 28D is formed at a reference position, an area of overlap between the gate line 13G and the drain pad 28D in a case where the offset pattern 300 is not formed, and an area of overlap between the offset pattern 300 and the drain pad 28D, are horizontally symmetric to each other with respect to the center line of the drain pad 28D that divides the drain pad 28D in the X axis direction. By forming the offset pattern 300 in this way, even in a case where the position of the drain pad 28D is displaced from the reference position leftward or rightward, the area of overlap between the gate line 13G and the drain pad 28D can be prevented from changing (the capacitance is prevented from changing).

FIG. 31 illustrates an exemplary offset pattern 310 of the gate line 13G (gate layer) for offsetting a change in the capacitance between the gate line 13G and the drain pad 28D in a case where the drain pad 28D is displaced in the vertical and horizontal directions with respect to the gate line 13G.

An offset pattern 310 is formed in the following manner: in a case where the drain pad 28D is formed at a reference position, an area of overlap between the gate line 13G and the drain pad 28D in a case where the offset pattern 310 is not formed, and an area of overlap between the offset pattern 310 and the drain pad 28D, are horizontally symmetric to each other with respect to the center line of the drain pad 28D that divides the drain pad 28D in the X axis direction, and vertically symmetric to each other with respect to the center line of the drain pad 28D that divides the drain pad 28D in the Y direction. By forming the offset pattern 310 in this way, even in a case where the position of the drain pad 28D is displaced from the reference position in any direction of the horizontal direction and the vertical direction, the area of overlap between the gate line 13G and the drain pad 28D can be prevented from changing (the capacitance is prevented from changing).

It is not necessary to provide the offset pattern of the gate layer for every pixel-TFT 16T, and the offset pattern may be formed in correspondence to a plurality of pixel-TFTs 16T. Examples of the offset pattern of the gate layer provided in correspondence to a plurality of pixel-TFTs are illustrated in FIGS. 32 to 34.

FIG. 32 illustrates an exemplary offset pattern 320 of the gate layer provided in correspondence to two pixel-TFTs 16T. The offset pattern 320 is formed in the following manner: in a case where the drain pad 28D is formed at a reference position, an area of overlap between the gate line 13G and the drain pad 28D in a case where the offset pattern 320 is not formed, and an area of overlap between the offset pattern 320 and the drain pad 28D, are horizontally symmetric to each other with respect to the center line of the drain pad 28D that divides the drain pad 28D in the X axis direction, and vertically symmetric to each other with respect to the center line of the drain pad 28D that divides the drain pad 28D in the Y direction. By forming the offset pattern 320 in this way, even in a case where the position of the drain pad 28D is displaced from the reference position in any direction of the horizontal direction and the vertical direction, the area of overlap between the gate line 13G and the drain pad 28D can be prevented from changing (the capacitance is prevented from changing).

In a case where the drain pad 28D is in a non-rectangular shape, an offset pattern is provided on the gate line 13G (gate layer), and at the same time, the drain pad 28D is formed in such a shape that when the drain pad 28D is displaced with respect to the gate line 13G, a change in the area of overlap between the gate line 13G (gate layer) and the drain pad 28D can be suppressed.

FIG. 33 illustrates an exemplary form of a non-rectangular drain pad 28D and an offset pattern 330 of the gate layer provided with respect to the drain pad 28D. The drain pad 28D is formed in such a shape that the drain pad 28D is horizontally symmetric with respect to the center line thereof that divides itself in the X axis direction, and vertically symmetric with respect to the center line thereof that divides itself in the Y axis direction. Further, the offset pattern 330 is formed in the following manner: in a case where the drain pad 28D is formed at a reference position, an area of overlap between the gate line 13G and the drain pad 28D in a case where the offset pattern 330 is not formed, and an area of overlap between the offset pattern 330 and the drain pad 28D, are horizontally symmetric to each other with respect to the center line of the drain pad 28D that divides the drain pad 28D in the X axis direction, and vertically symmetric to each other with respect to the center line of the drain pad 28D that divides the drain pad 28D in the Y direction. By so doing, even in a case where the position of the drain pad 28D is displaced from the reference position in any direction of the horizontal direction and the vertical direction, the area of overlap between the gate line 13G and the drain pad 28D can be prevented from changing (the capacitance is prevented from changing).

FIG. 34 illustrates another exemplary form of a non-rectangular drain pad 28D and an offset pattern 340 provided with respect to the drain pad 28D. In the example illustrated in FIG. 33, the drain pad 28D is formed in such a shape that a change in the area of overlap can be offset for each of the pixel-TFTs 16T. In the example illustrated in FIG. 34, the shape is such that a change in the area of overlap can be offset in correspondence to a plurality of pixel-TFTs.

Incidentally, though the illustration is omitted, it is also possible to form an offset pattern in the gate layer also in a configuration in which the gate lines 13G are arranged for the respective colors and the source lines 15S are arranged for the respective pixels.

The present invention is not limited to the embodiments described above. For example, in the active matrix substrate 20a in Embodiment 1, the intervals between adjacent ones of the source lines 15S are irregular intervals, but the intervals may be regular intervals.

FIG. 35 is a schematic diagram for explaining a configuration of an active matrix substrate 20a in which intervals between adjacent ones of the source lines 15S are regular intervals. The intervals between adjacent ones of the source lines 15S are regular intervals. Further, among the plurality of pixel-TFTs 16T connected with the same gate line 13G, a part of the pixel-TFTs are arranged on a different side with respect to the respective source lines 15S to which the pixel-TFTs are connected. In the example illustrated in FIG. 35, the pixel-TFT 16T1 connected with the source line 15S1, and the pixel-TFT 16T3 connected with the source line 15S3, are arranged on the right side with respect to the source line 15S to which these are connected, whereas the pixel-TFT 16T2 connected with the source line 15S2 is arranged on the left side with respect to the source line 15S to which the pixel-TFT 16T2 is connected.

The driver-TFT 18 is arranged in an area between adjacent ones of the source lines 15S, where the distance between adjacent ones of the pixel control elements 16T is wider than the distance between adjacent ones of the pixel control elements 16T in other areas. In the example illustrated in FIG. 35, the driver-TFT 18 is arranged between the source line 15S2 and the source line 15S3. The pixel-TFT 16T2 is arranged on the left with respect to the source line 15S2, and the pixel-TFT 16T3 is arranged on the right side with respect to the source line 15S3, whereby no pixel-TFT 16T is arranged between the source line 15S2 and the source line 15S3. This allows a large driver-TFT 18 to be arranged between the source line 15S2 and the source line 15S3.

Likewise, in the active matrix substrate 20a in Embodiment 2, the intervals between adjacent ones of the gate lines 13G may be, not irregular intervals, but regular intervals. Further, in the active matrix substrate 20a in Embodiment 3, the intervals between adjacent ones of the source lines 15S may be, not irregular intervals, but regular intervals. Further, in the active matrix substrate 20a in Embodiment 4, the intervals between adjacent ones of the gate lines 13G may be, not irregular intervals, but regular intervals.

In the foregoing descriptions of the embodiments, it is described that a larger driver-TFT 18 can be arranged, as compared with the conventional active matrix substrate. Two or more small driver-TFTs, however, may be connected in series and arranged.

Among a plurality of driver-TFTs 18 as constituent elements of the gate driver 11, a part of the driver-TFTs 18 may be arranged in the display region, and the other driver-TFTs 18 may be arranged outside the display region.

The invention claimed is:

1. An active matrix substrate comprising:
a plurality of data lines;
a plurality of lines that intersect with the data lines, and include at least a plurality of gate lines;
a driving circuit that includes a plurality of switching elements, and are connected to at least part of the lines, so as to control potentials of the lines according to a control signal supplied from outside a display region; and
a plurality of pixel control elements that are provided in correspondence to a plurality of pixels that compose the display region, and are connected with the data lines and the gate lines, so as to control display of the corresponding pixels, respectively,
wherein either the data lines or the gate lines are a plurality of vertical lines that extend in a longitudinal direction in plan view, and the other are a plurality of horizontal lines that extend in a lateral direction in plan view,
at least a part of the switching elements are respectively arranged in first areas, each of the first areas being surrounded by adjacent ones of the vertical lines and adjacent ones of the horizontal lines, and
a distance between adjacent ones of the pixel control elements that are adjacent in the horizontal direction in each of the first areas is wider than a distance between other adjacent ones of the pixel control elements that are adjacent in the horizontal direction in other areas between adjacent ones of the vertical lines.

2. The active matrix substrate according to claim 1, wherein intervals of the vertical lines are irregular intervals, and
the at least a part of the switching elements are arranged respectively in, among areas between the vertical lines arranged at irregular intervals, areas in each of which an interval between adjacent ones of the vertical lines is wider than an interval between other adjacent ones of the vertical lines.

3. The active matrix substrate according to claim 1, wherein the vertical lines are the gate lines, and the horizontal lines are the data lines.

4. The active matrix substrate according to claim 1, wherein a drain pad of each pixel control element is formed in a layer different in a lamination direction from a gate layer that forms the gate line, and in the gate layer, a region is provided for preventing an area of overlap between the drain pad and the gate layer from changing when the drain pad and the gate layer are displaced from each other.

5. A display panel comprising:
the active matrix substrate according to claim 1;
a counter substrate including a color filter and a counter electrode; and
a liquid crystal layer interposed between the active matrix substrate and the counter substrate.

6. The active matrix substrate according to claim 1, wherein, among the pixel control elements, a part of the pixel control elements connected with one same horizontal line is arranged on one side with respect to the respective vertical lines to which the pixel control elements are connected, the one side being different from a side on which the other pixel control elements connected with the same horizontal lines are arranged.

7. The active matrix substrate according to claim 1, wherein, among the pixel control elements, a part of the pixel control elements connected with one same vertical line are arranged on one side with respect to the respective horizontal lines to which the pixel control elements are connected, the one side being different from a side on which the other pixel control elements connected with the same vertical lines are arranged.

8. The active matrix substrate according to claim 1, wherein a drain pad of each pixel control element is formed in a layer different in a lamination direction from a gate layer that forms the gate line, and
the gate layer includes a region that is extended from the gate line, the region being provided separately from an area of the gate layer where the pixel control elements is provided and having an overlap with the drain pad when seen from the lamination direction.

9. The active matrix substrate according to claim 1, wherein at least a part of the switching elements as constituent elements of the driving circuit are respectively arranged in first areas between adjacent ones of the horizontal lines, in each of which first areas a distance between adjacent ones of the pixel control elements is wider than a distance between other adjacent ones of the pixel control elements.

10. The active matrix substrate according to claim 9, wherein intervals of the horizontal lines are irregular intervals, and the at least a part of the switching elements are arranged respectively in, among areas between the horizontal lines arranged at irregular intervals, first areas in each of which an interval between adjacent ones of the horizontal lines is wider than an interval between other adjacent ones of the horizontal lines.

11. The active matrix substrate according to claim 1,
wherein the vertical lines are the data lines, and the horizontal lines are the gate lines.

12. The active matrix substrate according to claim 11, wherein
at least a part of the plurality of data lines are arranged in a light-shielding area and the display region, and
at least a part of the pixels that are adjacent in the lateral direction have a substantially identical aperture ration.

* * * * *